United States Patent
Mironov et al.

(10) Patent No.: US 8,809,222 B2
(45) Date of Patent: *Aug. 19, 2014

(54) HYDROPROCESSING CATALYSTS AND METHODS FOR MAKING THEREOF

(75) Inventors: Oleg Mironov, Hercules, CA (US); Alexander E. Kuperman, Orinda, CA (US); Julie Chabot, Novato, CA (US); Shuwu Yang, Richmond, CA (US); Joseph V. Nguyen, Albany, CA (US); Ling Jiao, Albany, CA (US); Bruce Edward Reynolds, Martinez, CA (US); Axel Brait, San Rafael, CA (US); Kenneth Kwik, Sugar Land, TX (US); Modinat Kotun, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 13/331,372

(22) Filed: Dec. 20, 2011

(65) Prior Publication Data

US 2012/0172203 A1     Jul. 5, 2012

Related U.S. Application Data

(60) Provisional application No. 61/428,599, filed on Dec. 30, 2010.

(51) Int. Cl.

| | |
|---|---|
| *B01J 27/02* | (2006.01) |
| *B01J 27/047* | (2006.01) |
| *B01J 27/049* | (2006.01) |
| *B01J 27/043* | (2006.01) |
| *B01J 27/045* | (2006.01) |
| *B01J 23/00* | (2006.01) |
| *B01J 23/40* | (2006.01) |
| *B01J 23/42* | (2006.01) |
| *B01J 23/44* | (2006.01) |
| *B01J 23/58* | (2006.01) |
| *B01J 23/70* | (2006.01) |
| *B01J 23/74* | (2006.01) |
| *B01J 23/85* | (2006.01) |
| *B01J 23/883* | (2006.01) |
| *B01J 23/887* | (2006.01) |
| *B01J 27/051* | (2006.01) |
| *B01J 23/24* | (2006.01) |
| *B01J 35/00* | (2006.01) |
| *B01J 37/20* | (2006.01) |
| *C10G 49/04* | (2006.01) |
| *B01J 35/10* | (2006.01) |

(52) U.S. Cl.
CPC ............ *B01J 23/883* (2013.01); *B01J 35/1047* (2013.01); *B01J 23/85* (2013.01); *B01J 23/8872* (2013.01); *B01J 27/051* (2013.01); *B01J 23/8873* (2013.01); *B01J 23/24* (2013.01); *B01J 35/0073* (2013.01); *B01J 35/1042* (2013.01); *B01J 27/0515* (2013.01); *B01J 35/1019* (2013.01); *B01J 35/1023* (2013.01); *B01J 35/1095* (2013.01); *B01J 37/20* (2013.01); *C10G 49/04* (2013.01)
USPC ........... 502/216; 502/219; 502/221; 502/222; 502/223; 502/325; 502/326; 502/328; 502/337; 502/338; 502/339; 502/349

(58) Field of Classification Search
USPC ......... 502/216, 219, 221–223, 325, 326, 328, 502/337–339, 349
See application file for complete search history.

(56) References Cited

U.S. PATENT DOCUMENTS 3,817,856 A     6/1974    Aaron et al.
(Continued)

FOREIGN PATENT DOCUMENTS

WO    WO 2007059621 A1 *   5/2007

OTHER PUBLICATIONS

U.S. Appl. No. 13/331,175, filed Dec. 20, 2011, Nguyen, et al.
(Continued)

*Primary Examiner* — Patricia L Hailey

(57) ABSTRACT

An improved process for preparing a slurry catalyst for the upgrade of heavy oil feedstock is provided. In the process, high shear mixing is employed to generate an emulsion containing droplets of metal precursor in oil with droplet sizes ranging from 0.1 to 300 μm. The emulsion is subsequently sulfided with a sulfiding agent, or in-situ in a heavy oil feedstock to form a slurry catalyst. The in-situ sulfidation in heavy oil is under sufficient condition for the heavy oil feedstock to generate the sulfiding source needed for the sulfidation.

23 Claims, 7 Drawing Sheets

(56) References Cited

U.S. PATENT DOCUMENTS

| | | | |
|---|---|---|---|
| 4,087,354 A | 5/1978 | Hessler | |
| 4,244,839 A * | 1/1981 | Aldridge et al. | 502/170 |
| 4,440,868 A | 4/1984 | Hettinger, Jr. et al. | |
| 4,485,004 A | 11/1984 | Fisher et al. | |
| 4,491,639 A * | 1/1985 | Happel et al. | 502/219 |
| 4,592,827 A | 6/1986 | Galiasso et al. | |
| 4,684,456 A | 8/1987 | Van Driesen et al. | |
| 4,710,486 A | 12/1987 | Lopez et al. | |
| 4,824,821 A | 4/1989 | Lopez et al. | |
| 4,853,106 A | 8/1989 | Grove et al. | |
| 4,943,547 A | 7/1990 | Seamans et al. | |
| 4,961,840 A | 10/1990 | Goyal | |
| 4,969,988 A | 11/1990 | Jain et al. | |
| 4,970,190 A | 11/1990 | Lopez et al. | |
| 5,039,392 A | 8/1991 | Bearden, Jr. et al. | |
| 5,041,404 A | 8/1991 | Seamans et al. | |
| 5,162,282 A | 11/1992 | Lopez et al. | |
| 5,164,075 A | 11/1992 | Lopez | |
| 5,178,749 A | 1/1993 | Lopez et al. | |
| 5,286,691 A | 2/1994 | Harandi et al. | |
| 5,298,152 A | 3/1994 | Kramer | |
| 5,371,308 A | 12/1994 | Gosselink et al. | |
| 5,374,348 A | 12/1994 | Sears et al. | |
| 5,484,755 A | 1/1996 | Lopez | |
| 5,527,473 A | 6/1996 | Ackerman | |
| 5,871,638 A | 2/1999 | Pradhan et al. | |
| 5,914,010 A | 6/1999 | Hood et al. | |
| 5,925,238 A | 7/1999 | Duddy et al. | |
| 5,935,418 A | 8/1999 | Chakrabarty et al. | |
| 5,954,945 A | 9/1999 | Cayton et al. | |
| 5,977,192 A | 11/1999 | Howsmon et al. | |
| 5,998,328 A | 12/1999 | Dawes et al. | |
| 6,030,915 A | 2/2000 | de Boer | |
| 6,071,402 A | 6/2000 | Danot et al. | |
| 6,139,723 A | 10/2000 | Pelrine et al. | |
| 6,156,693 A | 12/2000 | Song et al. | |
| 6,156,695 A | 12/2000 | Soled et al. | |
| 6,162,350 A | 12/2000 | Soled et al. | |
| 6,190,542 B1 | 2/2001 | Comolli et al. | |
| 6,241,855 B1 | 6/2001 | Gibson et al. | |
| 6,241,874 B1 | 6/2001 | Wallace et al. | |
| 6,270,654 B1 | 8/2001 | Colyar et al. | |
| 6,274,530 B1 | 8/2001 | Cayton et al. | |
| 6,277,895 B1 | 8/2001 | Zhou et al. | |
| 6,278,034 B1 | 8/2001 | Espinoza et al. | |
| 6,291,391 B1 | 9/2001 | MacArthur | |
| 6,299,760 B1 | 10/2001 | Soled et al. | |
| 6,451,729 B1 | 9/2002 | Song et al. | |
| 6,482,315 B1 | 11/2002 | Roberie et al. | |
| 6,534,437 B2 | 3/2003 | Eijsbouts et al. | |
| 6,554,994 B1 | 4/2003 | Reynolds et al. | |
| 6,620,313 B1 | 9/2003 | Demmin et al. | |
| 6,630,066 B2 | 10/2003 | Cash et al. | |
| 6,635,599 B1 | 10/2003 | Eijsbouts et al. | |
| 6,652,738 B2 | 11/2003 | Eijsbouts et al. | |
| 6,660,157 B2 | 12/2003 | Que et al. | |
| 6,712,955 B1 | 3/2004 | Hou et al. | |
| 6,726,832 B1 | 4/2004 | Baldassari et al. | |
| 6,758,963 B1 | 7/2004 | Hantzer et al. | |
| 6,846,403 B2 | 1/2005 | Cheng et al. | |
| 6,852,214 B1 | 2/2005 | Chester et al. | |
| 6,923,903 B2 | 8/2005 | Chester et al. | |
| 7,150,823 B2 | 12/2006 | Mayer et al. | |
| 7,179,366 B2 | 2/2007 | Harle et al. | |
| 7,214,308 B2 | 5/2007 | Colyar | |
| 7,223,713 B2 | 5/2007 | Alonso et al. | |
| 7,232,515 B1 | 6/2007 | Demmin et al. | |
| 7,297,250 B2 | 11/2007 | Bronicki | |
| 7,358,413 B2 | 4/2008 | Stell et al. | |
| 7,396,799 B2 * | 7/2008 | Chen et al. | 502/216 |
| 7,402,547 B2 * | 7/2008 | Wellington et al. | 502/222 |
| 7,413,669 B2 | 8/2008 | Gonzalez et al. | |
| 7,416,653 B2 | 8/2008 | Wellington et al. | |
| 7,678,730 B2 * | 3/2010 | Mironov et al. | 502/200 |
| 7,678,731 B2 * | 3/2010 | Mironov et al. | 502/200 |
| 7,737,073 B2 * | 6/2010 | Mironov et al. | 502/200 |
| 7,803,267 B2 | 9/2010 | Chester et al. | |
| 7,820,579 B2 | 10/2010 | Ginestra et al. | |
| 7,906,447 B2 | 3/2011 | McCarthy et al. | |
| 7,947,623 B2 * | 5/2011 | Mironov et al. | 502/219 |
| 8,304,363 B2 * | 11/2012 | Pereira-Almao et al. | 502/216 |
| 8,372,776 B2 * | 2/2013 | Mironov et al. | 502/200 |
| 8,389,433 B2 * | 3/2013 | Mironov et al. | 502/200 |
| 8,420,565 B2 * | 4/2013 | Mironov et al. | 502/221 |
| 8,431,511 B2 * | 4/2013 | Mironov et al. | 502/221 |
| 2002/0010088 A1 | 1/2002 | Eijsbouts et al. | |
| 2002/0012517 A1 | 1/2002 | Ichioka et al. | |
| 2002/0153283 A1 | 10/2002 | Chester et al. | |
| 2002/0166797 A1 | 11/2002 | Banerjee | |
| 2002/0179498 A1 | 12/2002 | Chester et al. | |
| 2003/0034275 A1 | 2/2003 | Roberie et al. | |
| 2003/0075481 A1 | 4/2003 | Chester et al. | |
| 2003/0089636 A1 | 5/2003 | Marchionna et al. | |
| 2003/0089639 A1 | 5/2003 | Chester et al. | |
| 2003/0102254 A1 | 6/2003 | Eijsbouts et al. | |
| 2003/0150778 A1 | 8/2003 | Haluska et al. | |
| 2004/0134837 A1 | 7/2004 | Dassori | |
| 2004/0163999 A1 | 8/2004 | Plantenga et al. | |
| 2004/0226860 A1 | 11/2004 | Bourges et al. | |
| 2005/0040080 A1 | 2/2005 | Riley et al. | |
| 2005/0145538 A1 | 7/2005 | Wellington et al. | |
| 2005/0145543 A1 | 7/2005 | Bhan et al. | |
| 2005/0150818 A1 | 7/2005 | Bhan et al. | |
| 2005/0155908 A1 | 7/2005 | Bhan et al. | |
| 2005/0159295 A1 | 7/2005 | Ginestra et al. | |
| 2005/0167320 A1 | 8/2005 | Bhan et al. | |
| 2005/0167321 A1 | 8/2005 | Wellington et al. | |
| 2005/0167322 A1 | 8/2005 | Wellington et al. | |
| 2005/0167323 A1 | 8/2005 | Wellington et al. | |
| 2005/0167324 A1 | 8/2005 | Bhan et al. | |
| 2005/0167326 A1 | 8/2005 | Bhan et al. | |
| 2005/0167327 A1 | 8/2005 | Bhan et al. | |
| 2005/0167328 A1 | 8/2005 | Bhan et al. | |
| 2005/0167329 A1 | 8/2005 | Bhan et al. | |
| 2005/0167330 A1 | 8/2005 | Bhan et al. | |
| 2005/0167331 A1 | 8/2005 | Bhan et al. | |
| 2005/0167332 A1 | 8/2005 | Bhan et al. | |
| 2005/0173298 A1 | 8/2005 | Wellington et al. | |
| 2005/0173301 A1 | 8/2005 | Bhan et al. | |
| 2005/0173302 A1 | 8/2005 | Bhan et al. | |
| 2005/0173303 A1 | 8/2005 | Bhan et al. | |
| 2005/0189260 A1 | 9/2005 | Chester et al. | |
| 2005/0241992 A1 | 11/2005 | Lott et al. | |
| 2005/0241993 A1 | 11/2005 | Lott et al. | |
| 2006/0011511 A1 | 1/2006 | Hokari et al. | |
| 2006/0054535 A1 | 3/2006 | Chen et al. | |
| 2006/0060501 A1 | 3/2006 | Gauthier et al. | |
| 2006/0060502 A1 | 3/2006 | Soled et al. | |
| 2006/0060503 A1 | 3/2006 | Soled et al. | |
| 2006/0157385 A1 | 7/2006 | Montanari et al. | |
| 2006/0163115 A1 | 7/2006 | Montanari et al. | |
| 2006/0175229 A1 | 8/2006 | Montanari et al. | |
| 2006/0186021 A1 | 8/2006 | Marchionna et al. | |
| 2006/0201854 A1 | 9/2006 | Lott | |
| 2006/0207917 A1 | 9/2006 | Domokos et al. | |
| 2006/0231465 A1 | 10/2006 | Bhan | |
| 2006/0272982 A1 | 12/2006 | Montanari et al. | |
| 2006/0289340 A1 | 12/2006 | Brownscombe et al. | |
| 2007/0000808 A1 | 1/2007 | Bhan et al. | |
| 2007/0000810 A1 | 1/2007 | Bhan et al. | |
| 2007/0007168 A1 | 1/2007 | Zhao et al. | |
| 2007/0012595 A1 | 1/2007 | Brownscombe et al. | |
| 2007/0045156 A1 | 3/2007 | Khadzhiev et al. | |
| 2007/0056881 A1 | 3/2007 | Berkowitz et al. | |
| 2007/0084754 A1 | 4/2007 | Soled et al. | |
| 2007/0090023 A1 | 4/2007 | Soled et al. | |
| 2007/0090024 A1 | 4/2007 | Soled et al. | |
| 2007/0116615 A1 | 5/2007 | Schulz Van Endert et al. | |
| 2007/0144941 A1 | 6/2007 | Hokari et al. | |
| 2007/0158236 A1 | 7/2007 | Zhou et al. | |
| 2007/0158238 A1 | 7/2007 | Wu et al. | |
| 2007/0161505 A1 | 7/2007 | Pereira-Almao et al. | |
| 2007/0238607 A1 | 10/2007 | Alonso et al. | |
| 2007/0284285 A1 | 12/2007 | Stepanik et al. | |

(56) References Cited

U.S. PATENT DOCUMENTS

| | | | |
|---|---|---|---|
| 2007/0295641 | A1 | 12/2007 | Brownscombe et al. |
| 2007/0295645 | A1 | 12/2007 | Brownscombe et al. |
| 2007/0295646 | A1 | 12/2007 | Bhan et al. |
| 2007/0295647 | A1 | 12/2007 | Brownscombe et al. |
| 2008/0083650 | A1 | 4/2008 | Bhan et al. |
| 2008/0083652 | A1 | 4/2008 | Morel et al. |
| 2008/0083655 | A1 | 4/2008 | Bhan et al. |
| 2008/0085225 | A1 | 4/2008 | Bhan et al. |
| 2008/0087575 | A1 | 4/2008 | Bhan et al. |
| 2008/0087578 | A1 | 4/2008 | Bhan et al. |
| 2008/0099371 | A1 | 5/2008 | McCoy et al. |
| 2008/0099373 | A1 | 5/2008 | Hokari et al. |
| 2008/0099377 | A1 | 5/2008 | He et al. |
| 2009/0005520 | A1 | 1/2009 | Kiss et al. |
| 2009/0032436 | A1 | 2/2009 | Takahashi et al. |
| 2009/0101574 | A1 | 4/2009 | Zubot et al. |
| 2009/0107881 | A1 | 4/2009 | Lott et al. |
| 2009/0137731 | A1 | 5/2009 | Sekiyama et al. |
| 2009/0139715 | A1 | 6/2009 | Choi |
| 2009/0139902 | A1 | 6/2009 | Kressmann et al. |
| 2009/0152165 | A1 | 6/2009 | Etter |
| 2009/0258779 | A1 | 10/2009 | McCarthy et al. |
| 2009/0261019 | A1 | 10/2009 | McCarthy et al. |
| 2010/0133148 | A1 | 6/2010 | Timmler et al. |
| 2010/0170827 | A1 | 7/2010 | Etter |
| 2010/0230324 | A1 | 9/2010 | Al-Alloush et al. |
| 2010/0234212 | A1* | 9/2010 | Brait et al. .................. 502/164 |
| 2012/0168350 | A1* | 7/2012 | Mironov et al. ............. 208/112 |

OTHER PUBLICATIONS

U.S. Appl. No. 13/331,207, filed Dec. 20, 2011, Mironov, et al.
U.S. Appl. No. 13/331,274, filed Dec. 20, 2011, Yang, et al.
U.S. Appl. No. 13/331,305, filed Dec. 20, 2011, Maris, et al.
U.S. Appl. No. 13/331,341, filed Dec. 20, 2011, Mironov, et al.
U.S. Appl. No. 13/331,479, filed Dec. 20, 2011, Jiao, et al.
U.S. Appl. No. 13/331,528, filed Dec. 20, 2011, Chabot, et al.
U.S. Appl. No. 13/331,630, filed Dec. 20, 2011, Nguyen, et al.
U.S. Appl. No. 13/331,660, filed Dec. 20, 2011, Nguyen, et al.
U.S. Appl. No. 13/331,690, filed Dec. 20, 2011, Mironov, et al.
U.S. Appl. No. 13/331,704, filed Dec. 20, 2011, Nguyen, et al.
U.S. Appl. No. 13/331,725, filed Dec. 20, 2011, Yang, et al.
Pecoraro et al., Hydrodesulfurization Catalysis by Transition Metal Sulfides, Journal of Catalysis (1981) 67, 430-445.
Barnes et al., A review of zinc dialkyldithiophosphates (ZDDPS): characterization and role in the lubricating oil (2001) Tribology International 34, 389-395.
Panariti, et al., Petroleum residue upgrading with dispersed catalysts Part I. Catalysts activity and selectivity. (2000) Applied Catalysis A: General 204 203-213.
Chadha et al., Iron sulfide Catalysts for Coal Liquefaction Prepared Using a Micellar Technique, 1996, Ind. Eng. Chem. Res. 35, 2916-2919.
Brown et al., Nickel, Cadium and Lead Sulfides as Catalysts in the Vapor Phase Reduction of Nitrobenzene, Jul. 29, 1938, Laboratory of Physical Chemistry, Indiana University.
Le et al., Solution Synthesis of the unsupported Ni-W sulfide hytrotreating catalysts (2008) Catalysis Today 130, 24-31.
Thompson et al., Thermal decomposition of sulfur compounds. I. 2-Methyl-2-propanethiol, Nov. 19, 1951, Bureau of Mines, Petroleum and Oil-Shale Experiment Station.
Ancheyta et al., Hydroprocessing of heavy petroleum feeds: tutorial (2005) Catalysis Today 109, 3-15.
Rana et al., A review of recent advances on process technologies for upgrading of heavy oils and residue (2007) Fuel 86, 1216-1231.
S. Zhang et al., A Review of Slurry-Phase Hydrocracking Heavy Oil Technology, Sep. 15, 2007—Energy Fuels, 2007, 21 (6), pp. 3057-3062.
Liu et al, Reactivity and Composition of Dispersed Ni Catalyst for Slurry-Phase Residue Hydrocracking, 2010, Energy Fuels, 24 (3), pp. 1958-1962.
Liu et al, Role of Dispersed Ni Catalyst Sulfurization in Hydrocracking of Residue from Karamay, 2008, Energy Fuels, 22 (6), pp. 4165-4169.
Liu et al, Study on a Water-Soluble Catalyst for Slurry-Phase Hydrocracking of an Atmospheric Residue, 2009, Energy Fuels, 23 (2), pp. 958-961.
S. Eijsbouts et al., Unsupported transition metal sulfide catalysts: From fundamentals to industrial application, Apr. 16, 2007, Applied Catalysis A: General vol. 322, pp. 58-66.

* cited by examiner

HYDROPROCESSING CATALYSTS AND METHODS FOR MAKING THEREOF

CROSS-REFERENCE TO RELATED APPLICATIONS

This application claims benefit under 35 USC 119 of U.S. Provisional Patent Application No. 61/428,599 with a filing date of Dec. 30, 2010. This application claims priority to and benefits from the foregoing, the disclosure of which is incorporated herein by reference.

TECHNICAL FIELD

The invention relates generally to catalysts for use in the conversion of heavy oils and residua and methods for making thereof.

BACKGROUND

The petroleum industry is increasingly turning to heavy crudes, resids, coals and tar sands as sources for feedstocks. Feedstocks derived from these heavy materials contain more sulfur and nitrogen than feedstocks derived from more conventional crude oils, requiring a considerable amount of upgrading in order to obtain usable products therefrom. The upgrading or refining is accomplished by hydroprocessing processes, i.e., treating with hydrogen of various hydrocarbon fractions, or whole heavy feeds, or feedstocks, in the presence of hydrotreating catalysts to effect conversion of at least a portion of the feeds, or feedstocks to lower molecular weight hydrocarbons, or to effect the removal of unwanted components, or compounds, or their conversion to innocuous or less undesirable compounds.

Catalysts commonly used for these hydroprocessing reactions include materials such as cobalt molybdate on alumina, nickel on alumina, cobalt molybdate promoted with nickel, nickel tungstate, etc. U.S. Pat. Nos. 4,824,821 and 5,484,755 and US Patent Publication No. 2006/0054535 disclose hydroprocessing catalysts in the form of high activity slurry. The catalyst is produced from Group VIB metal compounds by sulfiding an aqueous mixture of the metal compounds with hydrogen sulfide ($H_2S$) gas at a pressure of up to 5,000 psi (340 atm). U.S. Pat. Nos. 7,754,645 and 7,410,928 discloses a hydroprocessing catalyst and methods for making the catalysts, by reacting at least a Group VIB metal compound with a Promoter metal compound, sulfiding the intermediate mixture with a sulfiding agent, then mixing the sulfided catalyst precursor with a hydrocarbon diluent to make a bulk slurry type catalyst.

There is still a need for improved catalysts with optimum morphology, structure and improved catalytic activity. There is also a need for improved processes to prepare catalysts for use in the conversion of heavy oils and residua.

SUMMARY OF THE INVENTION

In one aspect, the invention relates to an improved process for preparing a slurry catalyst composition for use in the upgrade of heavy oil feedstock. The process comprises: providing at least an inorganic metal precursor solution comprising at least one of a Group VIB metal precursor and a Group VIII metal precursor; mixing at least a polar aprotic solvent with the inorganic metal precursor solution to form an oil-dispersible inorganic metal precursor, at a weight ratio of solvent to inorganic metal precursor solution of 1:1 to 100:1; and providing at least a sulfiding agent to sulfide the oil-dispersible inorganic metal precursor forming the slurry catalyst.

In one aspect, the invention relates to a process for preparing a slurry catalyst composition for use in the upgrade of heavy oil feedstock. The process comprises: providing a slurry catalyst prepared from at least a Group VIB metal precursor compound and optionally at least a Promoter metal precursor compound selected from Group VIII, Group IIB, Group IIA, Group IVA metals and combinations thereof, wherein the slurry catalyst comprises a plurality of dispersed particles in a hydrocarbon medium having an particle size ranging from 1 to 300 µm; providing a hydrogen feed; treating the slurry catalyst by mixing with the hydrogen feed at a pressure from 1435 psig (10 MPa) to 3610 psig (25 MPa) and a temperature from 200° F. to 800° F. at a rate of from 500 to 15,000 scf hydrogen per bbl of slurry catalyst for a minute to 20 hours, wherein the slurry catalyst is saturated with hydrogen providing an increase of k-values in terms of HDS, HDN, and HDMCR of at least 15% compared to a slurry catalyst that is not treated with hydrogen.

In one aspect, the invention relates to an improved process for preparing a slurry catalyst with the use of rework materials. The process comprises: providing at least a metal precursor comprising at least a Group VIB metal, the metal precursor is a rework material obtained from a process of making hydroprocessing catalysts, wherein the rework material has an average particle size of less than 300 µm; mixing the rework material with at least a diluent forming a slurried metal precursor; and providing at least a sulfiding agent to sulfide the slurried metal precursor forming the slurry catalyst. In one embodiment, the sulfidation is in-situ with the heavy oil feedstock providing the sulfiding agent for the sulfidation.

In one aspect, the invention relates to a process for preparing a slurry catalyst composition for use in the upgrade of heavy oil feedstock, using a pressure leach solution obtained from a metal recovery process as one of the metal precursor feed. The process comprises: providing at least a metal precursor solution comprising at least a Primary metal precursor in an aqueous solution, wherein the metal precursor solution is a pressure leach solution obtained from a metal recovery process and where the at least a Primary metal precursor was previously leached into the pressure leach solution in a leaching step; mixing the at least a metal precursor solution with at least a hydrocarbon diluent forming a catalyst precursor; and providing at least a sulfiding agent to sulfide the catalyst precursor forming the slurry catalyst.

In another aspect, the invention relates to an improved process for forming a slurry catalyst. The process comprises: providing a metal precursor solution comprising a mixture of at least two different water-soluble metal salts selected from Group VIB, Group VIII, Group IVB, Group IIB metals and mixtures thereof; mixing the metal precursor solution with a hydrocarbon diluent under high shear mixing to generate an emulsion with droplet sizes ranging from 0.1 to 300 µm; and sulfiding the emulsion with at least a sulfiding agent to form the slurry catalyst.

In one aspect, the invention relates to an improved slurry catalyst composition. The slurry catalyst comprises a plurality of dispersed particles in a hydrocarbon medium, wherein the dispersed particles have an average particle size ranging from 1 to 300 µm. The catalyst has a polymodal pore distribution with at least 80% of pore sizes in the range of 5 to 2,000 Angstroms in diameter. The catalyst is prepared from sulfiding and dispersing a metal precursor solution in a hydrocarbon diluent, the metal precursor comprising at least a Primary metal precursor, the metal precursor solution having a pH of at least 4 and a concentration of less than 10 wt. % of Primary metal in solution.

In another aspect, the invention relates to an improved slurry catalyst. The catalyst a plurality of dispersed particles in a hydrocarbon medium, wherein the dispersed particles have an average particle size ranging from 1 to 300 μm, the slurry catalyst has a BET total surface area of at least 100 m²/g, and the slurry catalyst is prepared from sulfiding and dispersing a metal precursor solution in a hydrocarbon diluent, the metal precursor comprising at least a Primary metal precursor and optionally a Promoter metal precursor, the metal precursor solution having a pH of at least 4 and a concentration of less than 10 wt. % of Primary metal in solution.

In one aspect, the invention relates to a process for preparing an improved slurry catalyst for the upgrade of heavy oil feedstock. The process comprises: providing at least a metal precursor solution comprising at least a Primary metal precursor, the metal precursor solution having a pH of at least 4 and a concentration of less than 10 wt. % of the Primary metal in solution; sulfiding the at least a metal precursor solution with a sulfiding agent, forming a sulfided catalyst precursor; and mixing the sulfided catalyst precursor with a hydrocarbon diluent to form the slurry catalyst wherein a slurry catalyst prepared therefrom has an average particle size ranging from 1 to 300 μm, a BET total surface area of at least 100 m²/g, a polymodal pore distribution with at least 80% of pore sizes in the range of 5 to 2,000 Angstroms in diameter, and a total pore volume of at least 0.5 cc/g.

In one aspect, the invention relates to an improved process for preparing a slurry catalyst composition for use in the upgrade of heavy oil feedstock. The process comprises: providing at least a metal precursor solution comprising at least two different metal cations in its molecular structure, with at least one of the metal cations is a Group VIB metal cation; sulfiding the metal precursor with a sulfiding agent forming a catalyst precursor; and mixing the catalyst precursor with a hydrocarbon diluent to form the slurry catalyst.

In one aspect, the invention relates to an improved process for preparing a single-metal slurry catalyst. The process comprises: providing at least a Primary metal precursor, the Primary metal is selected from one of at least one of a non-noble Group VIII metal, a Group VIB metal, a Group IVB metal, and a Group IIB metal; sulfiding the Primary metal precursor with a sulfiding agent forming a catalyst precursor; and mixing the catalyst precursor with a hydrocarbon diluent to form a slurry catalyst having a particle size ranging from 1 to 300 μm; and a general formula of $(M^t)_a(S^v)_d(C^w)_e(H^x)_f(O^y)_g(N^z)_h$, wherein M is at least one of a non-noble Group VIII metal, a Group VIB metal, a Group IVB metal, and a Group IIB metal; $0.5a <= d <= 4a$; $0 <= e <= 11a$; $0 <= f <= 18a$; $0 <= g <= 2a$; $0 <= h <= 3a$; t, v, w, x, y, z, each representing total charge for each of: M, S, C, H, O, and N; and $ta+vd+we+xf+yg+zh=0$.

In another aspect, the invention relates to another improved process for preparing a slurry catalyst. The process comprises: providing a metal precursor solution comprising at least a water-soluble molybdenum compound and a water-soluble metal zinc compound; mixing the metal precursor solution with a hydrocarbon diluent under sufficiently high shear mixing to generate an emulsion with droplet sizes ranging from 0.1 to 300 μm; sulfiding the emulsion precursor with at least a sulfiding agent to form a slurry catalyst having a particle size ranging from 1 to 300 μm; and wherein the zinc compound is present in the slurry catalyst in a sufficient amount for a zinc to molybdenum weight ratio ranging from 1:10 to 10:1.

In one aspect, the invention relates to yet another improved process for preparing a slurry catalyst composition for use in the upgrade of heavy oil feedstock. The process comprises: providing at least a first metal precursor comprising at least a metal salt of at least one of a non-noble Group VIII metal, a Group VIB metal, a Group IVB metal, and a Group IIB metal; sulfiding the first metal precursor with a first sulfiding agent to form a sulfided catalyst precursor; sulfiding the sulfided catalyst precursor with a second sulfiding agent at a molar ratio of sulfur to metal in the sulfided catalyst precursor of at least 1.5 to 1 for an enhanced sulfided catalyst precursor; and mixing the enhanced sulfided catalyst precursor with a hydrocarbon diluent forming a slurry catalyst having an average particle size of 1 to 300 μm.

In one aspect, the invention relates to an improved process for preparing a slurry catalyst composition for use in the upgrade of heavy oil feedstock. The process to be improved comprises: providing a first metal precursor comprising at least a Group VIB metal and a promoter metal precursor comprising at least a promoter metal selected from Group IVB metals, Group VIII metals, Group IIB metals and combinations thereof, for a promoter metal to a Group VIB metal weight ratio ranging from 1:30 to 5:1; sulfiding the first metal precursor and the promoter metal precursor separately, concurrently, or together, forming a promoted sulfided catalyst precursor; and mixing the promoted sulfided catalyst precursor with a hydrocarbon diluent forming a slurry catalyst having an average particle size of 1 to 300 μm. The improvement comprises: apportioning at least one of the metal precursor into a first portion and a second portion at a ratio of first portion to second portion ranging from 1:10 to 10:1; employing the first portion in the sulfidation step to form the promoted sulfided catalyst precursor; and mixing the second portion with the promoted sulfided catalyst precursor before, during, or after the mixing step with a hydrocarbon diluent to form the slurry catalyst.

DETAILED DESCRIPTION

Figure 1:
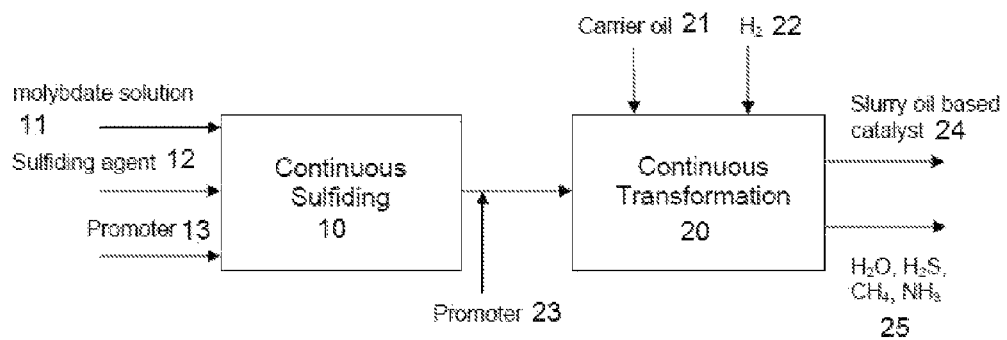
FIG. 1 is a block diagram illustrating one embodiment for preparing the slurry catalyst with at least two metal precursor feeds and with the co-sulfiding of the metal precursors in the continuous mode.

The following terms will be used throughout the specification and will have the following meanings unless otherwise indicated.

"Bulk catalyst" may be used interchangeably with "slurry catalyst" or "unsupported catalyst" or "self-supported catalyst," meaning that the catalyst composition is NOT of the conventional catalyst form with a preformed, shaped catalyst support which is then loaded with metals via impregnation or deposition catalyst. In one embodiment, the bulk catalyst is formed through precipitation. In another embodiment, the bulk catalyst has a binder incorporated into the catalyst composition. In yet another embodiment, the bulk catalyst is formed from metal compounds and without any binder. In one embodiment, the bulk catalyst comprises dispersed particles in a liquid mixture such as hydrocarbon oil ("slurry catalyst").

"Heavy oil" feed or feedstock refers to heavy and ultra-heavy crudes, including but not limited to resids, coals, bitumen, tar sands, oils obtained from the thermo-decomposition of waste products, polymers, biomasses, oils deriving from coke and oil shales, etc. Heavy oil feedstock may be liquid, semi-solid, and/or solid. Examples of heavy oil feedstock include but are not limited to Canada Tar sands, vacuum resid from Brazilian Santos and Campos basins, Egyptian Gulf of Suez, Chad, Venezuelan Zulia, Malaysia, and Indonesia Sumatra. Other examples of heavy oil feedstock include residuum left over from refinery processes, including "bottom of the barrel" and "residuum" (or "resid"), atmospheric tower bottoms, which have a boiling point of at least 650° F. (343° C.), or vacuum tower bottoms, which have a boiling point of at least 975° F. (524° C.), or "resid pitch" and "vacuum residue" which have a boiling point of 975° F. (524° C.) or greater.

Properties of heavy oil feedstock may include, but are not limited to: TAN of at least 0.1, at least 0.3, or at least 1; viscosity of at least 10 cSt; API gravity at most 15 in one embodiment, and at most 10 in another embodiment. In one embodiment, a gram of heavy oil feedstock contains at least 0.0001 grams of Ni/V/Fe; at least 0.005 grams of heteroatoms; at least 0.01 grams of residue; at least 0.04 grams C5 asphaltenes; at least 0.002 grams of micro residue (MCR); per gram of crude; at least 0.00001 grams of alkali metal salts of one or more organic acids; and at least 0.005 grams of sulfur. In one embodiment, the heavy oil feedstock has a sulfur content of at least 5 wt. % and an API gravity ranging from −5 to +5. A heavy oil feed such as Athabasca bitumen (Canada) typically has at least 50% by volume vacuum reside. A Boscan (Venezuela) heavy oil feed may contain at least 64% by volume vacuum residue. A Borealis Canadian bitumen may contain about 5% sulfur, 19% of asphaltenes and insoluble $THF_1$ (tetrahydrofuran) of less than 1 kg/ton.

"Treatment," "treated," "upgrade," "upgrading" and "upgraded," when used in conjunction with a heavy oil feedstock, describes a heavy oil feedstock that is being or has been subjected to hydroprocessing, or a resulting material or crude product, having a reduction in the molecular weight of the heavy oil feedstock, a reduction in the boiling point range of the heavy oil feedstock, a reduction in the concentration of asphaltenes, a reduction in the concentration of hydrocarbon free radicals, and/or a reduction in the quantity of impurities, such as sulfur, nitrogen, oxygen, halides, and metals.

The upgrade or treatment of heavy oil feeds is generally referred herein as "hydroprocessing" (hydrocracking, or hydroconversion). Hydroprocessing is meant as any process that is carried out in the presence of hydrogen, including, but not limited to, hydroconversion, hydrocracking, hydrogenation, hydrotreating, hydrodesulfurization, hydrodenitrogenation, hydrodemetallation, hydrodearomatization, hydroisomerization, hydrodewaxing and hydrocracking including selective hydrocracking. The products of hydroprocessing may show improved viscosities, viscosity indices, saturates content, low temperature properties, volatilities and depolarization, etc.

Hydrogen refers to hydrogen, and/or a compound or compounds that when in the presence of a heavy oil feed and a catalyst react to provide hydrogen.

"Surfactant" can be used interchangeably with "surface active agent," "stabilizer," or "surface modifier," referring generally to any material that operates to lower the surface tension of a liquid or to reduce the liquid droplet size, thus improving the wetting at the interface between the dispersed catalyst particles and the hydrocarbon oil.

"Catalyst precursor" refers to a compound containing one or more catalytically active metals, from which compound the slurry catalyst is eventually formed, and which compound may be catalytically active as a hydroprocessing catalyst. An example is a water-based catalyst prior to the transformation step with a hydrocarbon diluent, another example is a sulfided metal precursor.

"One or more of" or "at least one of" when used to preface several elements or classes of elements such as X, Y and Z or $X_1$-$X_n$, $Y_1$-$Y_n$ and $Z_1$-$Z_n$ is intended to refer to a single element selected from X or Y or Z, a combination of elements selected from the same common class (such as $X_1$ and $X_2$), as well as a combination of elements selected from different classes (such as $X_1$, $Y_2$ and $Z_n$).

SCF/BBL (or scf/bbl) refers to a unit of standard cubic foot of gas ($N_2$, $H_2$, etc.) per barrel of hydrocarbon feed, or slurry catalyst, depending on where the unit is used.

The Periodic Table referred to herein is the Table approved by IUPAC and the U.S. National Bureau of Standards, an example is the Periodic Table of the Elements by Los Alamos National Laboratory's Chemistry Division of October 2001.

"Metal" refers to reagents in their elemental, compound, or ionic form. "Metal precursor" refers to the metal compound feed to the process. The term "metal" or "metal precursor" in the singular form is not limited to a single metal or metal precursor, e.g., a Group VIB or a Promoter metal, but also includes the plural references for mixtures of metals. "In the solute state" means that the metal component is in a protic liquid form.

"Group VIB metal" refers to chromium, molybdenum, tungsten, and combinations thereof in their elemental, compound, or ionic form.

"Group VIII metal" refers iron, cobalt, nickel, ruthenium, rhenium, palladium, osmium, iridium, platinum, and combinations thereof.

"Primary metal" refers to a metal in its elemental, compound, or ionic form selected from any of Group VIB (IUPAC nomenclature Group 6), Group VIII metals (IUPAC nomenclature Group s 8-10), Group IIB metals, and combinations thereof, in its sulfided form functions as a catalyst in a hydroprocessing process. The Primary metal is present in a catalyst in a larger amount than other metals.

"Promoter metal" refers to a metal in its elemental, compound, or ionic form selected from any of Group IVB (IUPAC nomenclature Group 4), Group VIB, Group VIII, Group IIB metals (IUPAC nomenclature Group 12), and combinations thereof, added to increase the catalytic activity of the Primary metal. Promoter metal is present in a smaller amount than the Primary metal, in a range from 1-50 wt. % (Promoter metal to Primary metal) in one embodiment, and from 2-30 wt. % in a second embodiment.

"Free of Promoter metal" or "substantially free of Promoter metal" means that in making the catalyst, no Promoter metal in their elemental, compound, or ionic form, is added. Traces of Promoter metals can be present, in an amount of less than 1% of the Primary metal (wt. %).

1000° F.+ conversion rate refers to the conversion of a heavy oil feedstock having a boiling point of greater than 1000° F.+ to less than 1000° F. (538° C.) boiling point materials in a hydroconversion process, computed as: 100%* (wt. % boiling above 1000° F. materials in feed−wt. % boiling above 1000° F. materials in products)/wt. % boiling above 1000° F. materials in feed).

"Pressure leach solution" or PLS, also known as "pregnant leach solution," "pregnant leach liquor," or "leach solution" refers to a composition obtained from recovery of metals from metallurgical wastes, mineral ores and/or concentrates, spent batteries, or spent catalysts, wherein a leaching step under pressure and temperature is employed to dissolve or cause the leaching of certain metal component(s) into the aqueous phase, giving a pressure leach solution.

"Pressure leach slurry," also known as "leach slurry," refers to a slurry resulting from the dissolution of metals such as Group VIB metals, Promoter metals, and the like, from a spent catalyst. In one embodiment wherein the leach slurry is from a metal recovery process, e.g., recovery of metals from spent slurry catalyst, the pressure leach slurry may contain coke in an amount of 1 to 20 wt. %.

"Dispersion" also known as "emulsion" refers to two immiscible fluids in which one fluid (e.g., catalyst precursor, metal precursor, etc.) is suspended or dispersed in the form of droplets in the second fluid phase (e.g., heavy oil feedstock or hydrocarbon diluent) as the continuous phase. In one embodiment, the droplets are in the range of 0.1 to 300 µm. In another embodiment, from 1 to 10 µm. In a third embodiment, the droplets are in the range of 0.5 to 50 µm in size. The droplets can subsequently coalesce to be larger in size. Droplet size can be measured by methods known in the art, including particle video microscope and focused beam reflectance method, as disclosed in Ind. Eng. Chem. Res. 2010, 49, 1412-1418, the disclosure of which is herein incorporated in its entirety by reference.

"Rework" "may be used interchangeably with "rework materials" or "catalyst fines," referring to catalyst products, scrap pieces, fines, or rejected materials obtained from the process of making any of a supported catalyst, a self-supported catalyst, and a catalyst precursor, reduced in size to fines or powdered materials containing one or more catalytic materials. The catalyst fines can be generated from a catalyst product, or from the rejected materials/scrap pieces containing catalytic materials generated in the process of making the catalyst product. The catalyst fines can be sulfided or unsulfided. In one embodiment, the rework is from making unsupported catalyst precursor, wherein the rework is generated from final products, catalyst fines, broken pieces, scrap pieces and the like, and before the catalyst precursor is sulfided. In another embodiment, the rework is generated from of fines, final products, scrap pieces, etc., generated from the process of forming/shaping a catalyst precursor and before the sulfidation step. In another embodiment, the rework is in the form of fines generated from grinding any of supported catalyst products, unsupported catalyst products, scrap pieces, fines, and combinations thereof, generated in a process to make a supported catalyst or an unsupported catalyst.

Reaction rate constants ("k-values") for reactions such as HDN, HDS, and HDMCR refer to the constant of proportionality which relates the rate of conversion of a particular fraction (VGO, VR, etc.), or of particular class of compounds in the feed (sulfur-containing or HDS, nitrogen containing or HDN), to the appropriate functions of the process, such as the concentration of the reactants, process pressure, flow rate, and other process-specific variables. As computed herein, the total volumetric flow rate to the system (LHSV) includes the fresh VR stream is corrected to account for the effect of gas hold-up.

Pore porosity and pore size distribution in one embodiment are measured using mercury intrusion porosimetry, designed as ASTM standard method D 4284. Unless indicated otherwise, pore porosity is measured via the nitrogen adsorption method.

In one embodiment, the invention relates to methods for making slurry catalysts having improved properties including but not limited to high surface area and large pore volume. The invention also relates to a method for the hydroconversion or upgrade of heavy oils, by sending the heavy oil feed to the upgrade process in the presence of the improved slurry catalyst, operating under conditions to get at least 30% 1000° F.+ conversion in one embodiment, at least 50% 1000° F.+ in another embodiment.

Metal Precursor(s) Feed: In one embodiment, the catalyst is prepared from at least a Primary metal component (e.g., a Group VIB metal precursor) and at least one Promoter metal precursor (e.g., a Group VIII metal precursor, a Group IIB metal precursor, or a Group VIII metal precursor such as Ni and a Group IVA metal precursor such as Ti). In another embodiment, the catalyst is prepared from at least a Primary metal precursor with no Promoter metal added. In yet another embodiment, the catalyst is prepared from at least a Group VIII metal such as a nickel compound as the Primary metal component, with or without the subsequent addition of other metals as Promoter metals. In yet another embodiment, the catalyst is prepared from a double salt precursor containing at least two different metal cations, e.g., prepared from at least two different metal precursor feeds. Multiple Promoter metal precursors can be used as the feedstock, e.g., different Group VIII metal precursors are used such as Ni and Co. Multiple Primary metal precursors can be used as co-catalyst, e.g., Mo and W.

In embodiments with the addition of at least a Promoter metal, the weight ratio of the Promoter metal component to the Primary metal component is in the range of 1 to 90%. In a second embodiment, the ratio ranges from 2 to 50%. In a third embodiment, from 5 to 30%. In a fourth embodiment, from 10 to 20%.

In one embodiment, at least one of the metal precursors may be oil soluble, oil dispersible, water soluble and/or water dispersible. The metal precursors can be provided as an elemental metal or as a metal compound. The metal precursors can be added in the solid state. In one embodiment, one of the metal precursors can be added in the solid state, while the second metal precursor can be added in the solute state. The metal precursors can be the same or different, e.g., all organic compounds, all inorganic compounds, or one organic and one inorganic. The metal precursors in one embodiment can be catalytically active, e.g., a reagent grade metal sulfide or a beneficiated ore.

In one embodiment, at least one of the metal precursors is an organic compound selected from metal salts of organic acids, such as acyclic and alicyclic aliphatic, carboxylic acids containing two or more carbon atoms. Non-limiting examples include acetates, oxalates, citrates, naphthenate and octoates. In another embodiment, the metal precursors are selected from salts of organic amines. In yet another embodiment, the metal precursors are selected from organometallic compounds, e.g., chelates such as 1,3-diketones, ethylene diamine, ethylene diamine tetraacetic acid, phthalocyanines and mixtures thereof. In another embodiment, the organic metal precursors are selected from salts of dithiolate, dithiocarbamate, and mixtures thereof. An example is a Group VIII metal precursor such as a dithiocarbamate complex. Another example of a Group VIB metal precursor is a soluble molybdenum-containing organophosphorodithioate such as molybdenum dialkyl dithiophosphate. The metal precursors can also be sulfur-containing organic compounds, e.g., a chelate compound with sulfur as a coordinating atom such as sulfhydryl S—H, or a molybdenum oxysulfide dithiocarbamate complex (Molyvan A).

In one embodiment, the Group VIB metal precursor (as a Primary metal or a Promoter metal) is selected from the group of alkali metal or ammonium metallates of molybdenum in organic solvents such as a normal alkane, hydrocarbons, or petroleum products such as distillate fractions wherein the molybdenum compound is allowed to subsequently decompose under pressure and temperature, prior to or concurrent with the addition of the Promoter metal precursor.

In one embodiment, the Group VIB metal precursor feed is a water-soluble salt, e.g., oxides and polyanions such as molybdates, tungstates, chromates, dichromates, etc.

In one embodiment, the Group VIB metal precursor is selected from the group of alkali metal heptamolybdates, alkali metal orthomolybdates, alkali metal isomolybdates, phosphomolybdic acid, and mixtures thereof. In another embodiment, it is selected from the group of molybdenum (di- and tri) oxide, molybdenum carbide, molybdenum nitride, aluminum molybdate, molybdic acid (e.g. $H_2MoO_4$), or mixtures thereof. In yet another embodiment, the Group VIB metal compound is an organometallic complex, e.g., oil soluble compound or complex of transition metal and organic acid, selected from naphthenates, pentanedionates, octoates, acetates, and the like. Examples include molybdenum naphthenate and molybdenum hexacarbonyl.

In one embodiment, the at least one of Group VIII metal precursor (as a Promoter metal or as a Primary metal component) is selected from inorganic compounds, including but not limited to sulfates, nitrates, carbonates, sulfides, oxysulfides, oxides and hydrated oxides, ammonium salts and heteropoly acids thereof. In one embodiment, the Group VIII metal precursor is a water-soluble compound such as acetate, carbonate, chloride, nitrate, acetylacetone, citrate, sulfate, and oxalate, e.g., nickel nitrate, nickel sulfate, nickel acetate, nickel chloride, etc., and mixtures thereof. In another embodiment, the metal precursor is a compound which is at least partly in the solid state, e.g., a water-insoluble nickel compound such as nickel carbonate, nickel hydroxide, nickel phosphate, nickel phosphite, nickel formate, nickel sulfide, nickel molybdate, nickel tungstate, nickel oxide, nickel alloys such as nickel-molybdenum alloys, Raney nickel, or mixtures thereof.

In one embodiment, a Group IIB metal precursor such as zinc is employed as a Promoter metal (instead of a Group VIII metal precursor). Zinc is a less expensive material and more environmentally friendly than other metal precursors such as nickel. Examples include but are not limited Group IIB inorganic compounds such as zinc sulfate, zinc nitrate, zinc carbonate, zinc sulfide, zinc oxysulfide, zinc oxide and zinc hydrated oxide, zinc ammonium salts and heteropoly acids thereof. Other examples of zinc as a Promoter metal precursor include oil soluble organic acid salts such as zinc acetate, zinc oxylate, zinc citrate, zinc napthanate and zinc octoates. In another embodiment, the Promoter metal precursor is selected from zinc salts of organic amines such as aliphatic amines, aromatic amines, quaternary ammonium compounds, and mixtures thereof. In yet another embodiment, the zinc metal precursors are selected from organometallic compounds such as chelates including chelate compounds with sulfur as a coordinating atom, e.g., thiols such as dialkyldithiophosphates, thio- or dithiocarbamates, phosphorothioates, thiocarbonates, trimercaptotriazine, thiophenates, mercaptans, thiol carboxylic acids RC(O)SH, dithio acids RC(S)SH, and related compounds.

Organic Solvent Feed: In one embodiment with the use of organometallic compounds as metal precursors, the solubility of the catalyst precursor in oil is increased, which may lead to higher dispersion and more active catalyst particularly if the catalyst precursor is to be sulfided directly in a heavy oil feedstock. Organometallic compounds can be expensive compared to inorganic compounds, but inorganic metal precursors are not soluble in oil. In one embodiment, polar aprotic solvents are used in conjunction with inorganic metal precursors for the preparation of the precursor feed. The organic solvent, e.g., an organosulfur compound which is compatible with both the inorganic metal precursor and the oil feedstock, acts as a solvent to dissolve the inorganic metal precursor. With the use of the organic solvent, the inorganic metal precursor becomes dispersible in the heavy oil feedstock, thus alleviating the need for a transforming step. In one embodiment with the use of an organic solvent to help disperse the inorganic metal precursor in the heavy oil feedstock, a separate sulfiding step can be eliminated as the metal precursor can be sulfided with sulfur sources inherently present in the heavy oil feedstock.

In one embodiment, the organic solvent is selected from the group of polar aprotic solvents such as N-Methylpyrrolidone (NMP), dimethylformamide (DMF), dimethylacetamide (DMAC), hexamethylphosphortriamide (HMPA), dimethyl sulfoxide (DMSO), tetrahydrofuran, propylene carbonate, dimethyl sulfite, N-nitrosodimethylamine, γ-butyrolactone, N:N dimethyl formamide, dimethyl carbonate, methyl formate, butyl formate and mixtures thereof. The organic solvent can be used as neat liquids, or in combination with other inexpensive solvents such as water or methanol. Examples of inorganic metal precursors for use with the organic solvent include but are not limited to molybdenum oxide, sulfide, or oxysulfide of the general formula $MoO_xS_y$, wherein $x≥0$, $y≥0$. In one embodiment, the Group VIB inorganic metal precursor is molybdenum trioxide. In another embodiment, the inorganic metal precursor is ammonium heptamolybdate.

In one embodiment, oil soluble metal precursors are formed by the interaction of precursors such as ammonium paramolybdate with higher alcohols, glycols, and alkylsalicylic acids. In one example, ammonium paramolybdate is added to concentrated ammonia, at least an oil soluble dispersant, and aromatic solvent such as toluene or xylene. In another example, an oil soluble metal precursor can be prepared from by reacting inorganic metal precursors with polyamides, succinimides and sulfonates. In another example, an oil-soluble sulfur containing metal precursor is prepared by treating with hydrogen sulfide a mixture of ammonium paramolybdate and succinimide. In another embodiment, the oil-soluble metal precursors prepared from inorganic salts are commercially available products including but not limited to OLOA 11007 and OLOA 378, available from Chevron Oronite and Molyvan™ A from RT Vanderbilt Company. In one embodiment, Molyvan™ A additive is used by itself for the preparation of Mo-only catalyst. In another embodiment, Molyvan™ A additive is used in conjunction with nickel naphthenate for the preparation of Ni-promoted slurry catalyst.

In one embodiment, the inorganic metal precursor is dissolved in the organic solvent in a weight ratio of 1:4 to 4:1; a weight ratio of 1:3 to 2:1 in a second embodiment; and a weight ratio of 1:5 to 1:1 in a third embodiment.

Pressure Leach Solution as a Metal Precursor Feed In yet embodiment, a pressure leach solution (PLS) from a metal recovery process can be used as the metal precursor feedstock or part of the metal precursor feedstock. The metal recovery process can be part of a mining/ore operation, an electroplating operation, or recovery of metals from spent catalysts, and the like. A PLS composition may contain a single metal precursor in aqueous solution, or a mixture of metal components such as Group VIB metal and at least another metal precursor. An example of a pressure leach solution (PLS) may contain any of ammonium heptamolybdate (AHM), nickel sulfate, nickel amine sulfate, ammonium metavanadate, ammonium sulfamate and the like. In one embodiment, a PLS stream containing 50 to 90 gpL (grams per liter) molybdenum, 3 to 10 gpL nickel, 0.1 to 1 gpL vanadium, 100 to 500 gpL ammonium sulfate, and 5 to 30 gpL ammonium sulfamate can be used as the metal precursor feed. In another embodiment, the PLS stream contains 20 to 100 gpL (grams per liter) molybdenum, 5 to 20 gpL nickel, 0.10 to 1.0 gpL vanadium, 100 to 500 gpL ammonium sulfate, and 5 to 20-gpL ammonium sulfamate.

In one embodiment and depending on the pH of the pressure leach solution (PLS), some of the metals in the PLS may precipitate wherein the PLS is in the form of a slurry, which can also be used directly as a feed to the process. Details regarding a metal recovery process, and leach stream compositions, and pressure leach slurry compositions from the recovery of metals in spent catalysts can be found in U.S. Pat. Nos. 7,837,960, 7,846,404 and 7,658,895, and U.S. patent application Ser. No. 13/156,589, the relevant disclosures are included herein by reference. In one embodiment, the pressure leach solution in the form of a slurry contains 1-20 wt. % coke and 0.2-4 wt % partially insoluble ammonium metavanadate, which can be filtered out before the solution can be used as metal precursor feedstock.

Double Salt as a Metal Precursor Feedstock: In one embodiment, instead of or in addition to single metal precursor feeds, at least one of the metal precursors is a double salt precursor. A double salt metal precursor is a metal precursor having at least two different metal cations in the molecular structure, with at least one of metal cations being a Primary metal cation and at least one Promoter metal cation, e.g., ammonium nickel molybdate (formed from ammonium molybdate with nickel sulfate). It should be noted that the term "double" is not limited to two metal cations. The double salt precursor can be formed from at least three different metal cations.

In one embodiment, one of the metal cations in the double salt precursor is a Group VIB cation such as molybdenum and the other metal cation is a different cation metal such as nickel or zinc. In another embodiment, the double salt precursor is characterized has having three different metal cations, with two of metal cations are different Group VIB metal cations such as molybdenum and tungsten, and the third cation is a Group VIII metal cation such as nickel or zinc. In yet another embodiment, the double salt precursor comprises three different metal cations, with two of metal cations are different Promoter metal cations such as nickel and titanium, and the third cation is a Primary metal cation such as molybdenum. The use of a double salt as a precursor reagent, particularly in crystal form or in concentrated form as a slurry, can reduce cost in terms of transport to the site to make the slurry catalyst. Additionally, better catalyst performance is possible with the Promoter metal(s) being in the same molecular structure, in close proximity with the Primary metal component when the double salt metal precursor is sulfided, either in-situ or in a separate sulfidation step.

In one embodiment, the double salt precursor is a water-soluble salt, e.g., prepared from crystallizing an aqueous solution of a mixture of at least a Group VIB metal salt and a Group VIII or Group IIB metal salt, e.g., ammonium molybdate and nickel sulfate, ammonium molybdate and zinc sulfate, ammonium octamolybdate and a double salt of nickel ammonium sulfate, potassium molybdate and iron sulfate, potassium chromium sulfate and ammonium para-molybdate, etc. In one embodiment, the pH of the aqueous solution of the salt mixture is adjusted with the addition of an acid and/or a base to a pre-selected pH for the double salt to crystallize out of solution. At the pre-select pH which does not favor the solubility of the multi-metallic bimetallic compound, a double salt precipitates out. The formation of the precipitate ensures that the different metals constituting the catalyst precursor are well dispersed together in the solid phase.

In one embodiment, the double salt metal precursor is prepared from a pressure leach solution or a leach slurry from a metal recovery process, optionally with the adjustment of the pH and/or the addition of a metal salt in aqueous solution form to cause the precipitate of the double salt for use as a metal precursor feed.

In one embodiment, the double salt is an oil-soluble salt prepared by the reaction of at least a Group VIII metal precursor or a Group IIB metal precursor, and at least a Group VIB organometallic complex. In another embodiment, the double salt is prepared by the reaction of an oil soluble molybdenum salt and an oil soluble transition metal salt. In one embodiment, the reaction to form the oil-soluble double salt precursor is in the presence of a strong reducing agent such as hydrogen. In one embodiment, the Primary metal oil soluble compound is selected from naphthenates, pentanedionates, octoates, acetates, and mixtures thereof. Examples include but are not limited to molybdenum naphthenate and molybdenum hexacarbonyl.

In one embodiment, the reaction to form the oil-soluble double salt is carried out at a temperature of at least 100° C. for a sufficient length of time, e.g., between 2 hours and 48 hours. In another embodiment, the reaction to form the oil-soluble double agent is carried out in a reducing environment and in the presence of an inert, water-immiscible, organic solvent. Examples of organic solvents include but are not limited to aliphatic or aromatic hydrocarbons or chlorinated hydrocarbons such as benzene, toluene, xylene, ethylbenzene, dipentene, turpentine, petroleum products such as gasoline, mineral spirits, kerosene, mineral oil, fuel oil, aromatic naphthas, and chlorinated hydrocarbons as $CCl_4$, o-dichlorobenzene, monochlorotoluene, ethylene dichloride, perchloroethylene, and mixtures thereof.

In one embodiment, the reaction to form the double salt precursor is carried out under conditions that exceed the boiling point of water such that water is removed as it is formed during the reaction. The water is allowed to escape from the reaction vessel as water vapor. In yet another embodiment, chemical drying agents such as calcium chloride or an azeotropic agent can be employed to remove water from the reaction product to form the oil-soluble double salt, although this is usually not necessary. Any known solid separation techniques can also be used such as filtering and the like.

In one embodiment, at least half of the Primary metal precursor feedstock and/or Promoter metal precursor is in solution at a concentration of less than 10 wt. % with the addition of appropriate diluent, e.g., water for a water-soluble metal precursor or a hydrocarbon diluent such as an olefinic diluent or a cycle oil for an oil-based metal precursor, forming a metal precursor solution, suspension, or emulsion. In selecting the appropriate diluent for the metal precursor feedstock, one or more criteria may be used, including, but not limited to: the flash point of the diluent, the inert nature of the diluent under certain conditions as related to the catalytic process in which the metal precursor is used, the ability of the diluent to cause the metal precursor to be fluid-like and moveable at the appropriate temperatures and pressures, and/or the ability of the diluent to present certain processing advantages in subsequent processes. For example, it may be advantageous to select a diluent that does not react with the metal precursor at standard storage and transportation temperatures, but provides for a stable solution of metal precursor that may be stored or shipped over long distances to a facility that further prepares and/or uses the metal precursor/diluents composition to make the slurry catalyst.

In one embodiment, a sufficient amount of diluent is added to the metal precursor feedstock for the solution to have a pH of at least 4. In a second embodiment, the precursor feedstock has a pH of at least 5. In a third embodiment, the precursor feedstock has a pH of at least 6. The metal precursor feedstock is in solution with a concentration of metal between 1-5 wt. % in one embodiment; between 0.1-10 wt. % in another embodiment; between 0.1 to 2 wt. % in a third embodiment. In one embodiment, the metal concentration in at least one of the metal precursor solution is between 5-8 wt. %. In another embodiment, at least one of the metal precursor feedstock is a solution with a pH of at least 4 and a metal concentration of 5 to 8 wt. %. In one embodiment, the metal precursor comprises at least a Primary metal in an aqueous solution with a concentration of 0.25-10 wt. %. In another embodiment, the Promoter metal concentration is also in aqueous solution with a concentration of less than 10 wt. % metal. In yet another embodiment, at least one of the metal precursor feedstock is in solution at a concentration between 0.1 and 8 wt. %.

Rework Materials as Metal Precursor Feedstock: In one embodiment, at least a portion of the metal precursor feedstock is in a solid form, more specifically in the form of "rework." Examples include rework materials generated in the making of supported and unsupported (mixed Group VIII and Group VIB metal) catalyst precursors used for hydroconversion processes known in the art. In one embodiment, the rework materials are prepared from a supported catalyst, e.g., a metal precursor or catalyst precursor such as a metal oxide or metal hydroxide, affixed onto a porous refractory base ("a carrier") comprising one or more of alumina, silica, magnesia, titania, zeolite, silica-aluminate, carbon, phosphorous or various combinations of these. The alumina in the base can be in several forms including amorphous, alpha, gamma, theta, boehmite, pseudo-boehmite, gibbsite, diaspore, bayerite, nordstrandite and corundum. In one embodiment, the alumina is boehmite or pseudo-boehmite. In another embodiment, the rework materials are prepared from an unsupported or bulk catalyst with or without the use of a diluent or binder material (e.g., cellulose), such as catalyst precursor comprising a metal oxide or metal hydroxide. The metals that are used in the supported catalyst going into rework materials include base metals or compounds thereof, selected from Group VIB metals or Group VIII metals of the Periodic Table, or combinations thereof.

Examples of supported and unsupported catalyst precursors and process for making thereof are as disclosed in U.S. Pat. Nos. 2,238,851; 4,113,661; 4,066,574; 4,341,625; 5,841,013; 6,156,695; 6,566,296; 6,860,987; 7,544,285; 7,615,196; 6,635,599; 6,635,599; 6,652,738; 7,229,548; 7,288,182; 6,162,350; 6,299,760; 6,620,313; 6,758,963; 6,783,663; 7,232,515; 7,179,366; 6,274,530; 7,803,266; 7,185,870; 7,449,103; 8,024,232; 7,618,530; 6,589,908; 6,667,271; 7,642,212; 7,560,407, 6,030,915, 5,980,730, 5,968,348, 5,498,586; and US Patent Publication Nos. US2009/0112011A1, US2009/0112010A1, US2009/0111686A1, US2009/0111685A1, US2009/0111683A1, US2009/0111682A1, US2009/0107889A1, US2009/0107886A1, US2009/0107883A1, US2011/0226667, US2009/0310435, US2011/0306490A1, and US2007/090024, the relevant disclosures are included herein by reference.

In one embodiment, rework materials for use as metal precursor feed comprise scrap/discarded/unused materials generated in any step of the preparation of (unsulfided) catalyst/catalyst precursor. Rework can be generated from any of the forming, drying, or shaping of the catalyst/catalyst precursor, or formed upon the breakage or handling of the catalyst/catalyst precursor in the form of pieces or particles, e.g., fines, powder, and the like. In the process of making catalyst precursors, e.g., by spray drying, pelleting, pilling, granulating, beading, tablet pressing, bricketting, using compression method via extrusion or other means known in the art or by the agglomeration of wet mixtures, forming shaped catalyst precursors, rework material is generated. Rework materials can also be generated from commercially available catalyst products, including supported and self-supported catalyst from such as ICR™ supported catalyst from Advanced Refining Technologies LLC, Nebula™ bulk catalyst from Albermale, or CRI™ NiMo alumina supported catalyst from Criterion Catalyst & Technologies, reduced to a size of less than 300 µm. In one embodiment, rework material consists essentially of unsulfided catalysts, made with or without the use of diluents or binders such as alumina, silica alumina, cellulose and the like.

In one embodiment, the rework material is prepared in a method as described in US Patent Application No. 20110306490, incorporated herein by reference in its entirety. The support material, e.g., alumina, iron oxide, silica, magnesia, titania, zeolite, etc., is first ground to particles of less than 300 µm. Catalytic materials, e.g., double metal precursors or single metal precursors such as ammonium heptamolybdate, or any soluble form of molybdenum, etc. are then deposited (impregnated) onto the ground base. The impregnated base is dried, then ground to a particle size of 1 to 300 µm. In one embodiment, the deposition of catalytic materials is followed by calcination so the catalytic materials sinter with the metal in the support to effect loading. The deposition of catalytic materials can be carried out more than once to maximize the catalyst loading, or different metal precursors can be deposited onto the ground support base at the same time or as different layers for multi-metallic catalyst fines.

In one embodiment, the rework material for use as metal precursor feed has an average particle size of less than 250 µm and greater than 1 µm. In a second embodiment, the average particle size is less than 75 µm. In a third embodiment, an average particle size in the range of 2 to 50 µm. In a fourth embodiment, an average particle size of less than 20 µm. In a fifth embodiment, less than 10 µm. The rework material can be ground or crushed to the desired particle size using techniques known in the art, e.g., via wet grinding or dry grinding, and using equipment known in the art including but not limited to hammer mill, roller mill, ball mill, jet mill, attrition mill, grinding mill, media agitation mill, etc.

Sulfiding Agent Component: In one embodiment, a sulfided slurry catalyst is formed with the addition of at least a sulfiding agent to inorganic metal precursors. In one embodiment, the sulfiding agent is elemental sulfur by itself. In another embodiment, the sulfiding agent is a sulfur-containing compound which under prevailing conditions, is decomposable into hydrogen sulphide $H_2S$. In yet a third embodiment, the sulfiding agent is $H_2S$ by itself or in a hydrocarbon mixture. In another embodiment, a sulfided slurry catalyst is formed in-situ by mixing the metal precursor feed with a heavy oil feedstock which releases a sulfiding agent under sufficient conditions, generating a sulfided slurry catalyst in-situ.

In one embodiment, the sulfiding agent is present in an amount in excess of the stoichiometric amount required to form the slurry catalyst. In another embodiment and depending on the metal precursor component (e.g., metal precursor is a sulfur-containing organic compound), the total amount of sulfur-containing compound is generally selected to correspond to any of about 50-300%, 70-200%, and 80-150%, of the stoichiometric sulfur quantity necessary to convert the Primary metal and the Promoter metals, if any, into for example, $CO_9S_8$, $MoS_2$, $WS_2$, $Ni_3S_2$, etc. In yet another embodiment, the amount of sulfiding agent represents a sulfur to the Primary metal mole ratio of at least 1.5 to 1 to produce a sulfided catalyst from the metal precursor(s). In another embodiment, the molar ratio of S to the Primary metal is at least 3 to 1.

In one embodiment, the sulfiding agent is an aqueous solution of ammonium sulfide. The solution can be synthesized from hydrogen sulfide and ammonia—common refinery off-gases. In another embodiment, sour water after treatment is employed as the sulfiding source. Sour water is commonly and cheaply available as wastewater from refineries, which may contain anywhere between 1 to 50 wt. % ammonium bisulfide. In yet another embodiment, recycled $H_2S$ from process streams can also be used for the sulfiding process. Recycled $H_2S$ stream is first concentrated/treated in gas removal units, using amine treating gases known in the art including but not limited to monoethanolamine (MEA), diethanolamine (DEA), methyldiethanolamine (MDEA), Diisopropylamine (DIPA), and mixtures thereof. In another embodiment, recycled $H_2S$ is treated/recovered in a SELEXOL™ process. Synthesized ammonium sulfide and/or sour water can be stored in tanks prior to use. Since ammonium sulfide solution is more dense than resid, it can be separated easily in a settler tank after reaction.

Hydrocarbon Transforming Medium (Diluent): In some embodiments with in-situ sulfidation of metal precursors in a heavy oil feedstock, the slurry catalyst is transformed into an oil based slurry catalyst with the in-situ sulfidation. In other embodiments with a water-based catalyst (with inorganic/water-soluble metal precursor starting feed), a hydrocarbon transforming medium (used interchangeably with "diluent" or "carrier") is employed to transform a sulfided water-based catalyst (hydrophilic) to an oil based active catalyst (hydrophobic).

The nature of the hydrocarbon is not critical, and can generally include any hydrocarbon compound, acyclic or cyclic, saturated or unsaturated, un-substituted or inertly substituted, and mixtures thereof, which is liquid at ordinary temperatures.

In one embodiment, the weight ratio of the water-based catalyst to the hydrocarbon diluent ranges from 1:50 to 10:1. In a second embodiment, the weight ratio of the water based catalyst to the hydrocarbon diluent ranges from 1:10 to 5:1. In a third embodiment, from 1:5 to 1:1. In one embodiment with a continuous transformation step, the ratio of catalyst to hydrocarbon diluent ranges from 2:1 to 5:1. In another embodiment with a batch transformation step, the ratio ranges from 1:1 to 2:1.

In one example, the hydrocarbon compound is derived from petroleum, including mixtures of petroleum hydrocarbons characterized as virgin naphthas, cracked naphthas, Fischer-Tropsch naphtha, light cat cycle oil, heavy cat cycle oil, and the like, typically those containing from about 5 to about 30 carbon atoms. In one embodiment, the hydrocarbon compound is a vacuum gas oil (VGO). In yet another embodiment, the diluent is a mixture of heavy oil and VGO. In another embodiment, the diluent is selected from the group of gasoline, distillate, naphtha, light cycle oil, benzene, toluene, xylene, etc. In one embodiment, the hydrocarbon compound has a kinetic viscosity ranging from 2 cSt to 15 cSt @ $10^{o\circ}$ C. In a second embodiment, the hydrocarbon oil has a kinematic viscosity of at least 2 cSt at $10^{o\circ}$ C. In a third embodiment, from 5 cSt to 8 cSt at $10^{o\circ}$ C. In one embodiment with the kinematic viscosity of the hydrocarbon transforming medium being below 2 cSt @ $10^{o\circ}$ C. or above about 15 cSt @ $10^{o\circ}$ C., the transformation of the catalyst precursor results in catalyst particles agglomerating or otherwise not mixing.

Optional Components: The slurry catalyst in one embodiment may optionally comprise other components including but not limited to pore forming agents, emulsifier agents, surfactants, sulfur additives, sulfiding agents, stabilizers, binder materials, phosphorus compounds, boron compounds, additional transition metals, rare earth metals or mixtures thereof, depending on the envisaged catalytic application.

Details regarding the description of metal precursor feed, optional components, other sulfiding agents, and other hydrocarbon transforming media are described in a number of patent applications and patents, including US Patent Publication No. 2010-0234212, U.S. Pat. Nos. 7,754,645 and 7,410,928, the relevant disclosures are included herein by reference.

It should be noted that the optional components can be added in any process step in the making of the slurry catalyst, depending on the nature of the optional components and the desired effect. In one embodiment, binders are added directly to the metal precursors prior to the sulfidation. In one embodiment with the use of emulsifiers, they are added after the sulfidation of the metal precursors forming a sulfided catalyst. In another embodiment, the optional components are added to the sulfidation step, e.g., sulfiding agents. In a third embodiment, optional components such as surfactants and the like are added to the transformation step, or directly to the metal precursors or diluents prior to the sulfidation of the metal precursors. In yet another embodiment, phosphorous-containing promoters, etc., can be added separately or in a mixture with the sulfiding agent and the metal precursors to increase the incorporation of sulfur in the sulfidation step.

Methods for Forming Slurry Catalysts: In one embodiment, the slurry catalyst is prepared from at least a Primary metal component, e.g., a Group VIB metal precursor and at least a Promoter metal precursor. In another embodiment, the catalyst is essentially free of Promoter metal with no Promoter metal purposely added, e.g., prepared from Group VIB metal precursor reagent(s). In another embodiment, the slurry catalyst is prepared from at least Group VIII metal precursor reagent such as nickel sulfate as the sole starting feed.

The metal precursors can be added to the reaction mixture in solution, suspension or as such. If soluble salts are added as such, they will dissolve in the reaction mixture and subsequently be precipitated. In one embodiment, the solution is heated optionally under vacuum to effect precipitation and evaporation of the water.

In one embodiment, aqueous ammonia is brought into contact with at least a Primary metal compound, such as molybdenum oxide or tungsten oxide, forming a water soluble oxygen-containing compound such as ammonium molybdate or tungstate. In the next step, the Primary metal component in solution is brought into contact with at least a Promoter metal component in solution, optionally with the adjustment of the pH to a pre-selected pH by the addition of an acid, a base, or a suitable compound which decomposes upon temperature increase into hydroxide ions or $H^+$ ions that respectively increase or decrease the pH, facilitating the formation of the double salt metal precursor. In one embodiment, the pH is controlled such that the pH at the beginning of the reaction differs from the final pH after precipitation. In another embodiment, the formation of the double salt metal precursor is via the reaction of oil-soluble Primary metal compound and Promoter metal compound(s) in an organic solvent under $H_2$-containing gas pressure, with the organic solvent being a hydrocarbon mixture of alkanes and aromatic compounds.

The reaction of Primary metal and Promoter metal components to form the double salt precursor is carried out at a weight ratio of Promoter metal to Primary metal from 0.01:1 to 1:2 in one embodiment; from 0.05:1 to 0.3:1 in another embodiment; 0.10:1 to 0.25:1 in yet another embodiment. In one embodiment, the Primary metal is a Group VIB metal and the Promoter metal is a Group VIII metal in a weight ratio of Promoter metal to Primary metal ranging from 1 to 49 wt. %. After the double salt metal precursor is formed, the slurry mixture is optionally isolated from the liquid using methods known in the art such as filtration, centrifugation, decantation, or combinations thereof. After the double salt metal precursor is formed, it undergoes sulfidation and/or transformation into an oil-based catalyst either in-situ upon contact with a hydrocarbon feed, or in a separate sulfiding step and prior to a transformation step upon contact with a hydrocarbon diluent such as VGO.

Sulfidation of the metal precursor feed(s) can be done various ways. In one embodiment, the Primary metal component is first sulfided prior to addition of the Promoter metal precursor (unsulfided), generating a promoted sulfided catalyst precursor. In another embodiment, the Primary metal precursor (unsulfided) is brought into contact with a sulfided Promoter metal precursor and the mixture may or may not be sulfided again to form a catalyst precursor. In a third embodiment, the Primary metal precursor is co-sulfided in the same step with the Promoter metal precursor, and the sulfided catalyst precursor may or may not be sulfided again for an enhanced sulfided catalyst precursor. In yet another embodiment, the Primary metal precursor and the Promoter metal precursor(s) are separately sulfided and combined, and the sulfided (combined) catalyst precursor may or may not be sulfided again for an enhanced sulfided catalyst precursor. In another embodiment without any Promoter metals, the Primary metal precursor feed is sulfided before transformation with a hydrocarbon diluent. In yet another embodiment with the use of double salt metal precursor(s) as feed, the double salt metal precursor feed is sulfided generating a promoted sulfided catalyst precursor.

"Enhanced sulfiding" refers to the sulfidation of a metal precursor (or mixtures thereof) comprising at least one sulfided metal precursor again, for an enhanced sulfidation scheme, resulting in a relatively high ratio of S to Primary/Promoter metal(s) with improved catalytic performance. In one embodiment of enhanced sulfiding (or "double sulfiding" or two-step sulfiding), at least one of the Primary metal precursor and the Promoter metal precursor is first sulfided at a sulfur to metal mole ratio of at least 1.5 to 1, then combined with the second metal precursor (un-sulfided or sulfided). The mixture is then sulfided again at a sulfur to metal mole ratio of at least 1.5 to 1, generating a promoted and enhanced sulfided catalyst precursor. The sulfiding agent can be the same or different in the different sulfiding steps, and the amount of sulfiding agent (molar ratio of S to metal precursor) can be the same or different in the first sulfiding steps.

In the various configurations as described above, the Primary metal precursor feedstock and/or the Promoter metal precursor feed (if any present) can be fed into the system all at once, or any of the metal precursor feedstock can be portioned and fed in stages.

In one embodiment with a Promoter metal precursor feed, the Promoter metal precursor can be provided all at once, intermittently, or split into portions and fed in stages. As used herein, a portion means at least 10% in one embodiment, at least 20% in a second embodiment, at least 40% in a third embodiment; and at least 60% in a third embodiment. In one embodiment, the feed is split into two portions, with a ratio of first to second staged feeding ranging from 1:10 to 10:1.

In one embodiment, a portion of the Primary metal precursor is first sulfided prior to addition of a portion (or all of) the Promoter metal precursor (unsulfided), generating a promoted sulfided catalyst precursor. A second charge of the Primary metal precursor is added to the promoted sulfided catalyst precursor before or during the transformation step.

In one embodiment, the Promoter metal precursor is also split, with a portion of the Promoter metal precursor feed for the co-sulfiding step with the Primary metal precursor, a second charge of the Promoter metal precursor feed is added after the sulfiding step, and another charge of the Promoter metal precursor feed is made in the transformation step with a hydrocarbon diluent. The promoter metal precursor comprises at least a promoter metal salt selected from an acetate, carbonate, chloride, nitrate, sulfate, actylacetonate, citrate, and oxalate of a Group VIII metal, for promoter metal to primary metal ratio from 1:30 to 5:1.

The split feed scheme in one embodiment reduces deposit build-up in the process of making the slurry catalyst. In one embodiment in the co-sulfiding embodiment, a portion (or all) of Primary metal precursor and a portion (or all) of the Promoter metal precursor(s) are combined and co-sulfided together, with the remainder of the metal precursor feed being subsequently combined with the co-sulfided catalyst precursor, or to be charged in the transformation step to produce the final catalyst.

In one embodiment with enhanced sulfiding, a portion of the Primary and/or Promoter metal precursor feed is added in the subsequent sulfidation step. In another embodiment, a portion of the Primary and/or Promoter metal precursor feed is added to a sulfided catalyst precursor along with a hydrocarbon diluent in the transformation step, transforming the water-based catalyst precursor to a slurry catalyst for heavy oil upgrade. In yet another embodiment, at least 30% of the Promoter metal precursors is combined with all the Primary metal precursor to form a double salt metal precursor, with the remainder of the Promoter metal precursor(s) being added in subsequent stages, e.g., in the sulfidation step and/or in the transformation step. In one embodiment with a multi-metallic slurry catalyst with at least a Primary metal and at least two Promoter metals, the Primary metal precursor is combined with one of the Promoter metal precursors in a co-sulfiding step. The second (remaining) Promoter metal precursor is then combined with the co-sulfided catalyst precursor in a subsequent (additional) sulfiding step, or mixed in with a hydrocarbon diluent in a transformation step.

In the sulfiding step, the sulfidation is carried out at a temperature ranging from room temperature to 760° F. and for a period of up to 24 hours, forming a sulfided catalyst precursor. In one embodiment, the sulfidation completes in 10 minutes or less. In one embodiment, the sulfidation is at 50-450° F. In yet another embodiment, the sulfidation is between 50-300° F. In another embodiment, the sulfidation is between 60-150° F. In one embodiment, the sulfidation is at 0-3000 psig. In a second embodiment, between 100-1000 psig. In a third embodiment, the sulfidation pressure is less than 500 psig. If the sulfidation temperature is below the boiling point of the sulfiding agent, such as 60-70° F. in the case of ammonium sulfide, the process is generally carried out at atmospheric pressure. Above the boiling temperature of the sulfiding agent/optional components, the reaction is generally carried out at an increased pressure, such as in an autoclave.

In one embodiment, the sulfidation step optionally includes blending sulfiding additives, optional metal sulfide powders, and the like, into the catalyst precursor mixture to further enhance the activity of the catalyst. In one embodiment with the sulfiding step being carried out with water-based metal precursor(s), the resultant product of the sulfiding step is a slurry in an aqueous solution. In one embodiment, analyses show that the catalyst precursor product of the sulfiding step is catalytically active, although not in optimum form for use in hydroprocessing operations.

In one embodiment after sulfiding, the catalyst precursor is optionally isolated from the liquid using methods known in the art such as drying, filtration, centrifugation, decantation, or combinations thereof, under an inert atmosphere comprising any of nitrogen, refinery gas, a gas having little or no oxygen, and mixtures thereof. In another embodiment, the sulfided catalyst precursor is subject to reduction with a reducing agent at temperatures ranging from below ambient to above ambient. Examples of reducing agents include but are not limited to hydrogen, hydrogen sulfide, carbon monooxide, finely divided carbon, coke, sulfur, etc. In a reduction step, active metals are converted into a more active state. For example, in one embodiment with Mo as a Primary metal, $MoS_3$ with an oxidation state of 6+ may change its oxidation state to $MoS_2$ with an oxidation state of 4+ and become a slurry. In the reduction step, any metal precursor present also changes its oxidation state, e.g., $Mo^{6+}$ and $Mo^{5+}$ may change its oxidation state to $Mo^{4+}$. The reduced form of active metals may or may not be chemically bonded with sulfur. The reduction step can be before or after the transformation step, or it can occur con-currently in the transformation under reducing conditions and with a reducing agent present (e.g., $H_2$).

In one embodiment after sulfiding, the catalyst precursor is subject to an ammonia removal step before the transformation step. In another embodiment, ammonia removal is concurrent with the transformation, as ammonia is removed with the water in the transformation. In one embodiment, the sulfided water based slurry from the sulfiding step is subject to a simple aqueous phase ammonia flashing step by cooling and depressurizing the slurry stream Ammonia can be flashed off together with any generated hydrogen sulfide and hydrogen present in the system.

In one embodiment, the sulfided catalyst precursor (as prepared from water-soluble metal precursor as feedstock) is mixed with a hydrocarbon compound (diluent) and transformed into an oil based catalyst wherein it is transformed from a hydrophilic to an oil based active catalyst (hydrophobic). In one embodiment of the transformation step, and in the presence of a reducing agent such as $H_2$, reduction also takes place for a sulfided Primary metal such as molybdenum to change its oxidation state. The transformation is at a temperature of 50-760° F. in one embodiment; at a temperature of 100-500° F. in a second embodiment; at 150-450° F. in a third embodiment. The pressure of the transformation step is maintained in the range of 0-3000 psig in one embodiment; between 300-500 psig in a second embodiment. In a third embodiment, from 1000-2500 psig. In a fourth embodiment, less than 2000 psig. In one embodiment, the transformation residence time ranges from 30 minutes to 3 hours. In another embodiment, from 1 to 2 hrs. In yet another embodiment, the residence time is less than 1 hour.

In one embodiment, the process conditions in the transformation/reduction step are sufficient to form the final slurry catalyst. In one embodiment, after the transformation step, the slurry catalyst contains less than 5 wt. % water in one embodiment; less than 3 wt. % water in another embodiment; between 0.01 to 2.5 wt. % water in a third embodiment; and between 0.025 to 2 wt. % water in a fourth embodiment.

In one embodiment with the use of a light oil such as naphtha (with a boiling point above the boiling point of water) as the hydrocarbon transforming medium, to keep the oil at liquid at a high temperature, e.g., a temperature above 392° F. (200° C.), the transformation step is carried out at a pressure in the range of about 2,175 psig to about 2,900 psig. With the use of naphtha, after the transformation step, the light oil can be conveniently vaporized in order to obtain the concentrated slurry catalyst.

In one embodiment, the transformation is under an inert atmosphere comprising any of nitrogen, refinery gas, a gas having little or no oxygen, and mixtures thereof. In another embodiment, the mixing is under a $H_2$-containing gas pressure. In another embodiment, hydrogen gas is added before and after the reactor in which the hydrocarbon/catalyst precursor mixing takes place. In one embodiment, the $H_2$ flow to the transformation step is kept at 100 to 2000 SCFB ("Standard Cubic Feet per Barrel" of hydrocarbon compound feed to the reactor). In a second embodiment, the $H_2$ flow ranges from 300 to 1000 SCFB. In a third embodiment, the $H_2$ flow ranges from 200 to 500 SCFB.

In one embodiment, ammonia/water removal from the oil based slurry catalyst can be carried out after the transformation step. The catalyst stream in one embodiment is heated prior to depressurization and vaporization of ammonia/water. The resultant slurry mixture can go directly to a hydroprocessing reactor without the need for ammonia/water removal, but the presence of water will take up unnecessary room in a hydroprocessing reactor. In one embodiment, the oil based slurry catalyst mixture is passed to high pressure separator to remove water from the slurry catalyst prior to entering a hydroprocessing reactor. Hydrogen may be added following reactor or directly into the high pressure separator to flash off water and residual $H_2S$ in the slurry catalyst.

In one embodiment, ex-situ sulfiding and/or the transformation step(s) can be eliminated by mixing a solution containing metal precursor(s) directly with a heavy oil feed stock, a hydrocarbon diluent (carrier), or a hydrocarbon diluent/heavy oil feedstock mixture at a high shear rate and under hydrogen pressure for a dispersion of at least a portion of the metal precursors in the hydrocarbon as an emulsion. In one embodiment, the emulsion mixing step is carried out with the addition of at least a sulfiding agent. In another embodiment, at least a sulfiding agent is added to the emulsion after the high shear mixing. The metal precursor feed can be any of a PLS feed stream, a double salt metal precursor in solution, a water-soluble metal precursor in solution, or a mixture of water-soluble metal precursors in solution, e.g., a molybdate solution, a zinc sulfate solution, a mixture of molybdate and nickel sulfate, etc. The emulsion in one embodiment is a hydrophobic, oil-dispersed catalyst precursor.

In one embodiment of the high shear mixing, the emulsion particles are formed as droplets and of micron sizes, e.g., from 0.1 to 300 μm in one embodiment, at least 2 μm in a second embodiment, from 1 to 10 μm in a third embodiment, and between 0.5 and 50 μm in a fourth embodiment. The structure and droplet size of the emulsion can be optimized based on process performance requirement and operation cost. There are several ways to form the water-oil emulsion, using techniques and/or high shear equipment known to those of ordinary skill in the art, such as nozzles, in-line static mixers, impellers, turbolators, fluidizers, etc. Surfactants or other additives, e.g., emulsifiers, may be added to form a stable emulsion having the desired structure and droplet size. In one embodiment, at least a portion (e.g., at least 30%) of the aqueous metal/catalyst precursor is present as fine droplets dispersed in the hydrocarbon diluent (medium). In another embodiment, the hydrocarbon diluent is present as fine droplets dispersed in the aqueous catalyst precursor, which may subsequently go through emulsion inversion forming fine dispersion of the aqueous catalyst precursor in hydrocarbon diluent/heavy oil.

In one embodiment, the emulsion of oil-dispersed catalyst precursor can be provided directly to a reactor for heavy oil upgrade with in-situ sulfiding upon mixing with a heavy oil feedstock forming a slurry catalyst. With a heavy oil feedstock, as the feedstock has available sulfur source for sulfidation and under reaction conditions for the desulfurization/release of the sulfur source (e.g., $H_2S$), the emulsion catalyst precursor can be sulfided in-situ.

In one embodiment, the in-situ sulfidation occurs under hydroprocessing conditions, e.g., at a temperature ranging from 752° F. (400° C.) to 1112° F. (600° C.), and a pressure ranging from 1435 psig (10 MPa) to 3610 psig (25 MPa).

In one embodiment, after at least a portion of the inorganic metal precursor(s) is dispersed in a hydrocarbon medium forming an emulsion, the emulsified mixture is optionally sulfided with the use of a sulfiding agent such as hydrogen sulfide or other sulfiding agents. In one embodiment, the sulfiding agent is in gaseous or solid form, as aqueous sulfiding media can interfere with the emulsion droplet size. In another embodiment, additional sulfiding agents can be added at the beginning of the high shear mixing process to get the sulfidation of the emulsion started. In another embodiment, the sulfiding agents can be continuously or intermittently added to the high shear mixing process. In one embodiment, the sulfidation takes from 10 minutes to 1 day. In another embodiment, from 30 minutes to 4 hours. After the sulfiding step, the temperature is raised to remove water/transform the emulsion into a slurry catalyst.

In one embodiment prior to injection into a reactor for heavy oil upgrade, the emulsion (with or without the addition of a sulfiding agent) undergoes a reduction step in the presence of a reducing agent. In yet another embodiment, during or after the high shear mixing or sulfidation step(s), the temperature of the emulsion is raised to remove water. The water removal/transformation is under hydrogen pressure and at a temperature of 50-600° F. in one embodiment; at a temperature of 100-500° F. in a second embodiment; at 150-450° F. in a third embodiment. The emulsion catalyst can be reduced and dewatered on a continuous or batch basis at a pressure up to 3000 psig with the addition of a hydrogen source at a rate of 0.10 to 2 ft³ H2 to 100 g of Primary metal in the emulsion catalyst to remove at least 20% of the water. In one embodiment, high shear mixing is also employed during the transformation step with the choice of appropriate internals in the equipment, e.g., the use of impellers.

In one embodiment with the formation of an oil-dispersible metal precursor, an inorganic metal precursor such as ammonium heptamolybdate (AHM) is brought into contact with an organic solvent at a ratio of 15 to 50 wt. % metal precursor. In one embodiment, the contact is at an elevated temperature of at least 140° F. (60° C.). In one embodiment wherein the organic solvent is a sulfur-containing compound, e.g., DMSO, the sulfiding step can be skipped. The mixture can be brought into contact directly with a hydrocarbon diluent or a heavy oil feed stock under the presence of hydrogen, and optionally with a sulfiding agent, for a final concentration of 200 ppm to 2 wt. % Mo (as a wt. % of heavy oil feedstock), wherein a sulfided active slurry catalyst is generated in-situ for use in heavy oil upgrade.

In another embodiment with the use of organometallic compounds as metal precursors, e.g., an oil soluble organomolybdenum complex such as molybdenum naphthenate and molybdenum dithiocarbamate, the transformation step can be omitted. The slurry catalyst can be prepared directly from the metal precursors by dispersing the oil soluble organometallic compounds (with or without a Promoter) directly into the heavy oil feedstock, or a mixture of heavy oil feedstock and a diluent such as VGO. The mixture is allowed to soak under sufficient conditions to in-situ thermally decompose the organometallic complex, and/or for the heavy oil to release $H_2S$ needed for sulfidation, converting the metal precursors into a finely dispersed sulfided catalyst in the heavy oil.

The sulfidation of the oil soluble organo-molybdenum complex can also be carried out ex-situ. In one embodiment, the sulfiding agent is elemental sulfur by itself. In another embodiment, the sulfiding agent is a sulfur-containing compound which under prevailing conditions, is decomposable into hydrogen sulphide. In yet a third embodiment, the sulfiding agent is $H_2S$ by itself or in $H_2$. In another embodiment, the oil soluble organometallic compound(s) are dispersed in a hydrocarbon diluent such as VGO (instead of heavy oil feedstock), then allowed to soak under sufficient condition for the metal precursors to thermally decompose forming a finely dispersed sulfided catalyst. The sulfided catalyst can be subsequently mixed with heavy oil feedstock for upgrade.

In one embodiment, the metal precursor feedstock is optionally "pre-soaked" in the heavy oil feedstock for a sufficient amount of time, e.g., from 15 minutes to 4 hours, to enhance the catalyst dispersion as well as the sulfidation, resulting in increased catalytic activity in terms of the conversion rate as well as the resulting API of the overhead product.

In one embodiment, the pre-soaking is at a temperature from 200 to 800° F. In a second embodiment, from 350 to 750° F. The pre-soak tank in one embodiment is maintained at the same pressure as that of the hydrocracking process for the upgrade of the heavy oil feedstock.

In one embodiment with the use of high sulfur feeds, hydrogen sulfide in the reaction zone resulting from the desulfurization of the feed can be used as a suitable sulfur source for the sulfidation forming an active sulfided catalyst in-situ. In another embodiment, additional sulfur compounds (including elemental sulfur) can be used to assist with the in-situ catalyst sulfidation. In one embodiment, a sufficient amount of elemental sulfur is added to the catalyst precursor (in the form of an emulsion) for molar ratio of elemental sulfur to Primary metal ranging from 3:1 to 100:1; and from 2:1 to 80:1 in another embodiment.

In one embodiment with the use of rework material, the rework material can be used by itself without additional metal precursor feedstock. In another embodiment, the rework material can be used as part of the catalyst feed system and combined with a slurry catalyst formed by other means. In one embodiment, the rework material is combined with a hydrocarbon carrier (diluent), forming an unsulfided slurry catalyst that can be subsequently sulfided in-situ upon contact with a heavy oil feedstock. In another embodiment, instead of using a hydrocarbon diluent, the rework is slurried in water as a carrier. In another embodiment, a sulfiding agent, e.g., $H_2S$, elemental sulfur, or ammonium sulfide, is added to the rework materials in a hydrocarbon carrier under sulfiding conditions to form a slurry catalyst. In yet another embodiment, the rework material can be slurried directly in a heavy oil feedstock, or a mixture of a heavy oil feedstock and a hydrocarbon diluent, for subsequent in-situ sulfidation forming a slurry catalyst.

In all embodiments, a sufficient amount of rework material is employed as a solid in an amount sufficient for the formation of a slurry catalyst, and to provide a catalyst dosage of 20 to 5000 ppm Primary metal (e.g., Mo) to heavy oil feedstock. In one embodiment, the amount of rework materials (in a powder form) ranges from 2 to 60 wt. % of total weight of the hydrocarbon diluent and/or heavy oil feedstock. In a second embodiment, the amount ranges from 5 to 40 wt. %. In a third embodiment, a sufficient amount of rework material is used for a dosage ranging from 20 to 1000 ppm of Primary metal to heavy oil feedstock. In another embodiment, a sufficient amount of rework material is used for a dosage of 5 to 100 ppm Primary metal to heavy oil feedstock.

In one embodiment, the slurry (rework) catalyst can be used directly in a hydrocracking unit. In another embodiment, it is mixed with a heavy oil feedstock prior to heavy oil upgrade. In yet another embodiment, the slurry (rework) catalyst can be combined with a fresh catalyst, e.g., a slurry catalyst made from a metal precursor feed or PLS (not made from rework materials) as catalyst feed to a hydrocracking unit for heavy oil upgrade.

In one embodiment, the amount of slurry (rework) catalyst ranges from 5 to 100 wt. % of the total slurry catalyst needed for heavy oil upgrade. In a second embodiment, the amount of slurry (rework) catalyst ranges from 10 to 70 wt. %. In a third embodiment, from 15 to 45 wt %. In a fourth embodiment, the slurry (rework) catalyst accounts for less than 50 wt. % of the total amount of slurry catalyst. The weight ratio may vary depending on a number of factors, including the type of heavy oil feedstock to be processed, operating conditions of the system, availability of supplies (availability of rework materials), etc.

In one embodiment with a PLS stream as a feedstock, the PLS stream can be mixed with at least another metal precursor feedstock, forming a precursor mixture for a subsequent sulfiding step/transformation step. In another embodiment, the PLS is used as the sole feedstock. In one embodiment, the PLS stream is combined with a sulfiding agent e.g., $H_2S$, elemental sulfur, or ammonium sulfide, etc., under sulfiding conditions to generate a sulfided water-based catalyst precursor, then subsequently transformed to an oil-based catalyst upon mixing with a hydrocarbon diluent. In another embodiment, the PLS is combined with a hydrocarbon carrier under shear mixing conditions with a hydrogen source to generate an oil-dispersed emulsion. In one embodiment, a sulfiding agent such as $H_2S$, elemental sulfur, or ammonium sulfide, etc., is optionally provided at a molar ratio of sulfur to Primary metal in the range of 2:1 to 4:1 to convert the oil-dispersed emulsion to a slurry catalyst. In yet another embodiment, the PLS is mixed with a heavy oil feedstock or a mixture of heavy oil and hydrocarbon carrier (diluent) such as VGO under high shear mixing to generate an oil-dispersed emulsion. The volume ratio of PLS to hydrocarbon diluent ranges from 1 to 50 vol. %, depending on the concentration of metal precursors in the PLS as well as the hydrocarbon carrier employed. The emulsion catalyst (sulfided or unsulfided) formed with a PLS feedstock can be provided directly to a hydroprocessing system for heavy oil upgrade. In another embodiment, the temperature of the emulsion catalyst is raised to remove water/transform the emulsion into a hydrophobic, oil-dispersed slurry catalyst.

Optional Hydrogen Pretreatment: In one embodiment before the heavy oil upgrade, the slurry catalyst is optionally treated with hydrogen. In one embodiment, the saturation/pre-soak with hydrogen improves the catalyst activity and reduces the formation of coke in the upgrade process. The pre-treatment is expected to enrich the surface of the slurry catalyst with hydrogen and thus enable the reactions to happen quicker, and thus reduces coke formation. In another embodiment, the pre-treatment enhances the catalyst area and porosimetry.

The optional hydrogen pre-treatment can be carried out in a pre-mixing vessel and/or in the transfer line. In one embodiment, a small amount of water can be injected into the pre-mixing vessel along with hydrogen during the pre-treatment process. The pre-treatment (or pre-conditioning) temperature in one embodiment ranges from 200° F. to 800° F. In a second embodiment, from 300° F. to 750° F. In a third embodiment, from 400° F. to 600° F. The pre-treatment time ranges from a minute to 20 hours in one embodiment; from 1 to 10 hours in another embodiment; and from 2 to 5 hours in a third embodiment. The hydrogen rate ranges from 500 to 15,000 scf per bbl of slurry catalyst in hydrocarbon diluent (standard cubic foot/barrel). In one embodiment, the pre-treatment pressure ranges from 1435 psig (10 MPa) to 3610 psig (25 MPa). The hydrocarbon diluent in one embodiment contains at least 10 wt. % of a light oil such as VGO, cycle oil, gasoline, distillate, naphtha, light cycle oil, benzene, toluene, xylene, and mixture thereof.

It is believed that with hydrogen pre-treatment prior to being introduced into an upgrade system with a heavy oil feedstock, the catalyst surface is enriched with hydrogen which improves catalytic activity for faster reaction and reduced coke/sediment formation. The slurry catalyst with hydrogen pre-treatment (or pre-conditioning) in one embodiment provides an increase in reaction rate constant k-values in terms of HDS (hydrodesulfurization), HDN (hydrodenitrification), and HDMCR (hydrodemicrocarbon resid) of at least 10% compared to a slurry catalyst without the hydrogen pre-treatment step. In another embodiment, the increase in reaction rate constant is at least 15%. In one embodiment, the slurry catalyst with hydrogen pre-treatment provides an improvement in porosimetry properties in terms of surface area, for an increase in surface area and total pore volume (TPV) of at least 10% compared to a slurry catalyst without the hydrogen pre-treatment step. In another embodiment, the increase in surface area and TPV is at least 15%.

It should be noted that any of the process steps can be operated in any of continuous, batch mode, or combinations thereof. The steps can be carried out in any of batch, semi-batch, or continuously stirred tank reactors (CSTRs), and can be a vessel equipped heating means having a mechanical stirrer, or a static mixer, or by means of a recirculating pump. The components (feed streams) can be introduced simultaneously, or sequentially in any order to the reactor or vessel. The term "feed stream" refers to both continuous and batch processed. In one embodiment, some of the process steps are carried out in a batch mode, and some of the process steps, e.g., the sulfidation step, are carried out in the continuous mode.

In one embodiment, both the sulfiding and transformation steps are carried out in continuous mode. In another embodiment, the sulfidation is in batch mode, while the transformation is in continuous mode. Continuous operation can eliminate the need of holding tanks for some of the feedstock, particularly some that requires careful handling.

The mixing of the components can be done within a continuous stirred tank, or it can be done by other means including an in-line static mixer (e.g., with a plurality of internal baffles or other elements), a dynamic high-shear mixer (vessel with propeller for very high turbulent, high shear mixing), or any device capable of ensuring turbulent mixing known in the art. It is desirable to obtain a high degree of dispersion of the metal precursors and/or the sulfided catalyst precursors in the heavy oil feedstock to achieve highly active catalyst. In embodiments with the use of a high sulfur heavy oil feedstock, hydrogen sulfide is generated in-situ in the reaction zone, from feed desulfurization. The generated $H_2S$ can be used as a suitable sulfur source for the sulfidation of the metal precursors.

In one embodiment and depending on the type of equipment used, the components are mixed under conditions sufficient for a flow with a Reynolds number of at least 2000. In a second embodiment, the mixing is sufficient for a Reynolds number of at least 3000. In a third embodiment, a Reynolds number ranging from 3200 to 7200.

Reference will be made to the figures with block diagrams schematically illustrating different embodiments of a process for making slurry catalysts for heavy oil upgrade.

FIG. 1 illustrates the steps involved in one embodiment of the process. In reactor 10, at least a Primary metal precursor 11 such as ammonium heptamolybdate is co-sulfided with at least a Promoter metal precursor 13 such as nickel sulfate in aqueous solution, forming a sulfided catalyst precursor with the addition of the sulfiding agent 12. Optionally in one embodiment, additional Promoter metal precursor 13 (same or different from the Promoter metal precursor added to the co-sulfiding step) is added after the co-sulfiding step. The co-sulfiding can be in batch mode, continuous mode, or semi-batch mode. In one embodiment, the sulfidation is continuous to allow for smaller equipment and more stable operations.

In one embodiment, the reaction time in the mixing tank 10 ranges from about 1 hour to 10 hours. The temperature in one embodiment is maintained at 30° C. to 100° C. at a pressure ranging from 100 to 3000 psig. In one embodiment, the weight ratio of Promoter metal nickel (or cobalt) to a Primary metal precursor, e.g., a Group VIB precursor such as a molybdenum compound ranges from about 1:100 to about 1:2. In one embodiment, instead of feeding the Promoter metal precursor directly to the co-sulfiding step 10, Promoter metal precursor 23 is added to the sulfided a Primary metal precursor after the sulfidation step 10.

The catalyst precursor from reactor 10 is moved to the next reactor/mixing tank 20, wherein the catalyst precursor is transformed with the addition of a carrier oil such as VGO 21 for a period of time 5 minutes to 2 hours and at a temperature from room temperature to 70° C. Hydrogen 22 is continuously added to the mixture reaction zone, in one embodiment ranging from 300 SCFB ("Standard Cubic Feet per Barrel," meaning per barrel of hydrocarbon feed) to about 2000 SCFB. The pressure of the reaction zone generally ranges from about 0 psig to about 3000 psig. Temperature of the reactor generally ranges from 150 to 300° C. In one embodiment, the reactor 20 is a CSTR with high shear mixing to maintain homogenous slurry in the reactor. Optional components (not shown) can be added to reactor 20 to increase the incorporation of sulfur in the catalyst precursor formed in this step. The oil-based slurry catalyst 24 is sent to storage tanks, or directly to a hydrocracking process. Vapor stream 24 comprising flashed-off water, methane, ammonia, $H_2S$, etc. is collected for subsequent recycle/scrubbing.

Figure 2:
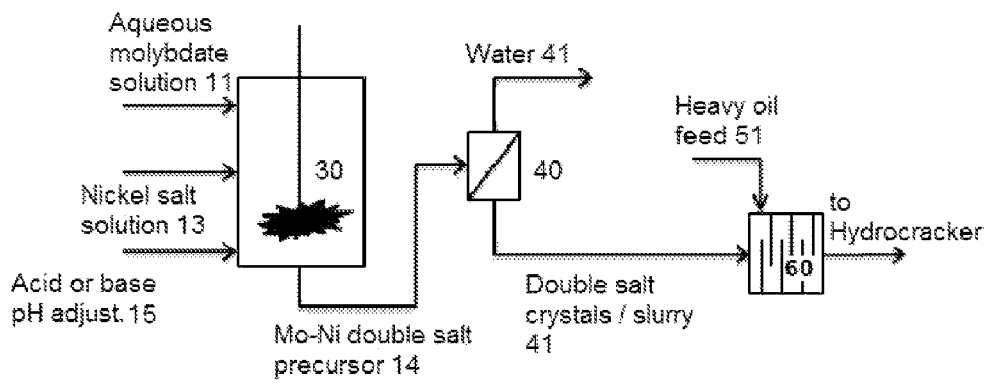
FIG. 2 is a block diagram illustrating another embodiment to prepare the slurry catalyst with a double salt metal precursor as a feed, with in-situ sulfidation of the metal precursor.

FIG. 2 is a block diagram illustrating another embodiment to prepare the catalyst composition with a double salt metal precursor as a starting feed. In the reactor 10, at least an acid or base 24 is added to the at least a Primary metal (e.g., Group VIB) metal precursor 11, e.g., ammonium heptamolybdate solution, and the Promoter metal precursor 13, e.g., nickel sulfate in aqueous solution, to adjust the pH to a pre-selected level to promote the formation of the double salt metal precursor slurry 14. In one embodiment as shown, water is optionally removed from the metal precursor slurry 14 using methods known in the art, e.g., a filter 40, a decanter or the like, generating crystals or concentrated slurry 41. Double salt metal precursor crystals 41 is mixed with a hydrocarbon diluent or a heavy oil feedstock 41, e.g., in a mixing tank, static mixer 41 or the like, under high shear mixing generating an emulsion catalyst that can be used directly for heavy oil upgrade, e.g., in a hydrocracker.

Figure 3:
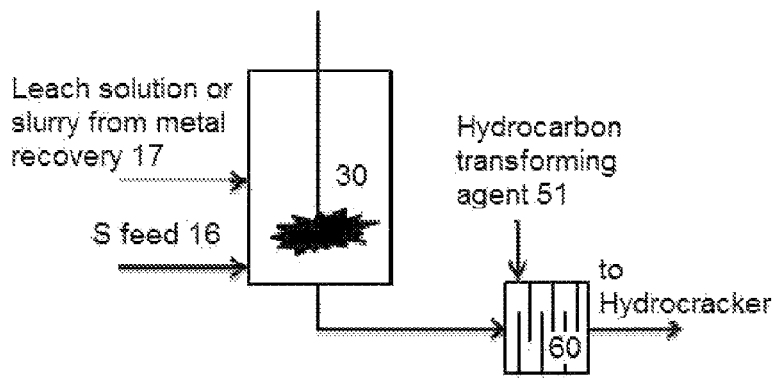
FIG. 3 illustrates an embodiment to prepare the slurry catalyst, wherein a pressure leach solution (PLS) or a leach slurry is used as a feed.
Figure 4:
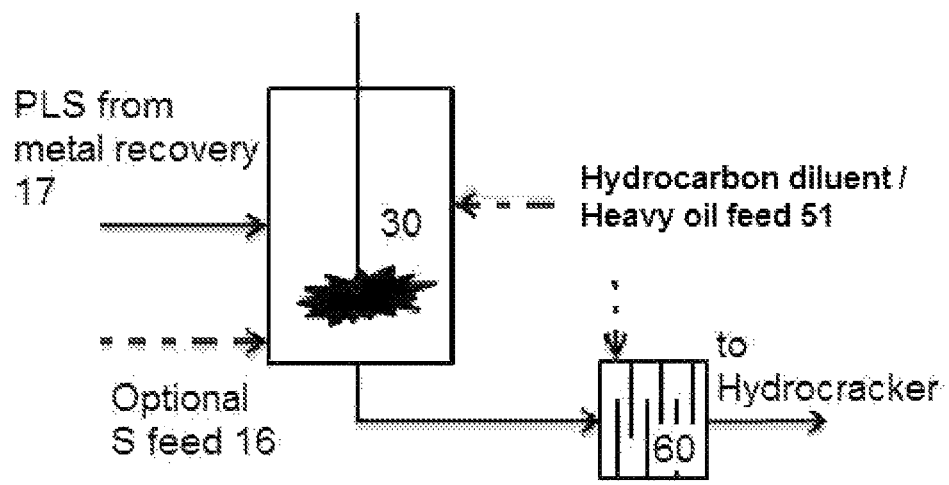
FIG. 4 is a block diagram illustrating another embodiment to prepare the slurry catalyst with the PLS as a feed.

In FIG. 3, a pressure leach solution (PLS) or a leach slurry 17 is used to provide the metal precursors needed to make the slurry catalyst. Although not shown, additional Group VIB metal precursor feed such as ammonium heptamolybdate solution, nickel sulfate, and the like, can also be added in addition to the PLS in the sulfiding step. In one embodiment (not shown), the PLS feedstock can also be added directly to the heavy oil feedstock for in-situ sulfidation, generating a sulfided slurry catalyst. Sulfiding agent 16 is added to mixing tank 30 (continuously or for a batch mode operation). The sulfided catalyst precursor is transformed into an oil-based sulfided catalyst in the transformation step 60 with the addition of a hydrocarbon transforming medium 51, which can be a heavy oil feed itself FIG. 4 illustrates another embodiment to make the slurry catalyst with a PLS. In this process, a pressure leach solution 17 from a metal recovery process (e.g., recovering metals from a spent catalyst) containing various metal salts is used as the feed to mixing tank 30 with the addition of a hydrocarbon carrier, or a heavy oil feedstock 51 under high shear mixing. Optionally, additional sulfiding agents 16 can also be added. In one embodiment (not shown), additional metal precursors can also be added to this step, and with the emulsion catalyst being subsequently sent to heavy oil upgrade.

Figure 5:
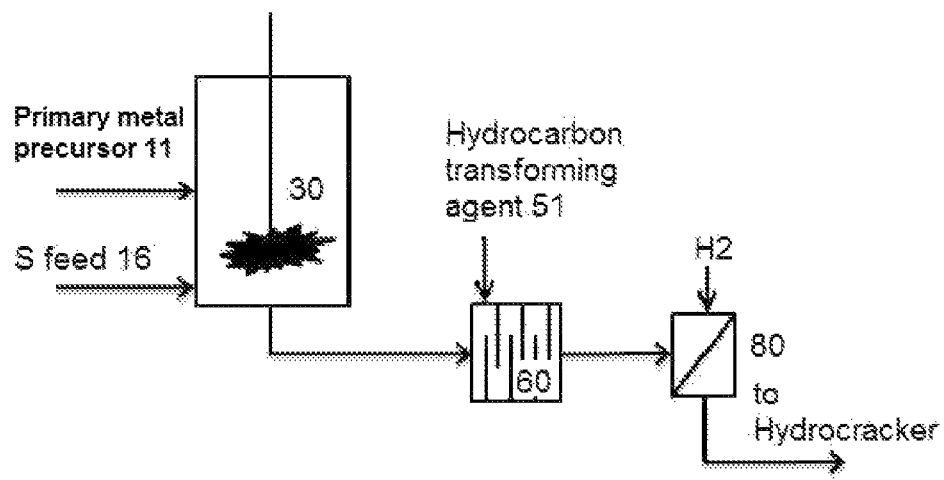
FIG. 5 is a block diagram illustrating another embodiment to make a slurry catalyst with a hydrogen treatment step (prior to heavy oil upgrade).

In FIG. 5, at least a Primary metal precursor 11 in solution, e.g., an inorganic molybdenum compound such as ammonium heptamolybdate solution or a nickel compound, is sulfided with the addition of the sulfiding agent 16 in mixing tank 30. The sulfided water-based catalyst is transformed into an oil-based sulfided catalyst in the transformation step with the addition of a hydrocarbon transforming medium 51, which can be a heavy oil feed itself. In the next step 51, the slurry catalyst undergoes $H_2$ treatment with hydrogen saturation, prior to heavy oil upgrade.

Figure 6:
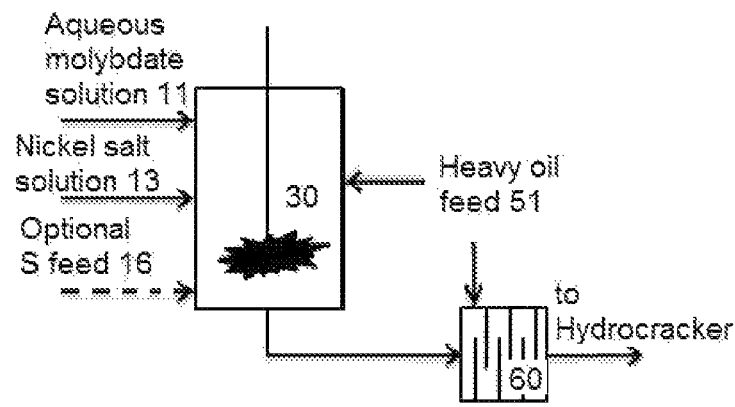
FIG. 6 is a block diagram illustrating an embodiment to prepare a slurry catalyst wherein metal precursors are mixed directly with a heavy oil feedstock under high shear mixing.

In FIG. 6, at least a Group VIB metal precursor 11, e.g., an organic molybdenum compound or an inorganic molybdenum compound such as ammonium heptamolybdate solution is mixed directly with the Promoter metal precursor 13, e.g., nickel sulfate in aqueous solution, and a hydrocarbon diluent or a heavy oil feedstock 51 in mixing tank 30, and optionally with a sulfiding agent, wherein sulfidation of the metal precursors takes place forming a sulfided slurry catalyst. In one embodiment, the mixing is via the use of a high shear mixing equipment and under hydrogen pressure forming an emulsion catalyst. In one embodiment, the catalyst is further homogenized via in-line static mixer 60.

Figure 7:
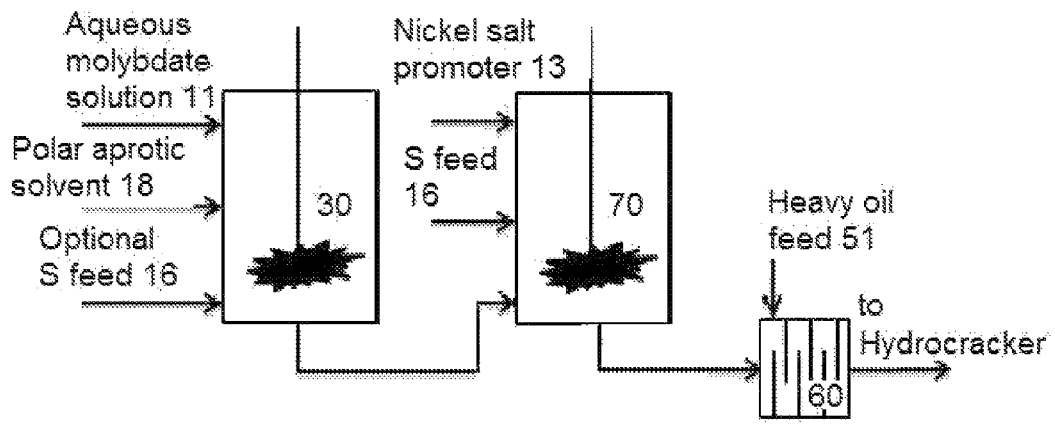
FIG. 7 is a block diagram illustrating one embodiment to make slurry catalyst with the use of a solvent and at least an inorganic metal precursor for an oil dispersible metal precursor.

FIG. 7 illustrates another embodiment to make slurry catalyst. In this process, AHM solution 17 ix mixed with DMSO solvent 18 and optionally a sulfiding agent 16 in mixing tank 30. A nickel salt promoter 13 is added to the oil-dispersible metal precursor, and optionally with a sulfiding agent 16, wherein a sulfided slurry catalyst is formed. The slurry catalyst is added to the heavy oil feed 51 forming an emulsion with the use on in-line mixer 60, prior to the heavy oil upgrade step. In another embodiment (not shown), the nickel promoted catalyst precursor (unsulfided or unsulfided) undergoes a reducing step in the presence of a reducing agent, e.g., $H_2$, wherein the sulfided Mo changes its oxidation state.

Figure 8:
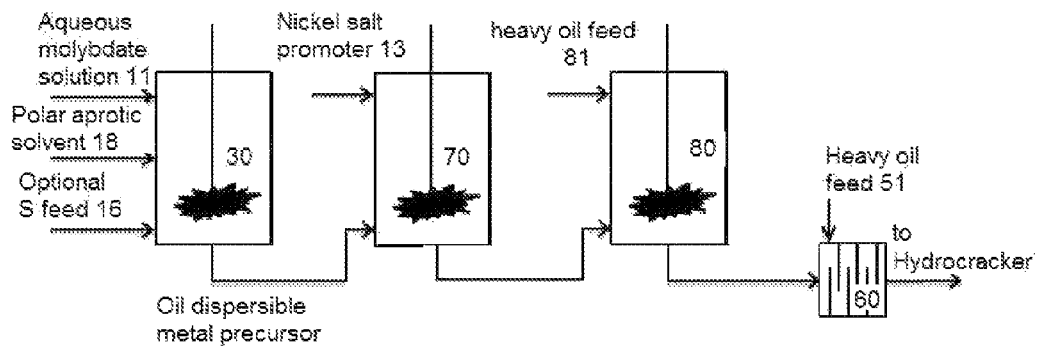
FIG. 8 is a block diagram illustrating a variation of the embodiment in FIG. 7 for making a promoted catalyst, with the use of an aprotic solvent for an oil dispersible metal precursor which is subsequently sulfided.

FIG. 8 illustrates a variation of the embodiment in FIG. 7, with a separate promotion step, and with the addition of a hydrocarbon diluent or a heavy oil feedstock mixture 81 to the oil dispersible emulsion in step 80 for to form an active slurry catalyst prior to the heavy oil upgrade step.

Figure 9:
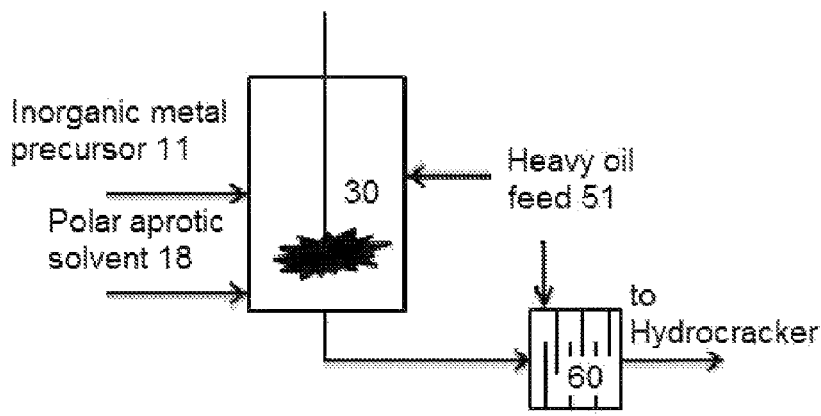
FIG. 9 is a block diagram illustrating yet another variation of the embodiment in FIG. 8 with the use of an aprotic solvent.

FIG. 9 illustrates yet another variation of the embodiment in FIG. 7, wherein a heavy oil feedstock/hydrocarbon transforming medium 51 is added to directly to the emulsion mixture of inorganic metal precursor, e.g., AHM solution 11 and DMSO solvent 18, for the sulfidation/formation of a slurry catalyst prior to the heavy oil upgrade step.

Figure 10:
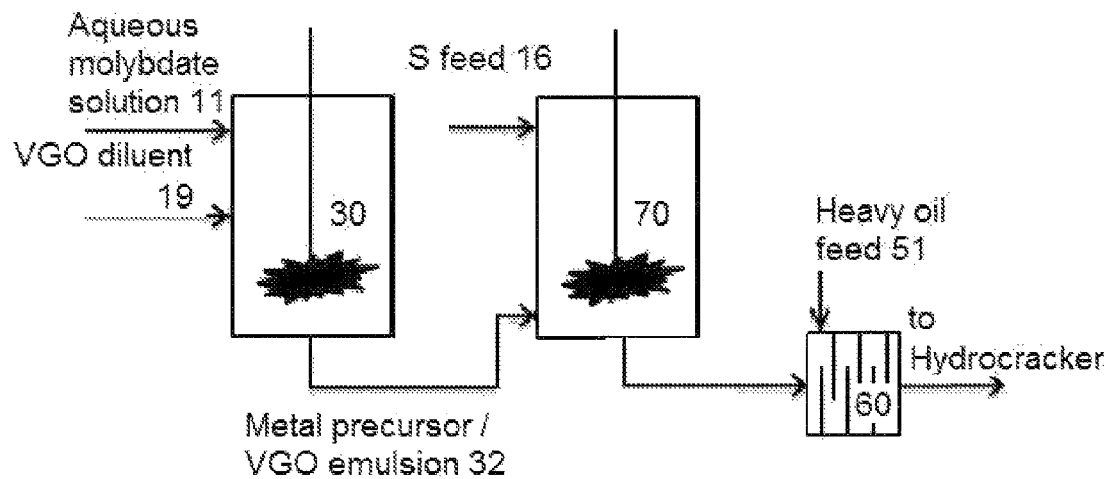
FIG. 10 illustrates an embodiment to prepare a slurry catalyst with high shear mixing, forming an emulsion catalyst.

In FIG. 10, at least a Group VIB metal precursor 11, e.g., an inorganic molybdenum compound such as ammonium heptamolybdate solution is mixed with a hydrocarbon diluent 19, e.g., VGO, under high shear mixing in step 30, forming a water-in-oil emulsion. Although not shown, temperature in sulfiding tank 70 is subsequently raised to transform the sulfided emulsion/slurry catalyst 32 to a hydrophobic, oil-dispersed slurry catalyst. The slurry catalyst is mixed with the heavy oil feedstock 51 prior to the heavy oil upgrade step.

Figure 11:
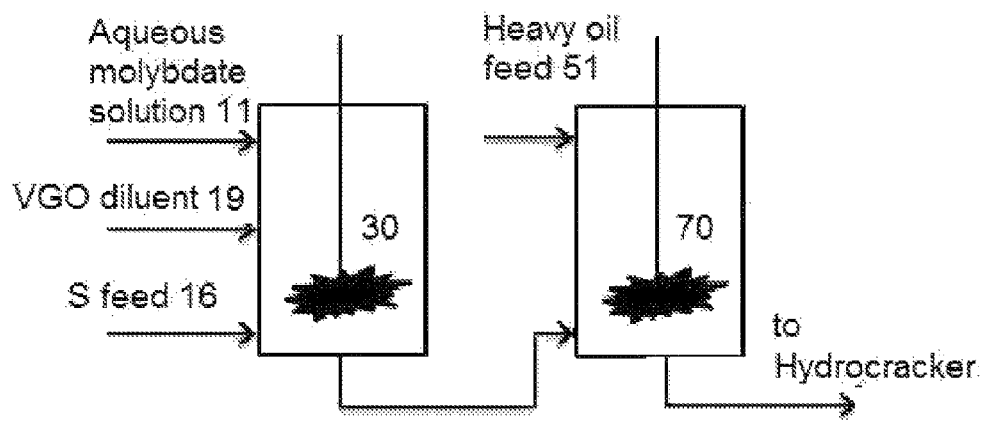
FIG. 11 illustrates a variation of the embodiment in FIG. 10 to prepare a slurry catalyst with high shear mixing.

FIG. 11 illustrates another embodiment for making an emulsion catalyst with a pre-sulfiding step. In this process, at least a Group VIB metal precursor 11, e.g., an inorganic molybdenum compound such as ammonium heptamolybdate solution is mixed with a hydrocarbon diluent 19, e.g., VGO, under high shear mixing in step 30, forming a water-in-oil emulsion. The mixture is optionally sulfided with the addition of sulfiding agent ($H_2S$ or elemental sulfur) 16. In one embodiment, the slurry catalyst is mixed with a hydrocarbon diluent or a heavy oil feedstock 51 prior to the heavy oil upgrade step.

Figure 12:
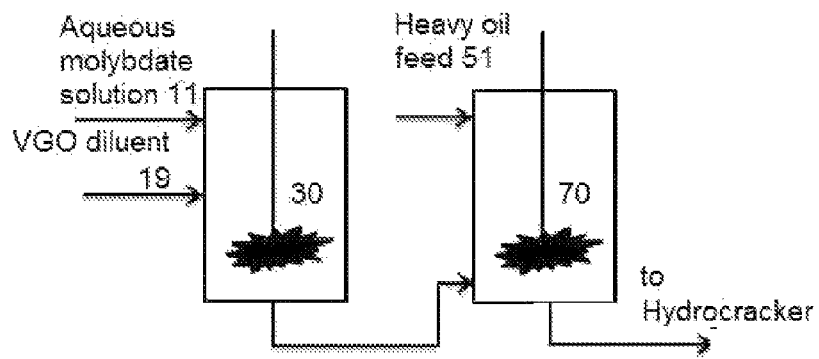
FIG. 12 illustrates another embodiment to prepare a slurry catalyst with high shear mixing, forming an emulsion, wherein the emulsion undergoes in-situ sulfidation.

FIG. 12 illustrates another variation embodiment for making an emulsion catalyst with no pre-sulfiding step. In this process, an emulsion of inorganic metal precursor(s) 11 in a hydrocarbon diluent, e.g., VGO 19 is formed. The emulsion mixture is mixed directly with a hydrocarbon diluent or a heavy oil feedstock/hydrocarbon diluent mixture 51 under appropriate conditions prior to the heavy oil upgrade step. Although not shown, temperature in tank 70 is subsequently raised to transform the sulfided emulsion/slurry catalyst 32 to a hydrophobic, oil-dispersed slurry catalyst. The slurry catalyst in one embodiment is mixed with the heavy oil feedstock 51 in prior to the heavy oil upgrade step.

Figure 13:
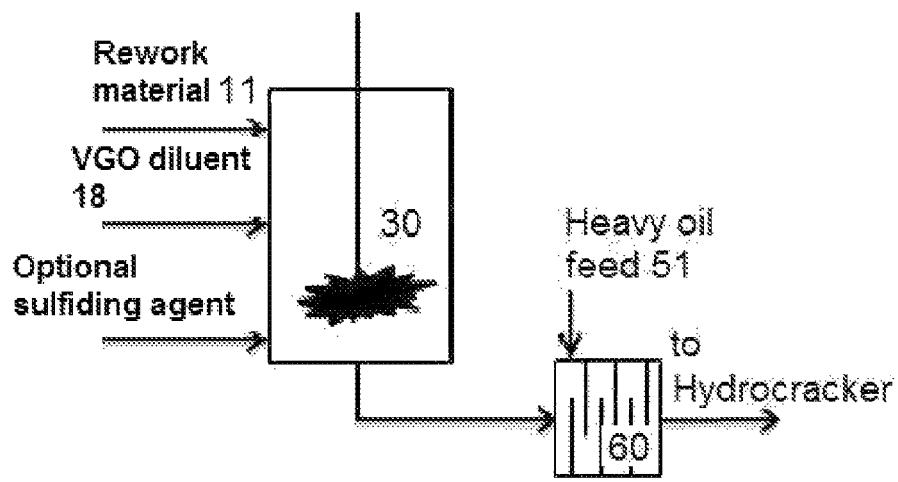
FIG. 13 illustrates an embodiment to prepare a slurry catalyst using rework material or ground residuum catalyst fines.

FIG. 13 illustrates an embodiment to prepare a slurry catalyst using rework material or ground residuum catalyst fines. In this process, ground catalyst material (rework) 11 is slurried in VGO diluent 18 to generate a slurry catalyst precursor. Optionally in one embodiment, a sulfiding agent 16 is added to the process to pre-sulfide the slurry precursor. The mixture can be subsequently mixed with a heavy oil feedstock 51 for upgrade in a hydrocracker unit.

Figure 14:
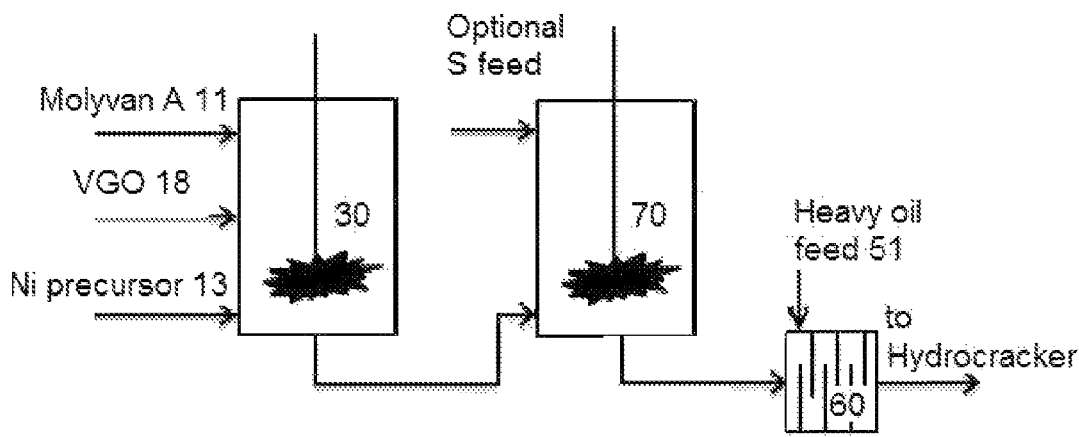
FIG. 14 illustrates an embodiment to prepare a promoted slurry catalyst from an oil soluble organometallic compound as metal precursor feed, which subsequently thermally decomposes generating the sulfided slurry catalyst.

FIG. 14 illustrates an embodiment to prepare a promoted slurry catalyst from an oil soluble organometallic compound. Quantities of organometallic metal precursor 11, nickel promoter 13, and a blend of hydrocarbon diluent 18 are mixed together in mixing tank 30. The mixture was subsequently allowed to thermally decompose in tank 70, generating a sulfided slurry catalyst, which can be subsequently mixed with a heavy oil feedstock for upgrade. In one embodiment, additional sulfiding agent may be optionally added to the tank 70.

Figure 15:
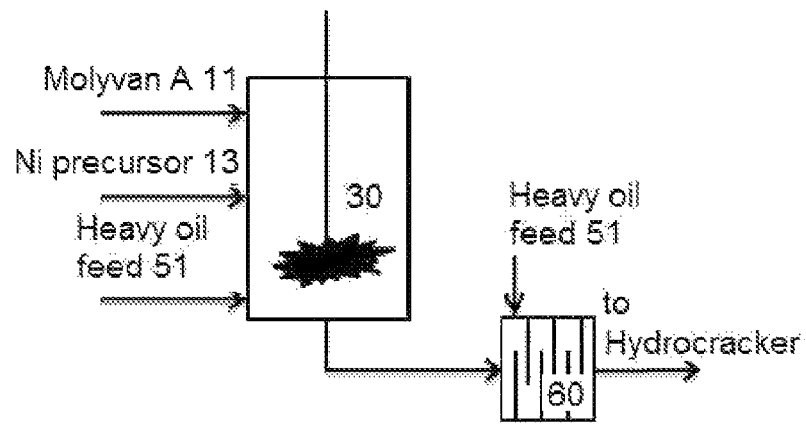
FIG. 15 illustrates a variation of the embodiment in FIG. 14, wherein the sulfiding is in-situ by mixing the oil soluble organometallic compound with a heavy oil feed.

In FIG. 15, the organometallic metal precursor 11 is mixed directly with a heavy oil feedstock 51 and optionally a Promoter precursor 13. The mixture is allowed to soak under hydroprocessing conditions for in-situ sulfidation to take place, generating a sulfided slurry catalyst for subsequent heavy oil upgrade.

Figure 16:
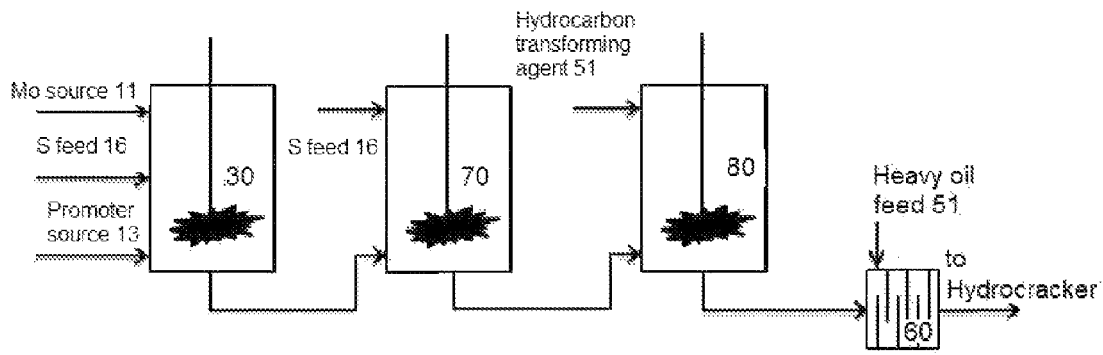
FIG. 16 illustrates an embodiment with a second sulfiding step for a slurry catalyst with enhanced amount of sulfur (double sulfiding).

FIG. 16 illustrates an embodiment with at least an additional sulfiding step for a slurry catalyst with an enhanced amount of sulfur. In one embodiment, a Primary metal source 11 such as Mo, e.g., an aqueous molybdate solution (2 to 15% Mo concentration) is charged in the reactor vessel 30 and brought up to reaction conditions, e.g., temperature ranging from ambient to 300° F. and pressure up to 3000 psig. A sulfiding agent 16 is added for the first sulfidation step (at a molar ratio of S/Primary metal of less than 4:1), generating an aqueous based molybdenum oxysulfide catalyst precursor. The sulfidation can be carried out on a continuous basis or batch basis. In the same (or the next) step, the catalyst precursor is promoted with a second/different metal, e.g., a Group VIII metal as Promoter metal source 13, at a ratio of Promoter to Primary metal of 1 to 49 wt. %. The promoted aqueous based catalyst precursor is subjected to an additional sulfiding step with the addition of the same or different sulfiding agent feed 16. The additional sulfiding step can be in the same or different equipment (mixing tank 70), and at the same or different sulfiding feed ratio from the first sulfiding step (a molar ratio of S/Primary metal of less than 4:1). The resulting sulfur enhanced water base catalyst is emulsified with a hydrocarbon diluent 51 in step 80 at an oil to water base catalyst wt. ration ranging from 1:10 to 10:1. The transformation step can be done on either batch or continuous basis, and it can be carried out in the same equipment or different equipment from the sulfiding step. In one embodiment, (not shown), the sulfided catalyst is subsequently reduced and dewatered (on a continuous or batch basis) at a temperature from ambient to 300° F. and pressure up to 3000 psig with the addition of a hydrogen source at a rate of 0.10 to 2 ft$^3$ H$_2$ to 100 g of Primary metal in the catalyst, generating sour water and an oil based catalyst. The slurry catalyst in one embodiment is mixed with the heavy oil feedstock 51 in prior to the heavy oil upgrade step 60.

Figure 17:
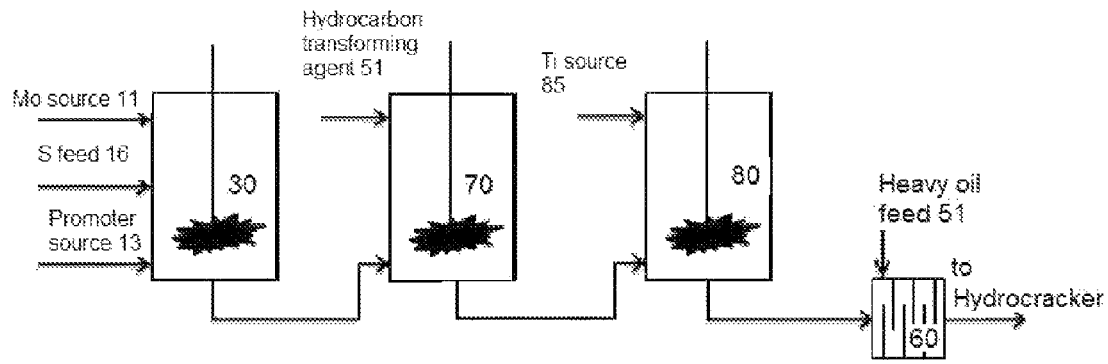
FIG. 17 illustrates an embodiment to prepare a catalyst with Ti as a promoter.

FIG. 17 illustrates an embodiment to prepare a catalyst with Ti as a promoter. A primary metal source 11 such as Mo, e.g., an aqueous molybdate solution (2 to 15% Mo concentration) is charged in the reactor vessel 30 and brought up to reaction conditions. A sulfiding agent 16 is added for the sulfidation step. The catalyst precursor is promoted with a second different metal, e.g., a Group VIII metal as Promoter metal source 13. The promoted aqueous based catalyst precursor is subjected to a transformation step with the addition of a hydrocarbon diluent 51 in mixing tank 70. A sufficient amount of a Ti metal source 85 such as titanium naphthenate solution is added to the transformed catalyst, generating a Ti—Ni—Mo slurry catalyst for use in heavy oil upgrade step 60.

Figure 18:
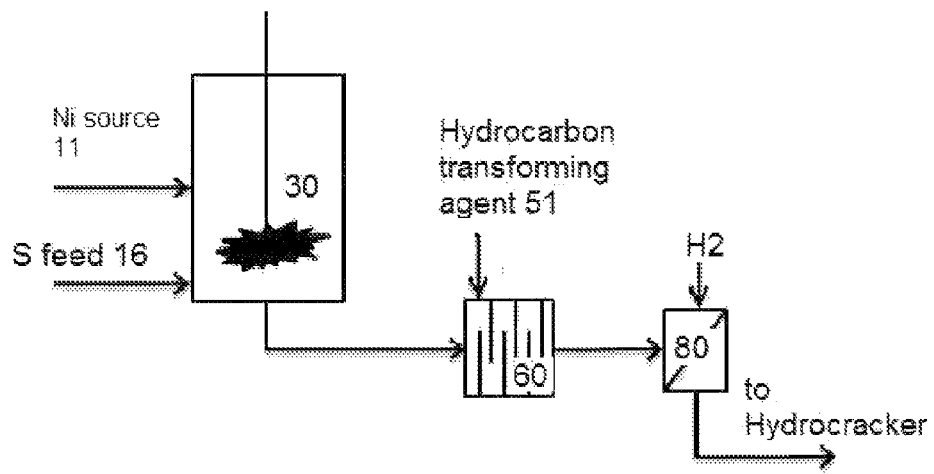
FIG. 18 illustrates an embodiment to prepare a single metal catalyst, e.g., with the use of nickel as the single metal.

FIG. 18 illustrates an embodiment to prepare a single metal catalyst, e.g., with the use of nickel as the single metal. A Ni precursor 11 is sulfided with a sulfur source such an ammonium sulfide solution. The water-based catalyst is transformed with a hydrocarbon diluent 51 in mixing tank 60, generating a nickel-based slurry catalyst for use in heavy oil upgrade step 80.

Figure 19:
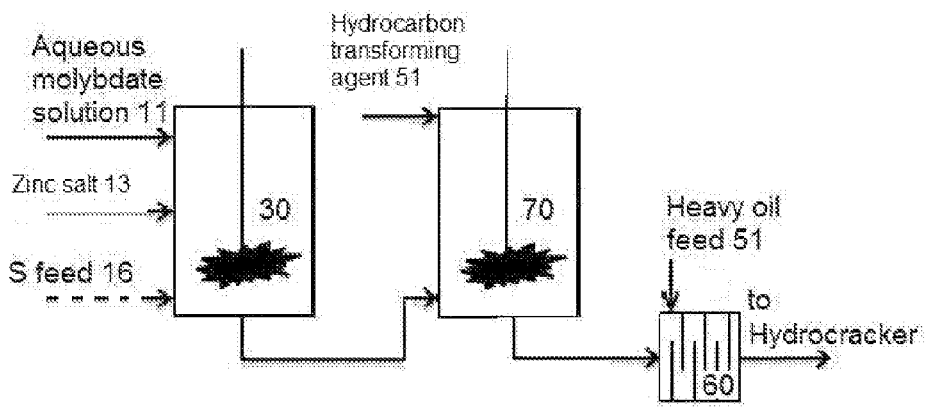
FIG. 19 illustrates an embodiment to prepare a Zn—Mo slurry catalyst.

FIG. 19 illustrates an embodiment to prepare a Zn—Mo slurry catalyst. A Mo source 11 such as Mo, e.g., an aqueous molybdate solution is charged in the reactor vessel 30 along with a Zn source, e.g., a zinc sulfate heptahydrade, under high shear condition and hydrogen pressure and brought up to reaction conditions. In one embodiment, the promoted catalyst precursor is mixed directly with a hydrocarbon diluent or a heavy oil feedstock 51 in mixing tank 70. In another embodiment, a sulfiding agent 16 is optionally added (dotted line), generating an aqueous based catalyst precursor which can be subsequently transformed with the hydrocarbon diluent 51, forming an emulsion catalyst for subsequent heavy oil upgrade.

Figure 20:
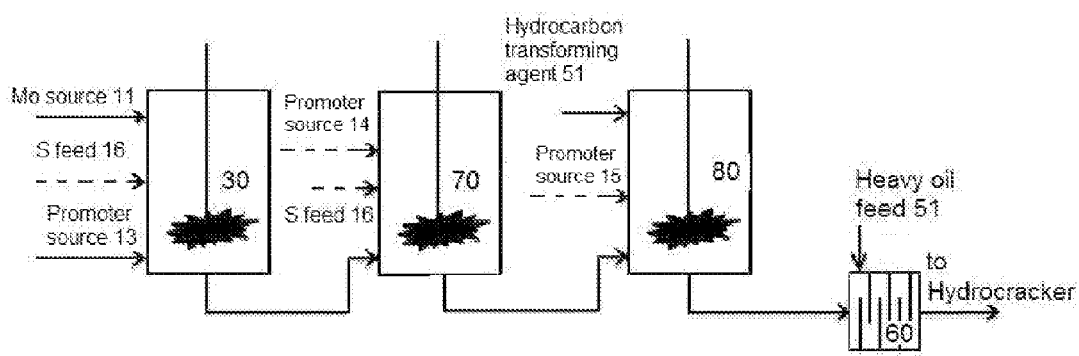
FIG. 20 illustrates an embodiment for preparing a slurry catalyst with a split feeding of at least a Promoter metal precursor feedstock.

FIG. 20 illustrates an embodiment for preparing a slurry catalyst with splitting feeding of the Promoter metal precursor feed. In one embodiment, a Primary metal source 11 such as Mo, e.g., an aqueous molybdate solution is charged in the reactor vessel 30 and brought up to reaction conditions with the addition of a portion of Promoter metal source 13, and a sulfiding agent 16 for a co-sulfiding step, generating an aqueous based catalyst precursor. The sulfidation can be carried out on a continuous basis or batch basis. In the next step, additional Promoter metal source 14 is optionally added for a post-promotion step, wherein the Promoter metal source 14 can be the same or different from Promoter metal source 13 (or fed at the same or different rate). The water-based catalyst precursor is subsequently transformed into a slurry catalyst with a hydrocarbon diluent 51.

In another embodiment, the Primary metal precursor 11 is first sulfided, then subsequently promoted with a Promoter metal source 14. Additionally Promoter metal precursor 15 (which can be the same or different from Promoter metal source 14) is added along with a hydrocarbon diluent 51 in the transformation step.

Figure 21:
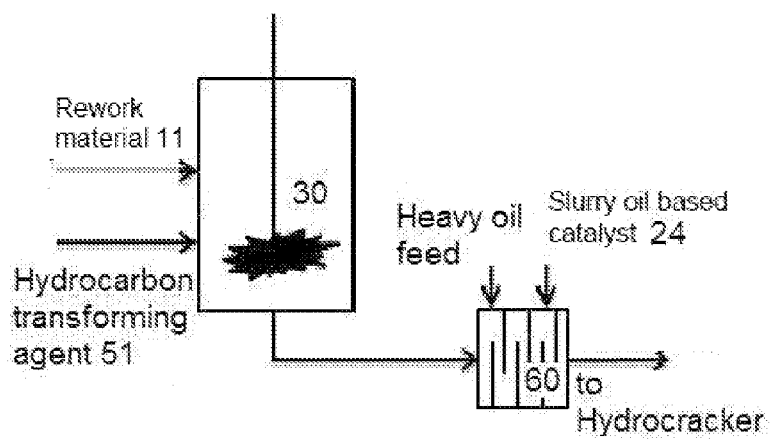
FIG. 21 illustrates an embodiment for preparing a slurry catalyst from ground/rework catalyst.

FIG. 21 illustrates an embodiment for preparing a slurry catalyst from ground/rework catalyst. A ground commercially available catalyst 11 is mixed with a sufficient amount of VGO for a slurried catalyst having about 250 ppm to 4.0 wt. % Mo in VGO. The slurried catalyst is mixed with a heavy oil feedstock and optionally, a fresh slurry catalyst 24 for use in hydrocracker for heavy oil upgrade.

It should be noted that any of the process steps in the Figures can be carried out in either a batch and/or continuous mode. In one embodiment, high shear mixing is desirable to prevent any of the metal precursor/catalyst from settling or forming thick gel.

Characterization of the Slurry Catalyst: The slurry catalyst comprises a dispersed suspension of particles in a hydrocarbon medium. The hydrocarbon medium can be a heavy oil feedstock itself; a hydrocarbon transforming medium such as gasoline, diesel, vacuum gas oil (VGO), cycle oil (MCO or HCO), jet and fuel oils, and mixtures thereof; or a mixture of heavy oil feedstock and a hydrocarbon transforming medium. In another embodiment, the hydrocarbon medium is the hydrocarbon transforming medium. In one embodiment with the use of at least a metal precursor having a pH of at least 4, the slurry catalyst is characterized as having improved morphology and dispersion characteristics, particularly useful for the upgrade of heavy oil feedstock.

In one embodiment, the slurry catalyst comprises a plurality of suspended or dispersed droplets in oil ("emulsion catalyst") with the droplets having a mean size of 0.1 to 300 μm. In a second embodiment, the dispersed particles or droplets have an average droplet size of 0.5 to 150 μm. In a third embodiment, an average droplet size of 1 to 100 μm. In a fourth embodiment, an average droplet size of 1 to 50 μm. In a fifth embodiment, the droplet size is less than 20 μm.

In one embodiment, the slurry catalyst comprises a plurality of dispersed particles in a hydrocarbon medium, wherein the dispersed particles have an average particle size ranging from 1 to 300 μm. In another embodiment, the particles have an average particle size ranging from 2 to 150 μm. In yet another embodiment, an average particle size of at least 5 μm. In a fourth embodiment, an average particle size of less than 50 μm.

In one embodiment, the slurry catalyst is characterized as having a polymodal pore distribution with at least a first mode having at least about 80% pore sizes in the range of 5 to 2,000 Angstroms in diameter, a second mode having at least about 70% of pore sizes in the range of 5 to 1,000 Angstroms in diameter, and a third mode having at least 20% of pore sizes of at least 100 Angstroms in diameter. As used herein, polymodal includes bimodal and higher modal. In one embodiment, at least 30% of pore sizes are >100 Angstroms in diameter. In another embodiment, at least 40%. In another embodiment, at least 70% of pore sizes are >100 Angstroms in diameter. In one embodiment, at least 50% are in the range of 50 to 5000 Angstrom in diameter. In another embodiment, at least 75% of the pore volume ranging from 100 to 1000 Angstroms.

The slurry catalyst has a total pore volume (TPV) of at least 0.4 cc/g (per gram of catalyst in a solid form) in one embodiment; at least 0.6 cc/g in a second embodiment; at least 0.8 cc/g in a third embodiment; at least 1 cc/g in a fourth embodiment; and less than 3 cc/g in a fifth embodiment.

In one embodiment, the slurry catalyst is characterized as having a relatively high total surface area, as determined by the nitrogen BET method, of at least 100 m$^2$/g. In one embodiment, the surface area is at least 100 m²/g. In another embodiment, the surface area is in the range of 200 to 900 m²/g. In a fourth embodiment, the surface area is in the range of 50 to 800 m²/g. In a fifth embodiment, the surface area is in the range of 100 to 300 m²/g. In a sixth embodiment, the slurry catalyst is essentially free of Promoter metals and has a surface area is in the range of 300 to 800 m²/g. In a seventh embodiment, the slurry catalyst has a surface area of at least 300 m²/g.

In one embodiment, the slurry catalyst (as a multi-metallic or single metal catalyst) is of the formula $(M^t)_a(L^u)_b(S^v)_d(C^w)_e(H^x)_f(O^y)_g(N^z)_h$, wherein M is a Primary metal selected from Group VIB metals, non-noble Group VIII metals, Group IIB metals; L is optional as a Promoter metal and L is a metal that is different from M, L is at least one of a Group VIII metal, a Group VIB metal, a Group IVB metal, and a Group IIB metal; $b>=0$; $0<=b/a=<5$; $0.5(a+b)<=d<=5(a+b)$; $0<=e<=11(a+b)$; $0<=f<=18(a+b)$; $0<=g<=5(a+b)$; $0<=h<=3(a+b)$; t, u, v, w, x, y, z, each representing total charge for each of: M, L, S, C, H, O and N, respectively; and $ta+ub+vd+we+xf+yg+zh=0$. In one embodiment of a multimetallic slurry catalyst (b>0), the Primary metal M is molybdenum and the Promoter metals are nickel and titanium. In an embodiment of a bi-metallic slurry catalyst, M is molybdenum and L is zinc.

In one embodiment, the slurry catalyst is single metallic (b=0) with nickel as the Primary metal M. In yet another embodiment, the Primary metal M of the single metallic slurry catalyst is molybdenum. The single metal catalyst formula can also be written as: $(M^t)_a(S^v)_d(C^w)_e(H^x)_f(O^y)_g(N^z)_h$, wherein M is at least one of a non-noble Group VIII (IUPAC nomenclature groups 8-10) metal, a Group VIB metal (IUPAC nomenclature group 6), a Group IVB metal (IUPAC nomenclature group 4), and a Group IIB metal (IUPAC nomenclature group 12); t, v, w, x, y, z, each representing total charge for each of the component (M, S, C, H, O, and N); $ta+vd+we+xf+yg+zh=0$; $0.5a<=d<=4a$; $0<=e<=11a$; $0<=f<=18a$; $0<=g<=2a$; and $0<=h<=3a$.

Use of the catalyst. The catalyst composition can be used in virtually all hydroprocessing processes to treat a plurality of heavy oil feedstock under wide-ranging reaction conditions such as temperatures from 752° F. to 1112° F., pressure from 1435 psig (10 MPa) to 3610 psig (25 MPa), and liquid hourly space velocities from 0.05 to 10 h⁻¹.

The hydroprocessing (or hydrocracking) can be practiced in one or more reaction zones and can be practiced in either countercurrent flow or co-current flow mode. By countercurrent flow mode is meant a process wherein the feed stream flows counter-current to the flow of hydrogen-containing treat gas. The hydroprocessing also includes slurry and ebullated bed hydroprocessing processes for the removal of sulfur and nitrogen compounds and the hydrogenation of aromatic molecules present in light fossil fuels such as petroleum mid-distillates, e.g., hydroprocessing a heavy oil employing a circulating slurry catalyst.

The catalyst can be applied in any reactor type. In one embodiment, the slurry catalyst is applied to a fixed bed reactor. In another embodiment, the slurry catalyst is used as part of a catalyst feed system in an ebullating bed reactors, a slurry reactor, a recirculating reactor, or a fluidized bed reactor used in the H-Oil process, the LC-Fining process, the H-Coal process, the heavy oil upgrade process as well as others. In another embodiment, two or more reactors containing the catalyst may be used in series with no catalyst recycle. In a third embodiment, the hydroprocessing reactors are used in parallel, also with no catalyst recycle. Details regarding operations of the hydroprocessing reactors in heavy oil upgrade, other sulfiding agents, and other hydrocarbon transforming media can be found in U.S. patent application Ser. Nos. 12/506,885; 12/506,840; 12/506,987; and 12/506,885, all with a filing date of Jul. 21, 2009; and U.S. patent application Ser. Nos. 12/232,327; 12/233,439; 12/233,393; and 12-233,171, all with a filing date of Sep. 18, 2008, the relevant disclosures are included herein by reference.

In one embodiment, the slurry catalyst is added to the feedstock (catalyst to oil ratio) at a rate of 0.01 to 3 wt. %. In a second embodiment, at a rate of 0.25 to 2 wt. %. In a third embodiment, at a rate of 100 to 20000 ppm active metals, e.g., Group VIB metals. In a fourth embodiment, the catalyst is added to the feedstock at a sufficient rate for the total amount of Mo in the reaction zone of 0.005 to 0.5 wt. % (based on the total weight of the feedstock).

In one embodiment with the use of a slurry catalyst that has been sulfided more than once (e.g., double sulfiding) and with a catalyst concentration of at least 2000 ppm (wt. % Primary metal to heavy oil feedstock), the catalyst load to the hydrocracking unit for heavy oil upgrade can be reduced at least 10% compared to a catalyst that is not sulfided more than once. In another embodiment, the catalytic load can be reduced at least 20%.

In one embodiment, the slurry catalyst characterized as giving excellent conversion rates in the upgrades of heavy oil, i.e., giving a 1000° F.+ conversion rate of at least 50% in the upgrade of a heavy oil having an API of at most 15, when applied at a rate of less than 1 wt. % active Group VIB metal (relative to heavy oil feedstock), a 1000° F.+ conversion rate of at least 75% in a second embodiment, a 1000° F.+ conversion rate of at least 80% in a third embodiment, and at least 90% in a fourth embodiment.

In one embodiment with the use of the slurry catalyst of the invention, at least 98.5% of heavy oil feed is converted to lighter products. In a third embodiment, the conversion rate is at least 99%. In a fourth embodiment, the conversion rate is at least 95%. In a fifth embodiment, the conversion rate is at least 80%. As used herein, conversion rate refers to the conversion of heavy oil feedstock to less than 1000° F. (538° C.) boiling point materials.

EXAMPLES

The following illustrative examples are intended to be non-limiting. Unless specified otherwise, the catalytic activity of the catalysts prepared in the examples are tested for hydrodenitrogenation (HDN), hydrodesulfurization (HDS), vanadium removal activity (HDV), and hydrodemicrocarbon residue (HDMCR). VR refers to "vacuum resid" or a particular heavy oil feedstock.

VR#1 refers to a heavy oil feedstock having 29.9 wt. % Microresidue tester (MCRT), 25.7 wt. % hot heptane asphaltenes (HHA), 5.12 wt. % sulfur, 672 ppm vanadium, and API at 60° F. of 2.7.

VR#2 refers to a heavy oil feedstock having 21.8 wt. % MCRT, 11.01 wt. % HHA, 5.07 wt. % sulfur, 125 ppm vanadium, and API at 60° F. of 4.9.

% Mo/VR refers to the amount of molybdenum metal (in the catalyst) as a percent (in weight) of the heavy oil feedstock. In examples that cycle oil (a mixture of medium and heavy cycle oil, MCO or HCO) is added to the heavy oil feedstock (in an amount of 40 wt. % cycle oil to heavy oil feedstock), "VR" refers to the amount of the heavy oil feedstock excluding the cycle oil.

Unless specified otherwise in the examples, the transformation of water-based catalyst is carried out in vacuum gas oil at a wt. ratio of oil to water-based catalyst of 1.5 to 1.

Comparative Example 1

In this example, a slurry catalyst with a Ni:Mo ratio of about 10% was made. 33.12 g of ammonium heptamolybdate tetrahydrate (($NH_4$)$_6$$Mo_7$$O_{24}$) was dissolved in 100 g of water in a glass vessel fitted with an overhead mechanical stirrer, and 14.1 g of concentrated ammonia solution (28 wt. % $NH_4OH$ in $H_2O$) was added. A solution of 8.1 g of nickel sulfate hexahydrate ($NiSO_4$.$6H_2O$) in 32 g of water was added to the first solution, all at ambient temperature, producing an emerald-green suspension. This suspension was heated to 70° C. under atmospheric pressure, and 101 g of ammonium sulfide (($NH_4$)$_2$S) solution in water (40-44 wt. %) was added slowly, over the course of 45 minutes. After that, the mixture was heated with stirring for an additional 60 minutes. The volume of the reaction mixture was reduced in half on a rotary evaporator. The resulting water-based catalyst precursor was transformed to a final oil-based catalyst with VGO and hydrogen in a pressure test autoclave.

Comparative Example 1A

The procedure is to make a slurry catalyst of a similar Ni:Mo ratio of 10% as in Comparative Example 1. In this example, 9000 grams of ammonium dimolybdate (ADM) solution (12% Mo) was heated to the following conditions 750 RPM, 150° F. and 400 PSIG. To this heated ADM solution, a gas stream comprising $H_2S$, 20% $CH_4$, 60% $H_2$ was bubbled through the solution until the S/Mo atomic=3.4. After the $H_{2S}$ addition, then an appropriate amount of nickel sulfate solution (8% Ni) was added to the mixture for a Ni/Mo wt % of ~10%. The product can be transformed to an oil base catalyst as in Comparative Example 1 on a batch basis, or a continuous basis.

Comparative Example 2

The procedure is similar to Comparative Example 1, except with a higher Ni:Mo ratio of ~23%, using 33.12 g of ammonium heptamolybdate tetrahydrate to dissolve in 100 g of water mixed with 5 g of concentrated ammonia solution, in a glass vessel fitted with an overhead mechanical stirrer. A solution of 16.2 g of nickel sulfate hexahydrate in 32 g water was added to the first solution, all at ambient temperature, producing a green suspension. This suspension was heated to 70° C. under atmospheric pressure, and 100 g of ammonium sulfide solution (44 wt. %) was added slowly, over the course of 45 minutes. After that, the mixture was heated with stirring for an additional 60 minutes. The rest of the procedures were as in Comparative Example 1.

Comparative Example 2A

The procedure is to make a slurry catalyst of a similarly high Ni:Mo ratio as in Comparative Example 2, wherein 9000 grams of ADM solution (12% Mo) was heated to the following conditions 750 RPM, 150 F and 400 PSIG. To this heated solution, a gas stream comprising 20% v H2S, 20% CH4, 60% H2 was bubbled through the solution until the S/Mo atomic=3.4. After the $H_2S$ addition, then an appropriate amount of nickel sulfate solution (8% Ni) was added to the mixture for a Ni/Mo wt % of ~23%. The product can be transformed to an oil base catalyst as in Comparative Example 1 on a batch basis, or a continuous basis.

Comparative Example 3

This Example is to make a Mo only slurry catalyst. 33.12 g of ammonium heptamolybdate tetrahydrate (($NH_4$)$_6$$Mo_7$$O_{24}$) was dissolved in 100 g of water in a glass vessel fitted with an overhead mechanical stirrer, and 14.1 g of concentrated ammonia solution (28 wt. % $NH_4OH$ in $H_2O$) was added. This mixture was heated to 70° C. under atmospheric pressure, and 101 g of ammonium sulfide (($NH_4$)$_2$S) solution in water (40-44 wt. %) was added slowly, over the course of 45 minutes. After that, the mixture was heated with stirring for an additional 60 minutes. The volume of the reaction mixture was reduced in half on a rotary evaporator. The rest of the procedures were as in Comparative Example 1.

Comparative Example 3A

The Example was to make a Mo only catalyst similar to Comparative Example 3. In this example, 9000 grams of ammonium dimolybdate solution (12% Mo) was heated under the conditions of 750 RPM, 150° F. and 400 PSIG. To this heated solution, a gas stream comprising 20 volume % $H_2S$, 20% $CH_4$, 60% $H_2$ was bubbled through the solution until the S/Mo atomic is about 3.4. The product can be transformed to an oil base catalyst as in Comparative Example 1 on a batch basis, or a continuous basis.

Example 4

5.63 g of ammonium dimolybdate solution (12 wt. % Mo) was mixed with 0.84 g of nickel sulfate solution (8 wt. % Ni), yielding a double salt metal precursor in solution. A sufficient amount of the double salt precursor was mixed with 112.5 g of heavy oil feedstock (VR#1 mixed with cycle oil at a wt. ratio of 60:40) for a concentration of 1 wt. % Mo (Mo metal as a wt % of VR#1) in a 1 L batch hydrocracking unit. The cycle oil is a HCO:MCO blend at a ratio of 1:1. X-ray diffraction pattern shows that the Mo—Ni double salt is composed of highly crystallized hydrogen ammonium molybdenum nickel oxide hydrate $H_6(NH_4)_4Mo_6NiO_{24}*4H_2O$.

Example 5

Example 4 was repeated except that a sufficient amount of elemental sulfur was added to the in a 1 L batch hydrocracking unit containing heavy oil feedstock and double salt metal precursor mixture, for a molar ratio of S to Mo of 3:1.

Example 6

Batch hydrocracking tests were carried out to compare the catalyst made in Comparative Example 1A with the catalysts of Examples 4-5. Sufficient amounts of the catalysts were added to separate batch units containing 112.5 g of 60:40 VR#1 to MCO for a final concentration of 1 wt. % Mo. The three batch hydrocracking units were tested under hydroprocessing conditions of 805° F. temperature, 1600 psig hydrogen pressure, and for 2 hours reaction time. Results are presented in Table 1, showing that Example 4 with double salt metal precursor feedstock showed better catalytic performance and spent catalyst properties, suggesting that nickel promotion has improved, and a low temperature sulfur source for sulfiding would improve vanadium removal.

TABLE 1

| Catalyst | % HDN | % HDS | % HDMCR |
|---|---|---|---|
| Comp. Ex 1A | 32.44 | 65.24 | 52.82 |
| Example 13 | 29.25 | 66.20 | 48.93 |
| Example 14 | 41.05 | 74.58 | 52.14 |

Example 7

A sufficient amount of ammonium heptamolybdate (AHM) solution (12 wt. % Mo) was added to about 170 g of heavy oil feedstock in a 1 liter batch hydrocracking unit for 1 wt. % Mo to VR. The heavy oil feedstock containing a mixture of VR#1 as the vacuum resid (VR) and medium cycle oil at a weight ratio of 60:40.

Example 8

Example 7 was repeated, except that a sufficient amount of elemental sulfur was added to the unit for a S to Mo wt. % of 0.7:1.

Example 9

Example 8 was repeated, except that a sufficient amount of elemental sulfur was added to the unit for a S to Mo wt. % of 5:1.

Example 10

Example 9 was repeated, and the unit was heated up to 180° C. under hydrogen pressure of 1800-1900 psig for 2 hours.

Example 11

Example 8 was repeated, and the unit was heated to 180° C. under hydrogen pressure of 1800-1900 psig for 2 hours under mixing conditions.

Example 12

5.63 g of ammonium dimolybdate solution (12 wt. % Mo) was mixed with 0.84 g of nickel sulfate solution (8 wt. % Ni) and about 170 g of heavy oil feedstock in a 1 liter batch hydrocracking unit (for 1 wt. % Mo to VR). The heavy oil feedstock containing a mixture of VR#1 as the vacuum resid (VR) and medium cycle oil at a weight ratio of 60:40. Elemental sulfur was added to the unit for a S to Mo wt. ratio of 5:1. The unit was heated up to 180° C. under hydrogen pressure of 1800-1900 psig for 2 hours under mixing conditions.

Example 13

Batch hydrocracking tests were carried out to compare the catalyst made in Comparative Example 1 with the in-situ sulfided catalysts made from metal precursor feed in aqueous solutions of Examples 7-13. The starting conditions of the batch units included 1400 psig pressure at 160° F. The batch hydrocracking units were heated to 805° F. temperature and held at that temperature for 2 hours reaction time, with sufficient catalyst for a concentration of 1 wt. % Mo in VR. Results are presented in Table 2, with analyses of the heavy oil in the batch reactors before and after.

TABLE 2

| Example | Mo:VR Wt. % | S:Mo wt. % | API° 60 F./60 F. | N Wt. ppm | S wt. % | MCR wt. % |
|---|---|---|---|---|---|---|
| Feed VR#1 | n/a | n/a | 2.5 | 5500 | 2.99 | 18.46 |
| Comp. Ex 1 | 1. | n/a | 12. | 4200 | 1.38 | 9.5 |
| Example 16 | 1. | 0 | 9.3 | 4900 | 1.90 | 12.74 |
| Example 17 | 1. | 0.7 | 10.6 | 4700 | 1.51 | 10.82 |

TABLE 2-continued

| Example | Mo:VR Wt. % | S:Mo wt. % | API° 60 F./60 F. | N Wt. ppm | S wt. % | MCR wt. % |
|---|---|---|---|---|---|---|
| Example 18 | 1. | 5. | 11.9 | 4400 | 1.62 | 10.45 |
| Example 19 | 1. | 5. | 11.3 | 4300 | 1.52 | 9.98 |
| Example 20 | 1. | 5. | 12.3 | 4200 | 1.39 | 9.87 |
| Example 21 | 1. | 5. | 12.6 | 4300 | 1.26 | 10.09 |
| Comp. Ex 1 | 0.20 | n/a | 10.1 | 4600 | 1.74 | 12.07 |
| Comp. Ex 1 | 0.04 | n/a | 9. | 4000 | 1.93 | 13.37 |
| Example 20 | 0.2 | 5. | 10.7 | 4500 | 1.69 | 10.91 |
| Example 20 | 0.05 | 5 | 10. | 3500 | 1.85 | 11.65 |
| Blank-no catalyst | 0 | 5 | 8.9 | 4350 | 2.38 | 14.96 |

Example 14

1.78 g of ammonium dimolybdate crystal was dissolved in 98.22 g of DI water to prepare the molybdenum molybdate solution. A sufficient amount of ammonium hydroxide was added to the solution for the pH to be at least 4. The solution was sulfided in an autoclave at 140° F. and 400 psig with the injection of hydrogen sulfide to Mo at a molar ratio of about 3.4 to 1. The sulfided aqueous slurry was sent to a second autoclave and mixed with VGO as a carrier oil for emulsification and transformation purpose with supplemental $H_2$ at 400° F. and 400 psig so that Mo sulfide compound formed could be reduced to Mo disulfide suspended in VGO. After transformation, the water/carrier oil/solid slurry mixture was sent to the third autoclave at elevated temperature (470° F.) with supplemental $H_2$ so that water could be boiled off. The post-transformation slurry catalyst was delivered to a high pressure separator, where the slurry oil based catalyst collected on the bottom, and water steam as well as other gases including $H_2$, $H_2S$, $CH_4$, and $NH_3$ were removed for water, gas, and residual oil separation.

Example 15

35.82 g of nickel sulfate hexahydrate crystal was dissolved into 64.18 g of DI water for the nickel sulfate solution. A sufficient amount of the ammonium dimolybdate solution as prepared in Example 14 was mixed with the nickel sulfate solution for a wt % ratio of Ni/Mo=23%. A sufficient amount of ammonium hydroxide was added to the solution for the pH to be at least 4. The solution was sulfided in an autoclave at 14°° F. and 400 psig with the injection of hydrogen sulfide at a molar ratio of S/Mo of about 3.4 to 1. The sulfided aqueous slurry was sent to a second autoclave and mixed with vacuum gas oil (VGO) as a carrier oil for emulsification and transformation at 400° F. and 400 psig, reducing Mo sulfide compound Mo disulfide suspended in VGO. After transformation, the water/carrier oil/solid slurry mixture was sent to the third autoclave at elevated temperature (470° F.) with supplemental $H_2$ to boil off water. The post-transformation slurry catalyst was delivered to a high pressure separator, where the slurry oil based catalyst collected at the bottom, and water steam as well as other gases including $H_2$, $H_2S$, $CH_4$, and $NH_3$ were removed for water, gas, and residual oil separation.

Example 15A

A sufficient amount of ammonium hydroxide was added to the ammonium dimolybdate solution as prepared in Example 14 for the pH to be at least 4. The solution was sulfided in an autoclave at 140° F. and 400 psig with the injection of hydrogen sulfide at a molar ratio of S/Mo about 3.4 to 1. After sulfidation of ammonium dimolybdate solution, a sufficient amount of the nickel sulfate solution as prepared in Example 4 was injected in and mixed with the post-sulfided aqueous slurry at a wt % ratio of Ni/Mo=23%. The slurry was then transformed at 400° F. and 400 psig with VGO, reducing Mo sulfide to Mo disulfide suspended in VGO. After transformation, the water/carrier oil/solid slurry mixture was sent to another autoclave at elevated temperature (470° F.) with supplemental $H_2$ so that water could be boiled off. The post-transformation slurry catalyst was delivered to a high pressure separator, where the slurry oil based catalyst collected on the bottom, and water along with $H_2$, $H_2S$, CH4, and $NH_3$ were removed for water, gas, and residual oil separation.

Example 16

BET characterization, pore porosity and pore size distribution were carried out with slurry catalysts from Example 14 and Comparative Examples 1A-3A. The wt. % of Mo in the post transformation slurry catalyst of the Examples are shown in Table 3. The surface area values are 65 $m^2/g$ for Comparative Example 3A; 75 $m^2/g$ for Example 1A; 120 $m^2/g$ for Example 2A; and 370 $m^2/g$ for Example 14. Total pore volume in cc/g for Example 3A is 0.15; 0.22 for Example 1A; 0.33 for Example 2A, and 0.86 for Example 14. Mesapore volume (PV of 25-1000 A) is 0.11 cc/g for Example 3A; 0.18 cc/g for Example 1A; 0.25 for Example 2A; and 0.68 for Example 14.

TABLE 3

| Example | % Mo |
|---|---|
| Comparative Ex 3A | 5.0 |
| Comparative Ex 1A | 4.8 |
| Comparative Ex 2A | 4.8 |
| Example 14 | 4. |

Example 17

As the slurry catalyst of Example 14 shows significantly better surface area and porosity properties compared to the catalysts of the prior art, hydrocracking tests were conducted to evaluate the catalyst performance. In this example, different catalyst dosages were added to about 112.5 g of heavy oil feedstock to 1 liter batch hydrocracking units, heated up to a temperature of 805° F. and kept at a pressure of 1600 psig for 2 hours. The heavy oil feedstock containing a mixture of VR#1 and medium cycle oil at a weight ratio of 60:40. Results of the batch hydrocracking test are shown in Table 4.

TABLE 4

| Catalyst | % Mo/VR | Product API | % HDN | % HDS | % HDMCR |
|---|---|---|---|---|---|
| Comp. Ex 3A | 1.00 | 9.2 | 32.4 | 65.2 | 52.8 |
| Comp. Ex 1A | 1.00 | 9.1 | 32.7 | 66.0 | 51.8 |
| Comp. Ex 2A | 1.00 | 9.9 | 31.9 | 70.8 | 54.4 |
| Example 14 | 1.00 | 11.7 | 39.5 | 76.4 | 60.6 |
| Example 14 | 0.50 | 9.6 | 32.8 | 68.6 | 53.5 |
| Example 14 | 0.25 | 9.1 | 35.1 | 67.5 | 51.7 |
| Comp. Ex 1 | 0.25 | 6.9 | 23.0 | 59.5 | 43.2 |

Example 18

Heavy oil upgrade was carried out in a continuous unit operated with two reactors in series, operating in once-through mode, i.e., with the effluent stream from the first reactor comprising upgraded products, the slurry catalyst, hydrogen containing gas, and unconverted heavy oil feedstock being sent to the second reactor for further heavy oil conversion. The reactor pressure varied between 2400 to 2500 psig. The reactor temperature was kept at about 815 to 818° F. Hydrogen rate as scf per bbl VR was set at about 3000. LHSV was kept at about 0.125 $hr^{-1}$. The results of the Comparative Examples are shown in Table 5. The slurry in Example 14 performed much better than the comparative slurry catalysts. For a catalyst concentration of 2909 ppm, the slurry catalyst provides surface area of 359 $m^2/g$ catalyst, available surface area of 1741 $m^2/kgVR$, TPV of 0.864 cc/g, mesapore volume of 0.864 $cm^3/g$, and ASPH of 6.1%. For a catalyst concentration of 1540 ppm, the slurry catalyst provides ASPH of 8.9%.

TABLE 5

| | Catalyst | | | |
|---|---|---|---|---|
| | Comp. Ex 3A | Comp. Ex 3A | Comp. Ex 2A | Comp. Ex 2A |
| Catalyst concentration, C (ppm, gMo/gVR) | 4053 | 3064 | 3023 | 2739 |
| Catalyst Properties | | | | |
| Ratio of active metals, Ni/Mo (wt/wt) | 0 | 0 | 23 | 11 |
| Surface area of fresh catalyst, SA ($m^2/g_{CAT}$) | 69 | 69 | 134 | 65 |
| Available surface area of fresh catalyst, C × SA ($m^2/kgVR$) | 464 | 350 | 811 | 328 |
| Pore volume of fresh catalyst, PV ($cm^3/g$) | 0.142 | 0.142 | 0.332 | 0.232 |
| Performance | | | | |
| Asphaltene content in heavy product, ASPH (wt. %) | 8.5 | 10.5 | 7.8 | 9.8 |

Example 19

Example 18 was repeated except that VR#2 was used instead of VR#1, comparing the catalysts from Examples 14 and 15 with the slurry catalyst from Comparative Example 2A. Results are shown in Table 6. With respect to porosimetry, Comparative 2A slurry catalyst provides a surface area (SA) of 157 $m^2/g$, TPV of 0.358 cc/g; PV (<100 A) of 0.1324 cc/g; PV (>100 A) of 0.2256 cc/g; and PV (25-1000 A) of 0.264 cc/g. For the slurry catalyst of Example 14 at a concentration of Mo/VR of 1500 ppm, the results show a surface area of 373 $m^2/g$; TPV of 0.864 cc/g, PV (<100 A) of 0.4949 cc/g, PV (>100 A) of 0.3691 cc/g; and PV (25-1000 A) of 0.683 cc/g. For the slurry catalyst of Example 15 at a concentration of Mo/VR of 1500 ppm, the results show a surface area of 221 $m^2/g$; TPV of 0.836 cc/g, PV (<100 A) of 0.1892 cc/g, PV (>100 A) of 0.6468 cc/g; and PV (25-1000 A) of 0.71 cc/g.

TABLE 6

| | Catalyst | | |
|---|---|---|---|
| | Comp. Ex 2A | Ex. 14 | Ex. 15 |
| Mo/VR ratio, ppm | 3000 | 1500 | 1500 |
| Conversion | | | |
| Sulfur, % | 80.93 | 74.86 | 81.17 |
| Nitrogen, % | 38.99 | 35.70 | 38.47 |
| MCR, % | 72.95 | 72.33 | 75.68 |
| VR (1000 F.+), % | 88.34 | 89.70 | 88.81 |
| HVGO (800 F.+), % | 75.08 | 76.74 | 76.29 |
| VGO (650 F.+), % | 58.61 | 60.76 | 60.23 |
| HDAs, % | 66.43 | 67.61 | 76.38 |

Example 20

1.78 g of ammonium dimolybdate crystal was dissolved in 98.22 g of DI water to prepare the molybdenum molybdate solution. A sufficient amount of ammonium hydroxide was added to the solution for the pH to be at least 4. The solution was sulfided in an autoclave at 140° F. and 400 psig with the injection of hydrogen sulfide at a molar ratio of S/Mo of about 3.4:1. The slurry was then transformed at 400° F. and 400 psig with VGO, reducing water-based Mo sulfide to Mo disulfide suspended in VGO. After transformation, the water/carrier oil/solid slurry mixture was sent to another autoclave at elevated temperature (470° F.) with supplemental $H_2$ so that water could be boiled off. The post-transformation slurry catalyst was delivered to a high pressure separator, where the slurry oil based catalyst collected on the bottom, and water along with $H_2$, $H_2S$, CH4, and NH3 were removed for water, gas, and residual oil separation.

Example 21

BET characterization, pore porosity and pore size distribution were carried out with slurry catalysts from Example 20 and Comparative Examples 1A and 3A. Results of the Comparative Examples are presented in Table 7. Example 10 slurry catalyst provides a surface area of 319 m²/g, and a TPV of 0.55 cc/g.

TABLE 7

| Example | Wt. % Mo in water based catalyst | Wt. % Mo in oil based catalyst | Surface Area (m²/g) | Total pore Volume (cc/g) |
|---|---|---|---|---|
| Comp. Ex 3 | 10.7 | 65 | 65 | 0.15 |
| Comp. Ex 1 | 9.4 | 75 | 75 | 0.22 |

Example 22

Heavy oil upgrade was carried out under conditions similar to Example 18 with a continuous unit operated with two reactors in series. The results of the Comparative Examples are shown in Table 8. Example 20 with a concentration of 3018 ppm Mo gives a surface area of 281 m²/g, and a PV of 0.862 cm³/g.

TABLE 8

| | Catalyst | | |
|---|---|---|---|
| | Comp. Ex 3A | Comp. Ex 3A | Comp. Ex 1A |
| Catalyst concentration, C (ppm, gMo/gVR) | 4053 | 3064 | 2739 |
| Catalyst | | | |
| Surface area of fresh catalyst, SA (m²/gCAT) | 69 | 69 | 65 |
| Pore volume of fresh catalyst, PV (cm³/g) | 0.142 | 0.142 | 0.232 |

Example 23

A pressure leach solution was prepared according to the disclosure in U.S. Pat. No. 7,837,960 for the separation and recovery of base metals from spent catalyst. The composition has a starting pH of about 3, containing 33 gpL free NH3, 80.9 gpL Mo, 7.9 gpL Ni, 0.17 gpL V, 277 gpL ammonium sulfate (Amsul) and 10-gpL ammonium sulfamate.

Example 24

A sufficient amount of PLS solution from Example 23 was added to about 170 g of heavy oil feedstock in a 1 liter batch hydrocracking unit for 0.2 wt. % Mo to VR. The heavy oil feedstock containing a mixture of VR#1 as the vacuum resid (VR) and medium cycle oil at a weight ratio of 60:40. A sufficient amount of elemental sulfur was added to the unit for a S to Mo molar ratio of 75:1. The unit was heated up to 180° C. under hydrogen pressure of 1800-1900 psig for 2 hours.

Example 25

Example 24 was repeated, and the pre-soaked mixture was homogenized in a high shear mixer.

Example 26

Example 24 was repeated with the addition of 3 wt. % of sorbitan monooleate (Span™ 80) as a wt. % of the PLS solution, before pre-soak and homogenizing in a static mixer for an emulsified mixture.

Example 27

Batch hydrocracking tests were carried out to compare the catalyst made in Comparative Example 1, with the in-situ sulfided catalysts made from the pressure leach solution of Examples 23-26. The starting conditions of the batch units included 1400 psig pressure at 160° F. The batch hydrocracking units were heated to 805° F. temperature and held at that temperature for 2 hours reaction time, with sufficient catalyst for a concentration of Mo in VR as specified. Results are presented in Table 9, with analyses of the heavy oil in the batch reactors before and after.

TABLE 9

| Example | Mo:VR Wt. % | S:Mo wt. ratio | API° 60 F./60 F. | N Wt. ppm | S wt. % | MCR wt. % |
|---|---|---|---|---|---|---|
| Feed VR#1 - blank run | n/a | n/a | 8.9 | 4350 | 2.38 | 14.96 |
| Comp. Ex 1 | 0.2 | n/a | 10.1 | 4600 | 1.74 | 12.07 |

TABLE 9-continued

| Example | Mo:VR Wt. % | S:Mo wt. ratio | API° 60 F./60 F. | N Wt. ppm | S wt. % | MCR wt. % |
|---|---|---|---|---|---|---|
| Comp. Ex 1 | 0.2 | n/a | 10.7 | 4500 | 1.69 | 10.91 |
| Example 23 | 0.2 | 0 | 9.8 | 4800 | 1.80 | 12.04 |
| Example 24 | 0.2 | 25. | 10.6 | 4600 | 1.84 | 11.12 |
| Example 25 | 0.2 | 25. | 11.3 | 4500 | 1.55 | 10.42 |
| Example 26 | 0.2 | 25. | 11.8 | 4400 | 1.50 | 10.17 |
| Comp. Ex 1 | 1.0 | 25. | 9.5 | 4200 | 1.38 | 9.5 |

Example 28

Ammonium heptamolybdate was mixed with a hot (70° C.) DMSO to prepare a solution containing 11 wt. % Mo. The oil-soluble metal precursor was mixed with a preheated feed. It is noted that DMSO forms $H_2S$ on heating with H, therefore sulfur addition is optional.

Example 29

Example 28 was repeated with the addition of elemental sulfur to the feed for a 0.7:1 S to Mo (wt. ratio).

Example 30

Batch hydrocracking tests were carried out to compare the catalysts made in Comparative Examples and the slurry catalysts made with the oil-soluble metal precursors formed from DMSO. A sufficient amount of slurry catalyst was added to batch hydrocracking units for a concentration of 1 wt. % Mo in VR (VR#1 used). The units were tested under hydroprocessing conditions. Standard resid protocol tests were performed thereafter: initial 1400 psig $H_2$ (160° F.), then 90 min ramp followed by 2 hr soak at 805° F. Results are presented in Table 10, with analyses of the heavy oil in the batch reactors before and after. The sulfur amount in the table (wt. %) indicates product characterization (indicative of HDS).

TABLE 10

| Example | Mo:VR Wt. % | API° 60 F./60 F. | N Wt. ppm | S wt. % | MCR wt. % |
|---|---|---|---|---|---|
| Feed VR#1-blank run | n/a | 8.9 | 4350 | 2.99 | 14.96 |
| Comp. Ex 3 | 1 | 11.3 | 4600 | 1.74 | 10.88 |
| Comp. Ex 1 | 1 | 11.8 | 4400 | 1.42 | 10.58 |
| Example 30 | 1 | 11.7 | 4600 | 1.55 | 11.42 |
| Example 29 | 1 | 11.2 | 4600 | 1.71 | 12.08 |

Example 31

A sufficient amount of Promoter metal precursor nickel sulphate was added to the sulfided oil-based catalyst precursor of Comparative Example 3A for a slurry catalyst having a Ni to Mo weight ratio of 10%.

Example 32

A sufficient amount of Promoter metal precursor nickel naphthenate was added to the sulfided oil-based catalyst precursor of Comparative Example 3A for a slurry catalyst having a Ni to Mo weight ratio of 10%. The mixture was heated to a temperature of 475° F. for 2 hours with the addition of hydrogen.

Example 33

Example 32 is repeated, but nitrogen was used instead of hydrogen.

Example 34

A sample of Group VIB metal precursor molybdenum naphthenate 6% Mo was provided.

Example 35

A sample of Molyvan™ A, a molybdenum oxysulfide dithiocarbamate complex, was provided.

Example 36

A sufficient amount of Promoter metal precursor nickel naphthenate was added to a sample of Molyvan™ A in Example 35 for a catalyst precursor having a Ni to Mo weight ratio of 10%.

Example 37

The mixture of Example 36 was heated to a temperature of 475° F. for 2 hours.

Example 38

A sample of OLOA-011007, a lubricant oil additive based on succinimide chemistry, commercially available from Chevron Oronite of San Ramon, Calif., was provided.

Example 39

To a 500 mL 3 neck round bottom flask, diethylene triamine (148.04 g, 1.435 mol), and elemental sulfur (73.62 g, 2.296 mol) were charged. The reaction mixture was allowed to stir and heat at 80° C. for 2.5 hrs. Ammonium dimolybdate (97.55 g, 0.287 mol) was then charged, and the reaction mixture was allowed to heat and stir for another 2 hours at 120° C. 116 g of product was collected, and the rest was treated in Example 40.

Example 40

To the remaining reaction mixture from example 39, $H_2O$ (300 mL) was charged, and it was allowed to stir for 1 hour. The reaction mixture was then allowed to cool to room temperature. The precipitate was filtered, and washed with $H_2O$, ethanol, carbon disulfide, and diethyl ether.

Example 41

Batch hydrocracking tests were carried out to compare the catalysts made in Comparative Examples and the catalysts/precursors made in Examples 31-39. A sufficient amount of precursors/catalysts from the Examples was added to batch hydrocracking units for a concentration of 1 wt. % Mo in VR. The units were tested under hydroprocessing conditions. Standard resid protocol tests were performed thereafter: initial 1400 psig $H_2$ (160° F.), then 90 min ramp followed by 2 hr soak at 805° F. Results are presented in Table 11, with analyses of the heavy oil in the batch reactors before and after.

TABLE 11

| Examples | HDN % | HDS % | HMCRT % | 1000+ | 800+ |
|---|---|---|---|---|---|
| Comp. Ex 1A | 44.2 | 81.2 | 66.7 | 87 | 71.7 |
| Comp. Ex 3A | 41.4 | 77.2 | 68 | 85.4 | 70.9 |
| Example 31 | 48.7 | 77.1 | — | 92.2 | 75 |
| Example 32 | 44 | 79.3 | 65.9 | 83.5 | 67.3 |
| Example 33 | 49.7 | 80.2 | — | 94.4 | 79 |
| Example 34 | 53.4 | 88.1 | 78 | 90.3 | 75.2 |
| Example 35 | 61.6 | 88.5 | 78.6 | 90.8 | 74.1 |
| Example 36 | 74.1 | 95.5 | 87.9 | 94.2 | 83 |
| Example 37 | 48.8 | 82.4 | 69.9 | 92.2 | 75.8 |
| Example 38 | 64.9 | 89.7 | 78.5 | 92.3 | 77.4 |
| Example 39 | 45.4 | 75.5 | — | 83.5 | 71.9 |
| Example 40 | 44.1 | 74.4 | — | 86.2 | 72.8 |

Example 42

Rework was obtained by grinding a commercially available catalyst precursor (e.g., ICR 131 from ART Catalyst) to an average particle size of 40 microns or less (average particle size was 37 microns). The rework was mixed with a sufficient amount of VGO for a slurried rework having a Mo and Ni content similar to the slurry catalyst of Comparative Example 1 (about 1.5 wt. % Mo in VGO).

Example 43

Slurry catalyst from Comparative Example 1A was compared with the slurried rework metal precursor in Example 42. The materials were mixed with a heavy oil feedstock VR#1.

Heavy oil upgrade was carried out in a continuous unit operated with three reactors in series, operating in once-through mode, i.e., with the effluent stream from the first reactor comprising upgraded products, the slurry catalyst, hydrogen containing gas, and unconverted heavy oil feedstock being sent to the second and third reactors for further heavy oil conversion. The reactor pressure varied between 2475 to 2525 psig. The reactor temperature was kept at about 802-803° F. Hydrogen rate as scf per bbl VR per reactor was about 4500. LHSV was kept at about 0.09 hr$^{-1}$. The results are shown in Table 12. With respect to porosimetry, Comparative Example 1A provides a surface value of 74.2 m$^2$/g; a TPV of 0.232 cc/g; and a PV (>100 A) of 0.1647 cc/g. Example 42 provides a surface value of 113 m$^2$/g; a TPV of 0.382 cc/g; and a PV (>100 A) of 0. 2002 cc/g.

TABLE 12

| | Catalyst | |
|---|---|---|
| | Comp. Ex 1A | Ex. 42 |
| Mo/VR ratio, ppm | 4062 | 994 |
| Conversion | | |
| Sulfur, % | 92.44 | 95.42 |
| Nitrogen, % | 55.57 | 59.86 |
| MCR, % | 87.34 | 89.56 |
| VR (1000 F.+), % | 93.28 | 94.52 |
| HVGO (800 F.+), % | 81.59 | 82.86 |
| VGO (650 F.+), % | 63.21 | 64.43 |

Example 44

33.12 g of ammonium heptamolybdate tetrahydrate (($NH_4$)$_6$$Mo_7$$O_{24}$) is dissolved in 100 g of water in a glass vessel fitted with an overhead mechanical stirrer, and 14.1 g of concentrated ammonia solution (28 wt. % $NH_4OH$ in $H_2O$) is added. A solution of 8.1 g of nickel sulfate hexahydrate ($NiSO_4 \cdot 6H_2O$) in 32 g of water is added to the first solution, all at ambient temperature, forming a mixture having a Ni/Mo ratio of 10% (by weight). The mixture is heated to 70° C. under atmospheric pressure, and 101 g of ammonium sulfide (($NH_4$)$_2$S) solution in water (40-44 wt. %) was added slowly, over the course of 45 minutes. A sufficient amount of titanium napthanate solution is added to the mixture for a Ti/Mo ratio of 10% (by weight) and stirred at 825° F. During heating, titanium naphthenate decomposes to produce a Ti/Ni/Mo/S catalyst. The product can be transformed to an oil-base catalyst as in Comparative Example 1A.

Example 45

A sufficient amount of titanium napthanate solution was added to the catalyst from Comparative Example 1A for a Ti/Mo ratio of 10% (by weight) under the following reaction conditions: 725° F., 500 psig $H_2$ and 3 hour soak, during heating titanium naphthenate decomposes to produce a Ti/Ni/Mo/S catalyst, produced by ex-situ synthesis.

Example 46

Batch hydrocracking tests were carried out to compare the catalysts made in Comparative Example 1A and the catalyst made in Example 45. A sufficient amount of catalyst from the two Examples were added to VR#1 in 1 liter autoclaves for a 1.25% Mo/VR wt. ratio. The autoclaves were pressurized to 1600 psig $H_2$, heat to 825° F. for 2.5 hours then allowed to soak at 825° F. for 5 hours. At the end of the soak, the reaction was quenched, the liquid products recovered, and conversions were calculated. Results are presented in Table 13, with analyses of the heavy oil in the batch reactors before and after.

TABLE 13

| Test | HDN % | HDS % | HDMCR % | VR % (1000 F.+) |
|---|---|---|---|---|
| Comparable Ex. 1A | 54.3 | 87.8 | 79.0 | 96.2 |
| Comparable Ex. 1A | 50.2 | 85.5 | 79.2 | 97.1 |
| Comparable Ex. 1A | 48.6 | 84.3 | 77.2 | 95.6 |
| Ex. 45 | 57.7 | 89.9 | 82.1 | 95.6 |
| Ex. 45 | 60.4 | 90.2 | 84.0 | 97.4 |
| Ex. 45 | 57.7 | 90.6 | 82.5 | 96.4 |

Example 47

Appropriate quantity of nickel naphthenate oil soluble catalyst was mixed with a heavy oil feedstock blend of VR#1 and cycle oil (HCO/MCO) at a 60:40 wt. ratio for a 0.75 wt. % Ni to feedstock, and charged into a 1 liter autoclave. The autoclave was pressurized to 1600 Psig $H_2$, heated to 825° F. in 2.5 hours, and then allowed to soak at 825° F. for 2 hours. A nickel sulfide slurry catalyst is generated from the thermal decomposition products of nickel naphthenate and $H_2S$ during the initial ramp to 825° F. At the end of the soak, the reaction was immediately quenched, the liquid products were recovered, and conversions were calculated from resulting liquid hydrocarbon product analyses.

Example 48

218 mL of water, 89.5 g of nickel sulfate hexahydrate, and 29.15 g of concentrated ammonium hydroxide solution in water (28 wt. % $NH_3$) were combined in a glass flask fitted with an overhead stirrer and a nitrogen line to maintain inert atmosphere during reaction. The mixture was stirred until complete dissolution. The resulting solution was sulfided using 60 g of 40 wt. % ammonium sulfide solution in water, at 70° C. under nitrogen blanket for 1 hour. The product was transferred into another flask, allowed to settle, and decanted to separate the solids. To a portion of these solids, containing ~10 g of nickel, 200 g of VGO was added, and the remaining water was evaporated in a reactor at 204-232° C. (400-450° F.) in a flow of nitrogen under 400 psig pressure, yielding a black slurry product, containing the active catalyst component.

Example 49

Batch hydrocracking tests were carried out to compare the catalyst made in Comparative Example 1A (a standard Ni Mo catalyst) and the catalyst made in Example 47, which have compositions as shown in Table 14:

TABLE 14

| Description | Mo (%) | Ni (%) | S (%) | C (%) | H (%) | N (%) |
|---|---|---|---|---|---|---|
| Comparative Example 1 | 9.45 | 0.88 | 9.67 | 68.19 | 9.33 | 1.03 |
| Example 47 | 0.00 | 8.62 | 8.82 | 61.83 | 10.02 | 2.73 |

The slurry catalysts were mixed with a heavy oil feed (a blend of VR#3/HCO and MCO) at a rate of 0.75% Ni to heavy oil feed for Example 47, and 1.25% Mo to heavy oil feed for Comparative Example 1A, and charged into 1 liter autoclaves. The autoclaves were pressurized to 1600 Psig $H_2$, heated to 825° F. in 2.5 hours, and then allowed to soak at 825° F. for 2 hours. At the end of the soak, the reaction was immediately quenched, the liquid products were recovered, and conversions were calculated from resulting liquid hydrocarbon product analyses. It should be noted that nickel was charged on an equal molar basis to the slurry catalyst in the Comparative Example. Table 15 compares the hydrocracking results of the slurry catalysts of Examples 47, 48, and Comparative Example 1A, showing comparable results under the same reaction condition. It is further noted that Examples 47 and 48 employ 60% less metals in the catalyst, and with less metal deposits (e.g., contaminants such as vanadium) the reactor, for a more effective vanadium trapping effect.

TABLE 15

| | % Conversion | | | | | | Wet Solids |
|---|---|---|---|---|---|---|---|
| Description | HDN | HDS | HMCRT | 1000+ | 800+ | 650+ | (g) |
| Comparative Ex. 1A | 45.8 | 82.5 | 70.1 | 93.2 | 77.7 | 57.9 | 3.7 |
| Example 47 | 41.4 | 76.9 | 68.9 | 88.1 | 72.9 | 56.1 | 1.5 |
| Example 48 | 42.0 | 74.7 | 64.1 | 92.9 | 78.3 | 58.4 | 4.5 |

Example 50

In this example, ex-situ slurry catalyst was prepared by thermal decomposition of organometallic metal precursors (Molybdenum dithiocarbamate=Molyvan A—28% Mo and Nickel naphthenate—7% Ni in VGO). 82 g of VGO, 35.7 g of Molyvan A, and 14.3 g of nickel naphthenate were combined and homogenized. The mixture was added to 1 L autoclave and pressurized with 400 psig $H_2$, agitated at 300 RPM, and heated to 725° F. for an hour. The catalyst precursor thermally decomposed in-situ under soaking condition of 725° F. for 3 hours. The reactor was cooled to about 70° F. and depressurized. 300 g of toluene was added to the reactor and mixture was agitated for 15 minutes at 750 RPM. The slurry catalyst was deoiled by centrifugation. 82 g of VGO was added to the decanted slurry catalyst, and the slurry catalyst composition was analyzed. The ex-situ catalyst has an average particle size of 3 microns, and shows an atomic S/Mo ratio of ~2, suggesting an active catalyst phase of $MoS_2$ promoted with nickel.

Example 51

In this example, in-situ promoted slurry catalyst is prepared. Appropriate quantities of Molyvan A and nickel naphthenate oil soluble catalyst precursors were mixed with a blend of VR#1/HCO/MCO (60:40 ratio) to provide a wt. % of 1.25 Mo/VR (at 10% Ni/Mo wt.). The mixture was charged into a 1 liter autoclave. The autoclave was then pressurized to 1600 PSIG $H_2$, heated to 825° F. in 2.5 hours. Slurry catalyst was generated from the thermal decomposition products of Molyvan A, nickel naphthenate, and $H_2S$ during the initial ramp to 825° F.

Example 52

In this example, in-situ slurry catalyst is prepared without any promoter. Example 51 was repeated except without any nickel precursor, and slurry catalyst was generated from the thermal decomposition products of Molyvan A and $H_2S$ during the initial ramp to 825° F.

Example 53

Batch hydrocracking tests were carried out to compare the catalysts made in Comparative Example 1A and the catalysts made in Examples 50-52. Catalysts from Comparative Example 1A and Example 50 were added to 1 liter autoclave units for a concentration of 1.25 wt. % Mo in VR#1. The catalysts were tested under hydroprocessing conditions. The autoclaves were then pressurized to 1600 psig hydrogen, heated to 825° F. in 2.5 hours, and then allowed to soak at 825° F. for 2 hours. For the catalysts of Examples 51-52, they were allowed to continue soaking in the autoclave at 825° F. for 2 hours (after heating up to 825° F. in 2.5 hours). At the end of the soak, the reaction was immediately quenched, the liquid products were recovered from the autoclave units, and conversions were calculated from resulting liquid hydrocarbon product analyses. Results are presented in Table 16, with analyses of the heavy oil in the batch reactors before and after.

TABLE 16

| Examples | HDN % | HDS % | HDMCRT % | 1000+ % |
|---|---|---|---|---|
| Comparable Ex. 1A | 46.6 | 82.75 | 70.53 | 93.34 |
| Example 50 | 61.6 | 88.47 | 78.59 | 90.78 |
| Example 51 | 74.1 | 95.45 | 87.87 | 94.20 |
| Example 52 | 48.8 | 82.42 | 69.93 | 92.24 |

Example 54

The slurry catalyst from Comparative Example 3A was treated with a small stream of $H_2$ (6800 SCF per BBL of catalyst feed) for about 3 hrs., and at 350° F.

Example 55

The pre-treated slurry catalyst from Example 54 was compared with the untreated slurry catalyst from Comparative Example 3A. With preconditioning, the surface area of the slurry catalyst increased by 17% from 69 to 81 m²/g, total pore volume increased by 23% from 0.142 to 0.175 cc/g, and mesopore volume increased by 25% from 0.105 to 0.131 cc/g.

Example 56

The slurry catalyst from Comparative Example 1A was treated with a small stream of $H_2$ (6800 SCF per BBL of catalyst feed) for about 10 hrs., at a temperature of 350° F.

Example 57

The slurry catalyst from Comparative Example 1A was treated with a small stream of $H_2$ (6800 SCF per BBL of catalyst feed) for about 10 hrs., and at a higher temperature of 600° F.

Example 58

Continuous heavy oil upgrade experiments were carried out to compare the slurry catalyst from Comparative Example 1A (not pre-treated) with the hydrogen treated catalysts from Examples 54, 56, and 57 (with hydrogen treatment). The continuous hydrocracking unit was operated in "recycle mode," i.e., with at least a portion of the non-volatile fractions recovered from a flash separator in the unit was recycled back to one of the reactors in the unit. The unit was operated with an average reactor temperature of about 820° F. The reactor pressure varied between 2400 to 2550 psig. The heavy oil feedstock was a VR#1: MCO mixture at a rate of 60:40. Slurry catalyst was supplied to the unit at a rate equivalent to about 4000 ppm Mo/VR. Each unit has 3 reactors in series, with an interstage flash separator (IFS) located between the $2^{nd}$ and the $3^{rd}$ reactor, and the $2^{nd}$ flash separator located after the last ($3^{rd}$) reactor. The non-volatile fractions from the first IFS are supplied as feed to the second reactor, and a portion of the non-volatile fractions from the $2^{nd}$ flash separator is recycled/sent back to the 1st reactor, with a small portion being removed as bleed (equivalent to about 8% of the heavy oil feedstock). The recycle stream is equivalent to about 20-30% of the total heavy oil feed to the first reactor. Table 17 summarizes the results of the runs, showing 8-43% improvement in k-values due to the effect of the catalyst pre-treatment with hydrogen.

TABLE 17

|  | Comparative Example 1A | Example 56 | Example 57 |
|---|---|---|---|
| Sulfur Conversion, % | 95.58 | 94.09 | 95.12 |
| Nitrogen Conversion, % | 71.64 | 67.56 | 69.73 |
| MCR Conversion, % | 97.17 | 95.73 | 96.69 |
| VR (1000 F.+) Conversion, % | 99.04 | 98.66 | 98.83 |
| HVGO(800 F.+) Conversion, % | 93.88 | 92.73 | 93.75 |
| VGO (650 F.+) Conversion, % | 78.09 | 76.12 | 78.22 |
| K Sulfur | 5.79 | 4.94 | 5.52 |
| K Nitrogen | 1.65 | 1.44 | 1.55 |
| K MCR | 7.26 | 5.87 | 6.82 |
| K VR | 11.79 | 10.13 | 10.99 |
| K HVGO | 4.87 | 4.40 | 4.88 |
| K VGO | 2.09 | 1.93 | 2.12 |
| API-slurry liquid filtrate | 3.2 | 1.9 | 1.6 |
| API-high pressure overhead stream | 36.0 | 35.4 | 35.5 |
| API-Whole Product | 33.69 | 32.46 | 33.16 |

Example 59

9.04 g of stock 11 wt. % Mo ammonium heptamolybdate solution (equivalent to 1 g Mo) was mixed with 0.45 g of nickel sulfate hexahydrate (equivalent to 0.1 g Ni), and about 170 g of heavy oil feedstock in a 1 liter batch hydrocracking unit (for a Mo:Ni ratio of 10:1 by weight and a catalyst concentration as Mo:VR of 1 wt. %). The heavy oil feedstock containing a mixture of VR#1 as the vacuum resid (VR) and cycle oil at a weight ratio of 60:40, for API° of 2.5 at 60° F., MCR in wt. % of 18.46 and 5500 ppm of nitrogen. Elemental sulfur was added to the unit for a S to Mo wt. ratio of 5:1. The unit was heated up to 180° C. under hydrogen pressure of 1800-1900 psig for 2 hours under mixing conditions to pre-disperse the catalyst precursor in heavy oil.

Example 60

6.84 g of 15 wt. % Mo ammonium heptamolybdate solution (equivalent to 1 g Mo) was mixed with 0.44 g of zinc sulfate heptahydrate (equivalent to 0.1 g Zn) for a Mo:Zn ratio of 10:1 by weight, in a sufficient amount of the same heavy oil feedstock as in Example 62 for a catalyst concentration of 1 wt. % Mo:VR.

Example 61

Example 60 was repeated except with 6.84 g of 15 wt. % Mo ammonium heptamolybdate solution (equivalent to 1 g Mo) and 2.2 g of zinc sulfate heptahydrate (equivalent to 0.5 g Zn), for a Mo:Zn ratio of 2:1 by weight, and the same catalyst concentration of 1 wt. % Mo:VR.

Example 62

Example 59 was repeated, except that the amount of heavy oil feedstock was sufficient for a Mo:VR ratio of 0.2 wt. %, and a sufficient amount of elemental sulfur was added to the unit for a S to Mo wt. ratio of 25:1.

Example 63

Example 60 was repeated, except that the amount of heavy oil feedstock was sufficient for a Mo:VR ratio of 0.2 wt. % and a sufficient amount of elemental sulfur was added to the unit for a S to Mo wt. ratio of 25:1.

Example 64

A number of batch hydrocracking tests were carried out to compare the catalyst made in Comparative Example 1 with the in-situ sulfided catalysts made from metal precursor feed in aqueous solutions of Examples 59-63. The starting conditions of the batch units included 1800 psig pressure at 180° F. The batch hydrocracking units were heated to 805° F. temperature and held at that temperature for 2 hours reaction time. Results are presented in Table 18, with analyses of the heavy oil in the batch reactors before and after. Liquid yield means amount of liquid obtained as a % of heavy oil feed.

TABLE 18

| Example | Mo:VR Wt. % | S:Mo wt. % | API° 60 F./60 F. | N Wt. ppm | S wt. % | MCR wt. % |
|---|---|---|---|---|---|---|
| Feed VR#1 | n/a | n/a | 2.5 | 5500 | 2.99 | 18.46 |
| Comp. Ex 1 | 1. | n/a | 12. | 4200 | 1.38 | 9.5 |
| Example 59 | 1. | 5.0 | 12.6 | 4300 | 1.26 | 10.09 |
| Example 60 | 1. | 5.0 | 12.4 | 4100 | 1.24 | 10.18 |

TABLE 18-continued

| Example | Mo:VR Wt. % | S:Mo wt. % | API° 60 F./60 F. | N Wt. ppm | S wt. % | MCR wt. % |
|---|---|---|---|---|---|---|
| Example 61 | 1. | 5.0 | 13.6 | 3900 | 1.26 | 9.15 |
| Comp. Ex 1 | 0.2 | n/a | 10.1 | 4600 | 1.74 | 12.07 |
| Example 62 | 0.2 | 25 | 11.4 | 4600 | 1.81 | 10.58 |
| Example 63 | 0.2 | 25 | 11.7 | 4600 | 1.40 | 10.69 |

Example 65

9000 grams of ADM solution (12% Mo) was heated to the 750 RPM at 150° F. and 400 PSIG. To this heated ADM solution, a gas stream comprising 20 vol. % $H_2S$, 20% $CH_4$, 60% $H_2$ was bubbled through the solution for 4 hours. After the $H_2S$ addition, then an appropriate amount of nickel sulfate solution (8% Ni) was added to the mixture for a Ni/Mo wt % of ~23%. The mixture was then subjected to a second sulfiding step for 30 minutes with the gas stream comprising 20 vol. % $H_2S$, 20% $CH_4$, and 60% $H_2$. The water based catalyst precursor was then drained from the reactor.

The water-based catalyst precursor slurry was transformed (continuous basis) at 400° F. and 400 psig with VGO, resulting in an $H_2S$ enhanced oil based catalyst. After transformation, the water/carrier oil/solid slurry mixture was sent to another autoclave at elevated temperature (470° F.) with supplemental $H_2$ so that water could be boiled off. The post-transformation slurry catalyst was delivered to a high pressure separator, where the slurry oil based catalyst collected on the bottom, and water along with $H_2$, $H_2S$, CH4, and NH3 were removed for water, gas, and residual oil separation.

Example 66

A number of hydrocracking tests were carried out to compare the catalyst made in Comparative Example 2A (catalyst with 23% Ni/Mo level) with the $H_2S$ enhanced oil based catalyst of Examples 65 at different levels of Mo to VR#2 as shown. Table 19 summarizes the characteristics of the Comparative catalyst after a continuous transformation step.

TABLE 19

| Catalyst type | % wt. Mo in aqueous catalyst precursor | Oil carrier: catalyst precursor wt/wt | Wt. % Mo in oil-based catalyst | Surface area m2/g | TPV cc/g |
|---|---|---|---|---|---|
| Comp. Ex. 2A | 9.4 | 1.5:1 | 4.8 | 135 | 0.34 |
| Example 65 | 9.4 | 1.5:1 | 4.8 | 112 | 0.34 |

In the Example, the reactors were operated in series for a continuous test employing the catalysts in Table 19. Results of the runs are presented in Table 20 including the reactor conditions. It is observed that the catalyst with enhanced sulfur level (in a second sulfiding step) provides better performance in heavy oil upgrade, in some embodiment, of at least 5% increase in desulfurization rate, among other improvements.

TABLE 20

|  | Comp. Example 1A | Comp. Example 1A | Example 65 | Example 65 | Example 65 |
|---|---|---|---|---|---|
| LHSV (VR#2), h−1 | 0.12 | — | 0.11 | 0.11 | — |
| Ave $H_2$ rate, scf/Bbl/reactor | 1851 | — | 1862 | 1857 | — |
| Mo/VR, ppm | 2939 | 3000 | 3229 | 2393 | 3000 |
| Ave. Reactor T in ° F. | 816.6 | 819 | 816.7 | 816.7 | 819 |
| K(VR) 1000° F.+ | 5.8 | 5.12 | 6.0 | 6.1 | 5.32 |
| K(HVO) 800° F.+ | 3.2 | 2.67 | 3.3 | 3.3 | 2.72 |
| K (MCR) | 3.0 | 2.46 | 3.2 | 3.1 | 2.68 |
| K Sulfur | 5.1 | 3.43 | 5.5 | 5.0 | 3.93 |
| K Nitrogen | 0.6 | 0.76 | 0.7 | 0.5 | 0.79 |

Example 67

33.12 g of ammonium heptamolybdate tetrahydrate (($NH_4)_6Mo_7O_{24}$) is dissolved in 100 g of water in a glass vessel, and 14.1 g of concentrated ammonia solution (28 wt. % $NH_4OH$ in $H_2O$) is added. A solution of ~8.1 g of nickel sulfate hexahydrate ($NiSO_4.6H_2O$) in 32 g of water is added to the first solution, all at ambient temperature, forming a mixture having a Ni/Mo ratio of 5% (by weight). The mixture is heated to 70° C. under atmospheric pressure, and 101 g of ammonium sulfide (($NH_4)_2S$) solution in water (40-44 wt. %) is added slowly, over the course of 45 minutes for a co-sulfided catalyst precursor having a Ni/Mo ratio of 10% (by weight). The resulting water-based catalyst precursor is transformed to a final oil-based catalyst with VGO and hydrogen in a pressure test autoclave in situ

Example 68

33.12 g of ammonium heptamolybdate tetrahydrate (($NH_4)_6Mo_7O_{24}$) is dissolved in 100 g of water in a glass vessel, and 14.1 g of concentrated ammonia solution (28 wt. % $NH_4OH$ in $H_2O$) is added. A solution of ~4.051 g of nickel sulfate hexahydrate ($NiSO_4.6H_2O$) in 16 g of water is added to the first solution, all at ambient temperature. The mixture is heated to 70° C. under atmospheric pressure, and 101 g of ammonium sulfide (($NH_4)_2S$) solution in water (40-44 wt. %) is added slowly, over the course of 45 minutes forming a co-sulfided catalyst precursor with a Ni/Mo ratio of 5% (by weight). Another solution of ~4.051 g of nickel sulfate hexahydrate ($NiSO_4.6H_2O$) in 16 g of water is mix into the co-sulfided mixture for a final Ni/Mo ratio of 10% (by weight). The resulting water-based catalyst precursor with split Ni metal precursor feed is transformed to a final oil-based catalyst with VGO and hydrogen in a pressure test autoclave in situ.

Example 69

A number of hydrocracking tests are carried out to compare the catalyst made in Comparative Example 1A (catalyst with 10% Ni/Mo level) with the co-sulfided catalyst, and the catalyst made with a split Ni feed. Table 21 summarizes the characteristics of the catalysts after a transformation step and table 22 summarizes the performance in hydrocracking test. The catalyst made with the split Ni feed has similar posimetry to the co-sulfided catalyst, but higher catalytic activity compared to the co-sulfided catalyst. It was also noted that the catalyst made with a split Ni feed had a reduced vanadium trapping in the hydrocracking reactor by at least 5% compared to the Comparative Example 1A, and surface area of 147 m²/g and 140 m²/g respectively for Examples 67 and 68 compared to 77 m²/g for Comparative Example 1A; a TPV of 0.411 cc/g and 0.400 cc/g respectively for Examples 67 and 68 compared to 0.241 cc/g for Comparative Example 1A.

TABLE 21

|  | Comparative Example 1A | Example 67 | Example 68 |
|---|---|---|---|
| Ni/Mo ratio (wt. %) | 10 | 10 | 10 |
| PV (<100 Å), cc/g | 0.071 | 0.121 | 0.120 |
| PV (>100 Å), cc/g | 0.170 | 0.290 | 0.280 |
| PV (>200 Å), cc/g | 0.123 | 0.238 | 0.220 |
| % PV <100 Å | 29.3 | 29.3 | 30 |
| % PV >100 Å | 70.7 | 70.7 | 70 |

TABLE 22

| | Catalyst | | |
|---|---|---|---|
|  | Comparative Example 1A | Example 67 | Example 68 |
| VR LHSV, h⁻¹ | 0.09 | 0.09 | 0.09 |
| Mo/VR, ppm | 4200 | 4200 | 4200 |
| Avg. Rx. Temp., °F. | 805.0 | 805.0 | 805.4 |
| Conversion: | | | |
| MCR | 87.35 | 87.33 | 87.38 |
| VR (1000° F.+) | 94.00 | 94.27 | 93.26 |
| Rate constant (10⁻¹³ h) | | | |
| K Sulfur | 6.00 | 5.24 | 6.27 |
| K Nitrogen | 1.35 | 1.26 | 1.40 |
| K MCR | 4.00 | 3.86 | 4.02 |
| K VR (1000° F.+) | 6.10 | 6.21 | 5.90 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A process for preparing a slurry catalyst for use in upgrading heavy oil feedstock, comprising:
    providing a metal precursor solution comprising a mixture of at least two different water-soluble metal salts in a water solvent of at least two different metals selected from Group VIB, Group VIII, Group IVB, Group IIB metals and mixtures thereof;
    mixing the metal precursor solution with a hydrocarbon diluent under high shear mixing to generate an emulsion with droplet sizes ranging from 0.1 to 300 μm;
    sulfiding the emulsion with at least a sulfiding agent to form the slurry catalyst having an average particle size ranging from 1 to 300 μm.

2. The process of claim 1, further comprising:
    subjecting the emulsion to reduction in the presence of a reducing agent at a temperature above ambient.

3. The process of claim 1, wherein the emulsion is mixed with the heavy oil feedstock in a reactor under in-situ sulfiding condition for the heavy oil feedstock to provide the sulfiding agent needed for to sulfide the emulsion forming the slurry catalyst.

4. The process of claim 3, wherein the in-situ sulfiding condition is at a temperature from 752° F. to 1112° F. and a pressure from 1435 psig (10 MPa) to 3610 psig (25 MPa).

5. The process of claim 1, where the sulfidation of the emulsion forming the slurry catalyst occurs ex-situ prior to the heavy oil upgrade.

6. The process of claim 5, wherein the sulfiding agent is selected from the group of elemental sulfur, hydrogen sulfide, ammonium sulfide, ammonium polysulfide $((NH_4)_2S_x)$, ammonium thiosulfate $((NH_4)_2S_2O_3)$, sodium thiosulfate $(Na_2S_2O_3)$, thiourea $(CSN_2H_4)$, carbon disulfide, dimethyl disulfide (DMDS), dimethyl sulfide (DMS), tertiarybutyl polysulfide (PSTB) and tertiarynonyl polysulfide (PSTN), and mixtures thereof.

7. The process of claim 5, wherein the hydrocarbon diluent is selected from gasoline, diesel, vacuum gas oil (VGO), cycle oil (MCO or HCO), jet oil, fuel oil, heavy oil feedstock, and mixtures thereof.

8. The process of claim 5, further comprising subjecting the slurry catalyst after ex-situ sulfidation to reduction at a temperature above ambient.

9. The process of claim 1, wherein the emulsion precursor comprises droplets having a size of less than 100 μm.

10. The process of claim 1, wherein the emulsion droplets contain metal precursor solution in a hydrocarbon diluent.

11. The process of claim 1, wherein the emulsion droplets contain hydrocarbon diluent in a metal precursor solution.

12. The process of claim 1, wherein the slurry prepared therefrom has a general formula $(M^t)_a(L^u)_b(S^v)_d(C^w)_e(H^x)_f(O^y)_g(N^z)_h$, wherein M is a Primary metal selected from group VIB metals, Group VIII metals, Group IIB metals; L is optional as a Promoter metal and L is different from M, L is at least one of a Group VIII metal, a Group VIB metal, a Group IVB metal, and a Group IIB metal; b >=0; 0=<b / a =<5; 0.5(a +b)<=d<=5 (a +b); 0<=e <=11(a+b); 0<=f<=18(a+b); 0<=g<=5(a +b); 0<=h <=3(a +b); t, u, v, w, x, y, z, each representing total charge for each of: M, L, S, C, H, O and N, respectively; and ta+ub+vd+we+xf+yg+zh=0.

13. The process of claim 1, wherein the slurry catalyst prepared therefrom has a total surface area of at least 100 m²/g.

14. The process of claim 1, wherein the slurry catalyst prepared therefrom has a total pore volume of at least 0.4 cc/g and a polymodal pore distribution with at least 70% of pore sizes in the range of 5 to 1,000 Angstroms in diameter.

15. The process of claim 1, wherein the slurry catalyst prepared therefrom has a total pore volume of at least 0.5 cc/g.

16. (The process of claim 1, wherein the slurry catalyst prepared therefrom has an average particle size ranging from 1 to 300 μm.

17. A process for preparing a slurry catalyst for use in upgrading heavy oil feedstock, comprising:
   providing a metal precursor solution comprising at least a water-soluble Group VIB metal salt and a water-soluble Group VIII metal salt in a water solvent;
   mixing the at least a metal precursor solution with a hydrocarbon diluent under high shear mixing to generate an emulsion precursor comprising droplets having a size of 0.1 to 300 μm, the hydrocarbon diluent selected from gasoline, diesel, vacuum gas oil (VGO), cycle oil (MCO or HCO), jet oil, fuel oil, heavy oil feedstock, and mixtures thereof;
   mixing the emulsion with a heavy oil feedstock under in-situ sulfiding condition for the heavy oil feedstock to provide the sulfiding agent needed for to sulfide the emulsion forming a slurry catalyst having an average particle size ranging from 1 to 300 μm.

18. The process of claim 17, wherein the mixing of the emulsion precursor with the heavy oil feedstock is at a temperature from 752° F. to 1112° F. under a pressure from 1435 psig (10 MPa) to 3610 psig (25 MPa).

19. The process of claim 17, wherein the slurry catalyst prepared therefrom has a total surface area of at least 100 m²/g.

20. The process of claim 17, wherein the slurry catalyst prepared therefrom has a total pore volume of at least 0.4 cc/g and a polymodal pore distribution with at least 70% of pore sizes in the range of 5 to 1,000 Angstroms in diameter.

21. The process of claim 17, wherein the slurry catalyst prepared therefrom has a total pore volume of at least 0.5 cc/g.

22. A process for preparing a slurry catalyst for use in upgrading heavy oil feedstock, comprising:
   providing a metal precursor solution comprising at least a water-soluble Group VIB metal salt and a water-soluble Group VIII metal salt in a water solvent;
   sulfiding the metal precursor solution with at least a sulfiding agent forming a water-based catalyst precursor;
   mixing the water-based catalyst precursor at a high shear rate with a hydrocarbon diluent from gasoline, diesel, vacuum gas oil, cycle oil, jet oil, fuel oil, heavy oil feedstock for at least a portion of the water-based catalyst precursor to be in an emulsion having droplets sizes ranging from 1 to 300 μm, and
   subjecting the mixture of water-based catalyst precursor and hydrocarbon diluent to reduction in the presence of a reducing agent at a temperature above ambient forming a slurry catalyst of the formula $(M^t)_a(L^u)_b(S^v)_d(C^w)_e(H^x)_f(O^y)_g(N^z)_h$, wherein M is a Primary metal selected from group VIB metals, Group VIII metals, Group IIB metals; L is optional as a Promoter metal and L is different from M, L is at least one of a Group VIII metal, a Group VIB metal, a Group IVB metal, and a Group IIB metal; $b >= 0$; $0 =< b/a =< 5$; $0.5(a+b) <= d <= 5(a+b)$; $0 <= e <= 11(a+b)$; $0 <= f <= 18(a+b)$; $0 <= g <= 5(a+b)$; $0 <= h <= 3(a+b)$; t, u, v, w, x, y, z, each representing total charge for each of: M, L, S, C, H, O and N, respectively; and $ta+ub+vd+we+xf+yg+zh=0$.

23. The process of claim 22, wherein the mixing of the water-based catalyst precursor with a hydrocarbon diluent is in the presence of a reducing agent and under reduction conditions.

* * * * *